United States Patent
Yoon et al.

(10) Patent No.: US 11,973,628 B2
(45) Date of Patent: Apr. 30, 2024

(54) METHOD AND DEVICE FOR TRANSMITTING OFDM SIGNAL, AND METHOD AND DEVICE FOR RECEIVING OFDM SIGNAL

(71) Applicant: LG Electronics Inc., Seoul (KR)

(72) Inventors: Sukhyon Yoon, Seoul (KR); Hyunsoo Ko, Seoul (KR); Kijun Kim, Seoul (KR); Byounghoon Kim, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/156,801

(22) Filed: Jan. 19, 2023

(65) Prior Publication Data
US 2023/0155876 A1     May 18, 2023

Related U.S. Application Data

(63) Continuation of application No. 17/214,137, filed on Mar. 26, 2021, now Pat. No. 11,611,463, which is a
(Continued)

(30) Foreign Application Priority Data

Apr. 4, 2018  (KR) ........................ 10-2018-0039089
Jul. 9, 2018   (KR) ........................ 10-2018-0079450

(51) Int. Cl.
*H04L 27/26*  (2006.01)
*H04L 5/00*   (2006.01)
*H04W 72/04*  (2023.01)

(52) U.S. Cl.
CPC .......... *H04L 27/2657* (2013.01); *H04L 5/003* (2013.01); *H04L 27/2601* (2013.01);
(Continued)

(58) Field of Classification Search
CPC ........... H04L 27/2601; H04L 27/26536; H04L 27/2666; H04L 5/0007; H04L 27/2607
See application file for complete search history.

(56) References Cited

U.S. PATENT DOCUMENTS 6,459,679 B1  10/2002  Kim
8,254,856 B2   8/2012  Hue et al.
(Continued)

FOREIGN PATENT DOCUMENTS

CN   101267416   9/2008
CN   101610227   12/2009
(Continued)

OTHER PUBLICATIONS

Extended European search report in European Appln. No. 18902297.3, dated Jan. 27, 2021, 5 pages.
(Continued)

*Primary Examiner* — Raj Jain
(74) *Attorney, Agent, or Firm* — Fish & Richardson P.C.

(57) ABSTRACT

A method of transmitting, by a transmitting device, an orthogonal frequency division multiplexing (OFDM) signal in a wireless communication system, the method including: generating, by a digital module of the transmitting device, a frequency-shifted OFDM baseband signal by performing frequency up-shift of a first signal by a difference between a carrier frequency $f_0$ and a first frequency $f_{base}$, wherein the first frequency $f_{base}$ is among frequencies corresponding to integer multiples of $128\Delta f$ closest to the carrier frequency $f_0$, and wherein $\Delta f$ is an OFDM subcarrier spacing; up-converting, by an analog oscillator of the transmitting device, the frequency-shifted OFDM baseband signal by the first frequency $f_{base}$ to generate an OFDM symbol signal at the carrier frequency $f_0$; and transmitting the OFDM symbol signal at the carrier frequency $f_0$.

20 Claims, 14 Drawing Sheets

Related U.S. Application Data continuation of application No. 16/964,287, filed as application No. PCT/KR2018/015249 on Dec. 4, 2018, now Pat. No. 10,999,821.

(60) Provisional application No. 62/629,714, filed on Feb. 13, 2018, provisional application No. 62/621,058, filed on Jan. 24, 2018.

(52) U.S. Cl.
CPC .... *H04L 27/26025* (2021.01); *H04L 27/2626* (2013.01); *H04L 27/26536* (2021.01); *H04L 27/2666* (2013.01); *H04W 72/04* (2013.01)

(56) References Cited

U.S. PATENT DOCUMENTS

| | | | |
|---|---|---|---|
| 8,576,936 | B2 | 11/2013 | Ericson et al. |
| 9,077,603 | B2 | 7/2015 | Park et al. |
| 9,871,607 | B1 | 1/2018 | Perets et al. |
| 10,999,821 | B2 * | 5/2021 | Yoon ................ H04L 25/03343 |
| 11,533,131 | B2 * | 12/2022 | Choi ..................... H04L 1/1864 |
| 11,611,463 | B2 * | 3/2023 | Yoon ................ H04L 27/26536 |
| 2003/0133473 | A1 | 7/2003 | Manis et al. |
| 2006/0008016 | A1 | 1/2006 | Balakrishnan et al. |
| 2008/0013654 | A1 | 1/2008 | Rick et al. |
| 2008/0176523 | A1 | 7/2008 | Sutton et al. |
| 2009/0202010 | A1 * | 8/2009 | Fu ..................... H04L 25/03159 |
| | | | 375/260 |
| 2010/0067603 | A1 | 3/2010 | Furudate |
| 2010/0074349 | A1 | 3/2010 | Hyllander et al. |
| 2010/0091916 | A1 | 4/2010 | Henriksson et al. |
| 2010/0098195 | A1 * | 4/2010 | Nekhamkin ........ H04L 27/0014 |
| | | | 375/344 |
| 2011/0158361 | A1 * | 6/2011 | Dent .................... H04L 25/022 |
| | | | 375/347 |
| 2012/0114080 | A1 | 5/2012 | Karthik et al. |
| 2013/0065623 | A1 | 3/2013 | Gummadi et al. |
| 2013/0188756 | A1 | 7/2013 | Sundström et al. |
| 2014/0192850 | A1 | 7/2014 | Meng et al. |
| 2016/0142229 | A1 | 5/2016 | Bevan et al. |
| 2018/0241508 | A1 | 8/2018 | Chervyakov et al. |
| 2018/0254796 | A1 | 9/2018 | Akkarakaran et al. |
| 2019/0182094 | A1 | 6/2019 | Gaal et al. |
| 2021/0219270 | A1 | 7/2021 | Yoon et al. |
| 2021/0321462 | A1 | 10/2021 | Takahashi et al. |
| 2023/0155876 | A1 * | 5/2023 | Yoon ................ H04L 27/26025 |
| | | | 370/329 |

FOREIGN PATENT DOCUMENTS

| | | |
|---|---|---|
| CN | 102165743 | 8/2011 |
| CN | 102647790 | 8/2012 |
| CN | 104054272 | 9/2014 |
| CN | 106788734 | 5/2017 |
| WO | WO 2017/058427 | 4/2017 |
| WO | WO 2017/157471 | 9/2017 |

OTHER PUBLICATIONS

Huawei, HiSilicon, "Remaining issues on bandwidth part and wideband operation," R1-1800018, 3GPP TSG RAN WG1 NR Ad Hoc Meeting, Vancouver, Canada, dated Jan. 22-26, 2018, 14 pages.
Intel, "Correcting NR OFDM Symbol Generation," R1-1721601, Presented at 3GPP TSG RAN WG1 Meeting #91, Reno, NV, USA, Nov. 26-Dec. 1, 2017, Agenda item 7.1, 17 pages.
International Search Report and Written Opinion in International Appln. No. PCT/KR2018/015249, dated Apr. 18, 2019, 11 pages.
LG Electronics, "Remaining Details on Synchronization signal," R1-1802184, 3GPP TSG RAN WG1 Meeting #92, Athens, Greece, dated Feb. 26-Mar. 2, 2018, 12 pages.
LG Electronics, "Remaining Details on Synchronization signal," R1-1800349, 3GPP TSG RAN WG1 Meeting AH 1801, Vancouver, Canada, dated Jan. 22-26, 2018, 7 pages.
Marvell, "Carrier Frequency and Phase Continuity for MTC UE," R1-154479, Presented at 3GPP TSG RAN WG1 Meeting #82, Beijing, Aug. 24-Aug. 28, 2015, 5 pages.
Nokia, "WF on channel raster," R4-1714294, Presented at R4-85, Nov. 27, 2017 to Dec. 1, 2017, Reno, Nevada, 9 pages.
Nokia, Nokia Shanghai Bell, "OFDM signal generation," R1-1800802, 3GPP TSG-RAN WG1 NR AH #18-01, Vancouver, Canada, dated Jan. 22-26, 2018, 7 pages.
Notice of Allowance in Korean Appln. No. 10-2019-0152421, dated Jul. 29, 2021, 3 pages (with English translation).
Office Action in Japanese Appln. No. 2021-043737, dated May 10, 2022, 4 pages (with English translation).
Qualcomm Incorporated, "Remaining details on synchronization signal design," R1-1800846, 3GPP TSG-RAN WG1 Meeting AH 1801, Vancouver, Canada, dated Jan. 22-26, 2018, 8 pages.
Spreadtrum Communications, "Remaining issues on OFDM signal generation," R1-1800284, 3GPP TSG RAN WG1 Meeting AH 1801, Vancouver, Canada, dated Jan. 22-26, 2018, 10 pages.

* cited by examiner

METHOD AND DEVICE FOR TRANSMITTING OFDM SIGNAL, AND METHOD AND DEVICE FOR RECEIVING OFDM SIGNAL

CROSS-REFERENCE TO RELATED APPLICATIONS

This application is a continuation of U.S. application Ser. No. 17/214,137, filed on Mar. 26, 2021, which is a continuation of U.S. application Ser. No. 16/964,287, filed on Jul. 23, 2020, now U.S. Pat. No. 10,999,821, which is a National Stage application under 35 U.S.C. § 371 of International Application No. PCT/KR2018/015249, filed on Dec. 4, 2018, which claims the benefit of Korean Application No. 10-2018-0079450, filed on Jul. 9, 2018, Korean Application No. 10-2018-0039089, filed on Apr. 4, 2018, U.S. Provisional Application No. 62/629,714, filed on Feb. 13, 2018, and U.S. Provisional Application No. 62/621,058, filed on Jan. 24, 2018. The disclosures of the prior applications are incorporated by reference in their entirety.

TECHNICAL FIELD

The present disclosure relates to a wireless communication system. More particularly, the present disclosure relates to a method and device for transmitting an OFDM signal, and a method and device for receiving an OFDM signal.

BACKGROUND

In a mobile communication system, a transmitting device typically generates a baseband signal, up-converts the baseband signal to a higher carrier frequency, and transmits an up-converted radio signal at the carrier frequency. A receiving device then receives the radio signal, and down-converts the received radio signal from the carrier frequency to a lower baseband frequency to obtain a baseband signal for further processing.

SUMMARY

If the information about the frequency for upconversion is unknown to the transmitting device and the receiving device, mismatch may occur between the upconversion frequency used by the transmitting device and the down-conversion frequency used by the receiving device. The mismatch between the upconversion frequency and the downconversion frequency causes a sudden phase change in each time symbol in the receiving device. Such a sudden phase change greatly degrades performance of signal recovery by channel estimation in the receiving device. Therefore, a method for reducing the phase change in each symbol caused by mismatch between the upconversion frequency and the downconversion frequency, mismatch between the carrier frequency and the center frequency of the frequency band, or mismatch between the carrier frequency and the center of the RF filter is required.

In addition, when the carrier frequency changes in the same frequency band, a method of easily adjusting the carrier frequency without RF retuning is required.

The object of the present disclosure can be achieved by techniques disclosed herein for transmitting an orthogonal frequency division multiplexing (OFDM) signal by a transmitting device in a wireless communication system. In one aspect, provided herein is a method of transmitting, by a transmitting device, an orthogonal frequency division multiplexing (OFDM) signal in a wireless communication system. The method comprises: generating, by a digital module of the device, a frequency-shifted OFDM baseband signal by performing frequency up-shift of a first signal by a difference between a carrier frequency $f_0$ and a first frequency $f_{base}$; up-converting, by an analog oscillator of the device, the frequency-shifted OFDM baseband signal by the first frequency $f_{base}$ to generate an OFDM symbol signal at the carrier frequency $f_0$; and transmitting, by a transmitter of the device, the OFDM symbol signal at the carrier frequency $f_0$. The first frequency $f_{base}$ may be, among frequencies corresponding to integer multiples of $128\Delta f$, closest to the carrier frequency $f_0$. $\Delta f$ is an OFDM subcarrier spacing.

In another aspect, provided herein is a method of receiving, by a device at a receiving side, an orthogonal frequency division multiplexing (OFDM) signal in a wireless communication system. The method comprises: receiving an OFDM symbol signal at a carrier frequency $f_0$; down-converting, by an analog oscillator of the device, the OFDM symbol signal by a first frequency $f_{base}$ to generate a down-converted OFDM symbol signal; and generating, by a digital module of the device, an OFDM baseband signal by performing frequency down-shift of the down-converted OFDM symbol signal by a difference between the carrier frequency $f_0$ and $f_{base}$. The first frequency $f_{base}$ may be, among frequencies corresponding to integer multiples of $128\Delta f$, closest to the carrier frequency $f_0$. $\Delta f$ is an OFDM subcarrier spacing.

In a further aspect, provided herein is a device at a transmitting side for transmitting an orthogonal frequency division multiplexing (OFDM) signal in a wireless communication system.

The device may comprise: a digital module; an analog oscillator; at least one antenna; at least one processor; and at least one computer memory that is operably connectable to the at least one processor and that has stored thereon instructions which, when executed, cause the at least one processor to perform operations. The operations may comprise: generating, by the digital module, a frequency-shifted OFDM baseband signal by performing frequency up-shift of a first signal by a difference between a carrier frequency $f_0$ and a first frequency $f_{base}$; up-converting, by the analog oscillator, the frequency-shifted OFDM baseband signal by the first frequency $f_{base}$ to generate an OFDM symbol signal at the carrier frequency $f_0$; and transmitting, using the at least one antenna, the OFDM symbol signal at the carrier frequency $f_0$. The first frequency $f_{base}$ may be, among frequencies corresponding to integer multiples of $128\Delta f$, closest to the carrier frequency $f_0$. $\Delta f$ is an OFDM subcarrier spacing.

In a still further aspect, provided herein is a device at a receiving side for receiving an orthogonal frequency division multiplexing (OFDM) signal in a wireless communication system. The device may comprise: at least one antenna; an analog oscillator; a digital module; at least one processor; and at least one computer memory that is operably connectable to the at least one processor and that has stored thereon instructions which, when executed, cause the at least one processor to perform operations. The operations may comprise: receiving, using the at least one antenna, an OFDM symbol signal at a carrier frequency $f_0$; down-converting, by the analog oscillator, the OFDM symbol signal by a first frequency $f_{base}$ to generate a down-converted OFDM symbol signal; and generating, by the digital module, an OFDM baseband signal by performing frequency down-shift of the down-converted OFDM symbol signal by a difference between the carrier frequency $f_0$ and $f_{base}$. The first frequency $f_{base}$ may be, among frequencies corresponding to integer multiples of 128Δf, closest to the carrier frequency $f_0$. Δf is an OFDM subcarrier spacing.

In each aspect at the transmitting side, the digital module may be configured to implement an inverse fast Fourier transform (IFFT) on the first signal.

In each aspect of a transmitting side, performing the frequency up-shift of the first signal by the difference between $f_0$ and $f_{base}$ may comprise: up-shifting, by $N_{frac}$, a resource mapping for the first signal that is input to the IFFT, where $N_{frac}$ is an integer satisfying $f_0-f_{base}=N_{frac}*\Delta f$.

In each aspect at the transmitting side, the digital module may comprise a digital oscillator. Performing the frequency up-shift of the first signal by the difference between $f_0$ and $f_{base}$ may be performed by the digital oscillator.

In each aspect at the transmitting side, the digital oscillator may reset, before transmitting the OFDM symbol signal, a phase of the OFDM symbol signal to a predetermined value at an end of a cyclic prefix of the OFDM symbol signal.

In each aspect at the receiving side, the digital module may be configured to implement a fast Fourier transformer (FFT) on the down-converted OFDM symbol signal.

In each aspect at the receiving side, performing the frequency down-shift of the down-converted OFDM symbol signal by the difference between $f_0$ and $f_{base}$ may comprise: down-shifting, by $N_{frac}$, a resource de-mapping from the FFT for the down-converted OFDM symbol signal, where $N_{frac}$ is an integer satisfying $f_0-f_{base}=N_{frac}*\Delta f$.

In each aspect at the receiving side, the digital module may comprise a digital oscillator. Performing the frequency down-shift of the down-converted OFDM symbol signal by the difference between $f_0$ and $f_{base}$ may be performed by the digital oscillator.

In each aspect at the receiving side, the digital oscillator may reset a phase of the down-converted OFDM symbol signal to a predetermined value at an end of a cyclic prefix of the down-converted OFDM symbol signal.

The above technical solutions are merely some parts of the implementations of the present disclosure and various implementations into which the technical features of the present disclosure are incorporated can be derived and understood by persons skilled in the art from the following detailed description of the present disclosure.

According to the present invention, phase change according to symbols due to mismatch between the upconversion frequency and the downconversion frequency may be easily minimized. Accordingly, even if the upconversion frequency is unknown to the transmitting device and the receiving device, or mismatch between the upconversion/downconversion frequency and the center of the RF filter or mismatch between the carrier frequency and the center frequency of a cell occurs, the signal recovery performance at the receiving device may be maintained.

In addition, when the carrier frequency changes in the same frequency band, the carrier frequency may be easily adjusted without RF retuning.

DETAILED DESCRIPTION

Figure 1A:
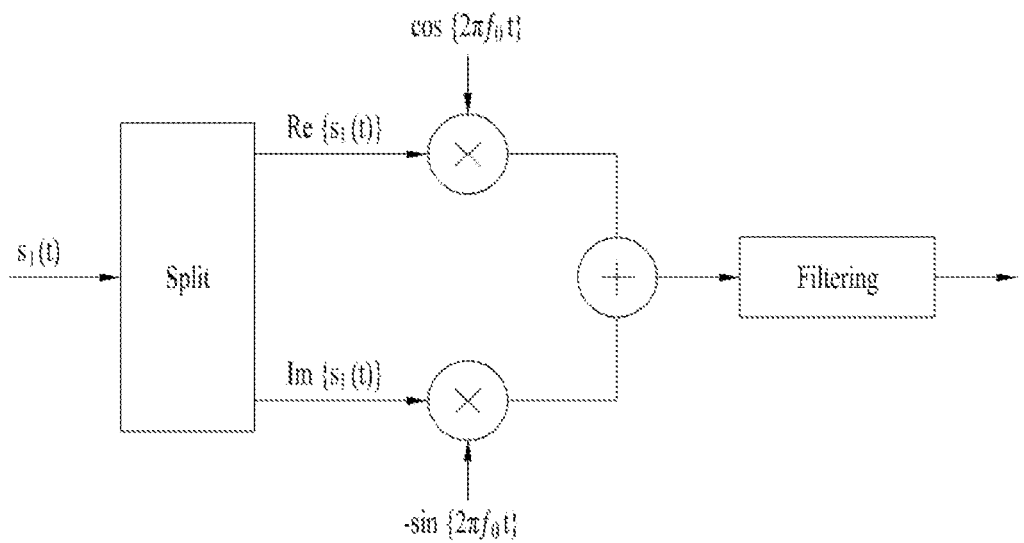
FIGS. 1A and 1B illustrate examples of modulation and upconversion of a baseband signal to a carrier frequency.

Wireless communication systems typically communicate using specific ranges of radio frequencies (RF). To ensure proper transmission in these RF ranges, wireless systems typically implement, at the transmitter, a technique called upconversion to convert signals from a lower frequency range to a higher (RF) frequency range, and also implement, at the receiver, a technique called downconversion to convert signals from a higher (RF) frequency range to a lower frequency range.

However, difficulties may arise where information about frequency conversion is unknown to a transmitting device and/or a receiving device. In such scenarios, mismatch may occur between an upconversion frequency used by the transmitting device and a downconversion frequency used by the receiving device. Such mismatch between upconversion and downconversion frequencies may cause a phase offset in each time symbol received at the receiving device. Phase offset may degrade performance of signal recovery by channel estimation in the receiving device.

Furthermore, in some scenarios, mismatches may occur between a carrier frequency and a center frequency of a frequency band, or between the carrier frequency and a center of an RF filter. Such mismatches may also result in phase offsets in the received time symbols, which may degrade reception performance.

Therefore, difficulties may arise in systems where such phase offset occurs due to mismatch between upconversion and downconversion frequencies, or due to mismatch between the carrier frequency and the center frequency of the frequency band, or due to mismatch between the carrier frequency and the center of the RF filter. In addition, when the carrier frequency changes in the same frequency band, difficulties may arise in adjusting the carrier frequency without performing RF retuning.

Implementations disclosed herein enable a transmitter that is configured to perform upconversion in a manner that mitigates or removes such phase offset. In some implementations, the transmitter upconverts from baseband to one of a finite number of frequencies that are predetermined, and thus configured to result in no phase offset at the receiver. Since these finite number of frequencies may be different from the actual carrier frequency utilized by the transmitter, the transmitter may compensate for any such difference by pre-shifting the baseband signal by that difference.

In some implementations, the pre-shifting may be implemented either by performing frequency domain shifting (e.g., shifting an input of an inverse Fast Fourier Transform (IFFT) at the transmitter) or may be implemented by time-domain shifting (e.g., shifting an output of the IFFT, for example, using a digital oscillator).

Analogously, in some implementations, a receiver is configured to perform downconversion from one of the finite number of predetermined frequencies down to baseband. Again, since the finite number of frequencies may be different from the actual carrier frequency utilized by the receiver, the receiver may compensate for any such difference by post-shifting the resulting baseband signal by that difference.

Accordingly, implementations disclosed herein may mitigate or remove phase offsets that occur due to mismatch between the upconversion frequency and the downconversion frequency. Thus, even if the upconversion frequency is unknown to the transmitting device and the receiving device, or even if mismatch between the upconversion/downconversion frequency and the center of the RF filter occurs, or even if mismatch between the carrier frequency and the center frequency of a cell occurs, the signal recovery performance at the receiving device may be maintained.

In addition, in some scenarios, when the carrier frequency changes in the same frequency band, the carrier frequency may be easily adjusted without RF retuning.

Reference will now be made in detail to various implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

In some instances, known structures and devices are omitted or are shown in block diagram form, focusing on important features of the structures and devices, so as not to obscure the concept of the present disclosure. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, implementations of the present disclosure are described herein as being applied to the 3GPP based communication system, especially, the NR system. However, the technical features of the present disclosure are not limited thereto. Although the following detailed description is based on a mobile communication system corresponding to the 3GPP NR system, it is applicable to any other mobile communication systems except unique features of 3GPP NR. For example, the present disclosure is applicable to a communication technology in which the upconversion frequency and the downconversion frequency are not shared in advance between the transmitting device and the receiving device and communication technologies in which mismatch may occur between the upconversion frequency and the center of the RF filter or between the upconversion/downconversion frequency and the center frequency of a cell.

In the present disclosure, a user equipment (UE) may be a fixed or mobile device. Examples of a UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a base station (BS) generally refers to a fixed station that performs communication with a UE and/or with another BS, and exchanges various kinds of data and control information with the UE and/or another BS. The BS may be referred to as an advanced base station (ABS), a node-B (NB), an evolved node-B (eNB), a base transceiver system (BTS), an access point (AP), a processing server (PS), etc. In particular, the base station of the UTRAN is referred to as Node-B, the base station of E-UTRAN is referred to as eNB, and the base station of the new radio access technology network is referred to as gNB.

In the present disclosure, a node refers to a fixed point configured to transmit/receive a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna may be installed per node. The antenna may be a physical antenna or an antenna port or a virtual antenna.

In the present disclosure, a cell may refer to a prescribed geographical area to which one or more nodes provide a communication service. Accordingly, in the present disclosure, communicating with a specific cell may include communicating with a BS or a node which provides a communication service to the specific cell. In addition, a DL/UL signal of a specific cell refers to a DL/UL signal from/to a BS or a node which provides a communication service to the specific cell. A node providing UL/DL communication services to a UE is called a serving node and a cell to which UL/DL communication services are provided by the serving node is especially called a serving cell.

A 3GPP-based communication system typically implements a cell in order to manage radio resources, and a cell associated with the radio resources is distinguished from a cell of a geographic region. For example, a "cell" of a geographic region may be understood as a coverage within which a node can provide service using a carrier, and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. The "cell" associated with the radio resources is defined by combination of downlink resources and uplink resources, that is, combination of DL component carrier (CC) and UL CC. The cell may be configured by downlink resources only, or may be configured by downlink resources and uplink resources.

For terms and technologies not specifically described among the terms and technologies used in this specification, 3GPP LTE/LTE-A standard documents such as 3GPP TS 36.211, 3GPP TS 36.212, 3GPP TS 36.213, 3GPP TS 36.321 and 3GPP TS 36.331 and 3GPP NR standard documents such as 3GPP TS 38.211, 3GPP TS 38.212, 3GPP 38.213, 3GPP 38.214, 3GPP 38.215, 3GPP TS 38.321, 3GPP TS 38.300 and 3GPP TS 38.331 can be referenced.

Referring to the standard 3GPP TS 36.211, for all physical signals and physical channels except the physical random access channel, OFDM symbol baseband signals, e.g., single carrier frequency division multiple access (SC-FDMA) baseband signals, are generated as follows. In the LTE system, the time-continuous signal $s_l(t)$ in SC-FDMA symbol l in an uplink slot is defined for the time interval $0 \geq t < (N_{CP,l}+N) \times T_s$ (where the fast Fourier transform (FFT) size N is equal to 2048) by the following equation.

$$s_l(t) = \sum_{k=-\lfloor N_{RB}^{UL} N_{sc}^{RB}/2 \rfloor}^{\lceil N_{RB}^{UL} N_{sc}^{RB}/2 \rceil} a_{k^{(-)},l} \cdot e^{j2\pi(k+1/2)\Delta f(t-N_{CP,l}T_s)} \quad \text{Equation 1}$$

where $k^{(-)}=k+\lfloor N_{RB}^{UL}N_{sc}^{RB}/2 \rfloor$, the subcarrier spacing is $\Delta f=151$ kHz, and $\alpha_{k,l}$ is the content of resource element (k,l). The index k is an index numbered from 0 to $N_{RB}^{UL} \times N_{sc}^{RB}-1$ in the frequency domain, and l is an index numbered from 0 to $N_{symb}^{UL}-1$ in the time domain.

In an LTE system, the uplink transmitted signal in each slot utilizes a resource grid of $N_{RB}^{UL} \times N_{sc}^{RB}$ subcarriers and $N_{symb}^{UL}$ OFDM symbols. Each resource element in the resource grid is uniquely defined by the index pair (k,l) in a slot, where k=0, . . . , $N_{RB}^{UL} \times N_{sc}^{RB}-1$ and l=0, . . . , $N_{symb}^{UL}-1$. The expression $N_{RB}^{UL}$ denotes the number of resource blocks (RB s) in an uplink (UL) slot and depends on the uplink transmission bandwidth configured in a cell. The expression $N_{sc}^{RB}$ denotes the number of subcarriers constituting one RB. In the LTE system, $N_{sc}^{RB}=12$. The RB is defined as 12 consecutive subcarriers in the frequency domain. The expression $T_s$ is a basic time unit for LTE, wherein $T_s=1/(15*10^3*2048)$ seconds. For reference, the sampling time is defined as $1/(N_{FFT}*\Delta f)$, where $N_{FFT}$ is the FFT size (equal to the IFFT size) and $\Delta f$ is the subcarrier spacing. When $N_{FFT}=2048$ and the basic subcarrier spacing is $\Delta f=15$ kHz, the basic time unit $T_s$ of the LTE system corresponds to the sampling time. The expression $N_{symb}^{UL}$ denotes the number of SC-FDMA symbols in the UL slot, wherein $N_{symb}^{UL}=7$ for the normal cyclic prefix (CP) and $N_{symb}^{UL}=6$ for the extended CP. The expression $N_{CP,l}$ is the cyclic prefix length. The following table lists the values of $N_{CP,l}$ used on an uplink of the LTE system.

TABLE 1

| Configuration | Cyclic prefix length $N_{CP,l}$ |
| --- | --- |
| Normal cyclic prefix | 160 for l = 0 |
|  | 144 for l = 1, 2, . . . , 6 |
| Extended cyclic prefix | 512 for l = 0, 1, . . . , 5 |

The SC-FDMA symbols in a slot are transmitted in increasing order of l, starting with l=0, where SC-FDMA symbol l>0 starts at a time, within the slot, given by the expression $$\sum_{l'=0}^{l-1} (N_{CP,l'} + N)T_s.$$

The time-continuous signal $s_l^{(p)}(t)$ on antenna port p in orthogonal frequency division multiplexing (OFDM) symbol l in a downlink slot is defined for $0 \leq l < (N_{CP,l}+N) \times T_s$ by the following equation.

$$s_l^{(p)}(t) = \sum_{k=-\lfloor N_{RB}^{DL} N_{sc}^{RB}/2 \rfloor}^{-1} a_{k^{(-)},l}^{(p)} \cdot e^{j2\pi k\Delta f(t-N_{CP,l}T_s)} + \sum_{k=1}^{\lceil N_{RB}^{DL} N_{sc}^{RB}/2 \rceil} a_{k^{(+)},l}^{(p)} \cdot e^{j2\pi k\Delta f(t-N_{CP,l}T_s)} \quad \text{Equation 2}$$

where $k^{(-)}=k+\lfloor N_{RB}^{DL}N_{sc}^{RB}/2 \rfloor$, and $k^{(+)}=k+\lfloor N_{RB}^{DL}N_{sc}^{RB}/2 \rfloor-1$. In the time interval $0 \geq l < (N_{CP,l}+N) \times T_s$, the variable N equals 2048 for subcarrier spacing $\Delta f=15$ kHz and equals 4096 for subcarrier spacing $\Delta f=7.5$ kHz. The OFDM symbols in a slot are transmitted in increasing order of l, starting with l=0, where OFDM symbol l>0 starts at time $$\sum_{l'=0}^{l-1} (N_{CP,l'} + N)T_s$$

within the slot. The index k is an index numbered from 0 to NDLRBxNRBsc-1 in the frequency domain, and l is an index assigned values from 0 to NDLsymb-1 in the time domain.

In the LTE system, the downlink transmitted signal in each slot is described by a resource grid of $N^{DL}_{RB} \times N^{RB}_{sc}$ subcarriers and $N^{DL}_{symb}$ OFDM symbols. Each resource element in the resource grind is uniquely identified by the index pair (k,l) in a slot, where k=0, . . . , $N^{DL}_{RB} \times N^{RB}_{sc}-1$ and/=0, . . . , $N^{UL}_{symb}-1$. $N^{DL}_{RB}$ denotes the number of RBs in a DL slot and depends on the downlink transmission bandwidth configured in a cell. $N^{DL}_{symb}$ denotes the number of OFDM symbols in the DL slot, wherein $N^{DL}_{symb}=7$ for the normal cyclic prefix (CP) and $N^{DL}_{symb}=6$ for the extended CP. $N_{CP,l}$ is the cyclic prefix length. The following table lists the values of $N_{CP,l}$ used on downlink in the LTE system.

TABLE 2

| Configuration | | Cyclic prefix length $N_{CP, l}$ |
|---|---|---|
| Normal cyclic prefix | $\Delta f$ = 15 kHz | 160 for l = 0 |
| | | 144 for l = 1, 2, . . . , 6 |
| Extended cyclic prefix | $\Delta f$ = 15 kHz | 512 for l = 0, 1, . . . , 5 |
| | $\Delta f$ = 7.5 kHz | 1024 for l = 0, 1, 2 |

Figure 1B:
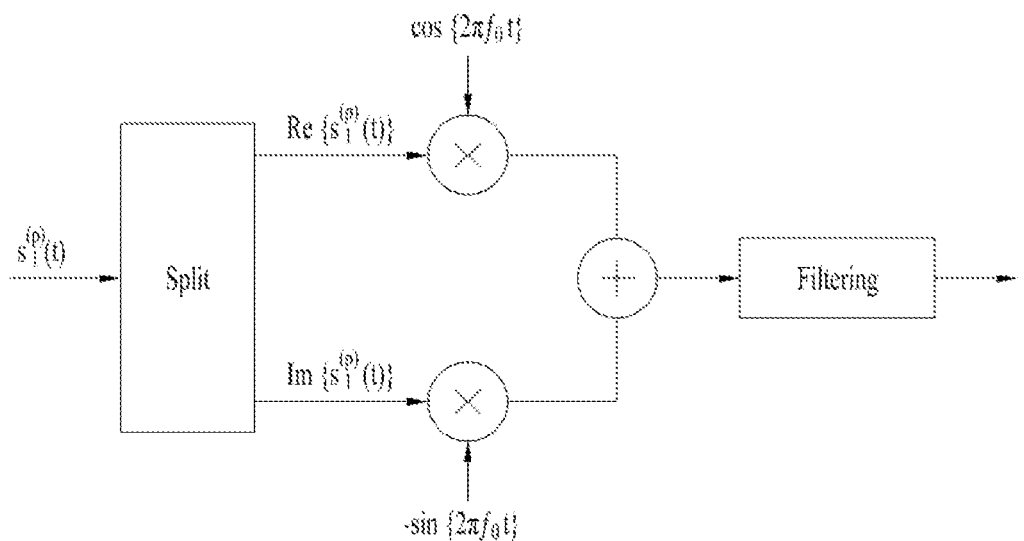

FIGS. 1A and 1B illustrate examples of modulation and upconversion of a baseband signal to a carrier frequency that may be implemented in some systems (e.g., an LTE system). In particular, FIG. 1A illustrates an example of modulation and upconversion, to the carrier frequency, of a complex-valued SC-FDMA baseband signal for each antenna port, and FIG. 1B illustrates an example of modulation and upconversion, to the carrier frequency, of the complex-valued OFDM baseband signal for each antenna port.

Filtering may be performed prior to uplink transmission, for example as specified by the standard 3GPP TS 36.101, and likewise filtering may be performed prior to downlink transmission, for example as specified by the standard 3GPP TS 36.104. In the examples of FIGS. 1A and 1B, the frequency $f_0$ is the upconversion frequency. In some scenarios (e.g., in an LTE system), the upconversion frequency may be set equal to a carrier frequency of a cell.

In some systems (e.g., in an LTE system), since a synchronization signal of the cell and a physical broadcast channel (PBCH) of the cell are transmitted in a total of six RBs around the carrier frequency of the cell, the user equipment (UE) of the LTE system can know the downlink carrier frequency of the cell by acquiring the synchronization signal and the PBCH. In such scenarios, if the UE and the base station (BS) know the downlink carrier frequency, then they may also know the uplink carrier frequency in scenarios where (i) the downlink carrier frequency and the uplink carrier frequency are the same, for example, in the case of time division duplex (TDD), or where (ii) the uplink carrier frequency used together with the downlink carrier frequency is predetermined, for example, in the case of frequency division duplex (FDD), or where (iii) the uplink carrier frequency is explicitly broadcast through the system information of the cell or the like. As a result, in such scenarios of the LTE system, both the UE and the base station (BS) may know the carrier frequency of a cell used for transmission/reception of a radio signal.

In a legacy LTE system, the following frequencies are configured to be the same: (i) the center of a radio frequency (RF) filter (e.g., a filter between IFFT and upconversion, a filter applied after upconversion, etc.), (ii) the center frequency of the carrier bandwidth, and (iii) the upconversion frequency $f_0$. In addition, the same frequency is used for up-converting the baseband to the carrier frequency signal and for down-converting a radio signal to the baseband signal.

However, with the increase in various utilizations of Machine Type Communication (MTC), Internet of things (IoT) communications, and ultra-reliable and low latency communication (URLLC), a new radio access technology (NR) different from the legacy LTE communication technology is under development. The NR system considers use of frequencies above the frequency band used in the legacy communication system and also considers supporting a bandwidth much wider than the frequency bandwidth used in the legacy communication system. Considering the drawbacks of the legacy LTE system, in which it is difficult to introduce a communication technology having forward compatibility due to various constraints, the NR system is being developed so as to reduce such constraints and thereby facilitate introduction of future communication technology having forward compatibility with the NR system.

Accordingly, in the NR system, the frequency used for upconversion of the baseband signal is not necessarily limited to the center frequency of the cell. In addition, in the NR system, the frequency resource through which the synchronization signal is transmitted is not necessarily limited to be the center of the frequency band of the cell.

Considering that the UE may not be able to support a wide bandwidth to be supported in the NR system at one time, the UE may be configured to operate in a part of the frequency bandwidth (hereinafter, bandwidth part (BWP)) of the cell. The BWP may be assigned based on any reference point. The reference point is not necessarily limited to be the center frequency of the cell. If only a part of the frequency bandwidth of the cell is used for communication such as BWP-based communication and NB-IoT, the receiving device may not know the upconversion frequency used by the transmitting device before downconversion of the receiving signal.

Accordingly, the upconversion frequency for the baseband signal may be different from the downconversion frequency for the radio signal, and the upconversion frequency is not necessarily limited to be the center of the RF filter.

In addition, it is expected that a variety of numerologies will be supported in the NR system. If the numerology for the same frequency band changes, the subcarrier spacing may change. This change in subcarrier spacing may result in change in the upconversion frequency or the downconversion frequency. Therefore, there is a need for a technique by which the transmitting device and the receiving device can easily adjust the upconversion frequency and the downconversion frequency, respectively.

Before explaining implementations of the present disclosure in further detail, the basic frame structure and physical resources of the NR system so far discussed will be described in order to facilitate understanding of the present disclosure.

In the description of the present disclosure, unless otherwise noted, the size of various fields in the time domain is expressed in time units $T_c=1/(\Delta f_{max}*N_f)$, where $\Delta f_{max}=480*10^3$ Hz and $N_f=4096$, or in time units $T_s$. $T_c$ is the basic time unit for NR. The constant $K=T_s/T_c=64$, where $T_s=1/(\Delta f_{ref}*N^{f,ref})$, $\Delta f_{ref}=15*10^3$ Hz, $N^{f,ref}=2048$. $T_s$ is the basic time unit for LTE. In NR, multiple OFDM numerologies are supported as given by the following table, where μ and the cyclic prefix for a bandwidth part are given by the higher-layer parameters provided by a BS.

TABLE 3

| μ | Δf = $2^μ*15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Downlink and uplink transmissions are organized into frames with $T_f=(\Delta f_{max} N_f/100)*T_c=1$ 0ms duration, each consisting of $T_{sf}=(\Delta f_{max} N_f/1000)*T_c=1$ ms duration. The number of consecutive OFDM s subframe $N_{symb}^{subframe,\mu}=N_{symb}^{slot}N_{slot}^{subframe,\mu}$. Each frame is divided into two equally-sized half-frames of five subframes. There is one set of frames in the uplink and one set of frames in the downlink on a carrier.

For subcarrier spacing configuration μ, slots are numbered $n_s^\mu \in \{0, \ldots, N_{slot}^{subframe,\mu}-1\}$ in increasing order within a subframe. There are $N_{symb}^{slot}$ consecutive OFDM symbols in a slot where $N_{symb}^{slot}$ depends on the cyclic prefix as given by Table 4 and Table 5. Table 4 shows the number of OFDM symbols per slot, the number of slots per frame, and the number of slots per subframe, for the normal cyclic prefix, and Table 5 shows the number of OFDM symbols per slot, the number of slots per frame, and the number of slots per subframe, for the extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

In Table 4 and Table 5, $N_{symb}^{slot}$ denotes the number of symbols per slot, $N_{slot}^{frame,\mu}$ is the number of slots per frame for subcarrier configuration μ, $N_{slot}^{subframe,\mu}$ is the number of slots per subframe for subcarrier configuration μ.

For each numerology and carrier, a resource grid of $N_{grid,x}^{size,\mu} N_{sc}^{RB}$ subcarriers and $N_{symb}^{subframe,\mu}$ OFDM symbols is defined, starting a common resource block $N_{grid}^{start,\mu}$ indicated by higher-layer signaling by a BS, where $N_{grid,x}^{size,\mu}$ is the size of the resource grid and $N_{sc}^{RB}$ is the number of subcarriers per resource block. There is one set of resource grids per transmission direction (DL or UL) with the subscript x set to DL and UL. The subscript x is DL for downlink and UL for uplink. When there is no risk for confusion, the subscript x may be dropped. There is one resource grid for a given antenna port p, subcarrier spacing configuration μ, and transmission direction (downlink or uplink). Each element in the resource grid for antenna port p and subcarrier spacing configuration μ is called a resource element and is uniquely identified by $(k,l)_{p,\mu}$ where k is the index in the frequency domain and l refers to the symbol position in the time domain relative to some reference point. Resource element $(k,l)_{p,\mu}$ corresponds to the complex value $a_{k,l}^{(p,\mu)}$. When there is no risk for confusion, or no particular antenna port or subcarrier spacing is specified, the indices p and μ may be dropped, resulting in $a_{k,l}^{(p)}$ or $a_{k,l}$.

A resource block (RB) is defined as $N_{sc}^{RB}=12$ consecutive subcarriers in the frequency domain. Reference resource blocks are numbered from 0 and upward in the frequency domain. Subcarrier 0 of reference resource block 0 is common for all subcarrier spacing configurations μ, also denoted as 'reference point A' or 'point A', and serves as a common reference point for other resource block grids. Reference point A is obtained from the higher-layer parameter provided by a BS. Common resource blocks (CRBs) are numbered from 0 and upwards in the frequency domain for subcarrier spacing configuration μ. Subcarrier 0 of common resource block 0 for subcarrier spacing configuration μ coincides with the reference point A. The relation between the common resource block number $n_{CRB}$ in the frequency domain and resource elements (k,l) for subcarrier spacing configuration μ is given by the following equation.

$$n_{CRB}^\mu = \left\lfloor \frac{k}{N_{sc}^{RB}} \right\rfloor \quad \text{Equation 3}$$

where k is defined relative to subcarrier 0 of the resource grid for subcarrier spacing configuration μ.

In the NR system, physical resource blocks (PRBs) are defined within a carrier bandwidth part and numbered from 0 to $N_{BWP,i}^{size}-1$, where i is the number of the carrier bandwidth part and $N_{BWP,i}^{size}$ is the size of bandwidth part i. The relation between physical and common resource blocks in carrier bandwidth part i is given by the following equation.

$$n_{CRB}=n_{PRB}+N_{BWP,i}^{start} \quad \text{Equation 4}$$

where $N_{BWP,i}^{start}$ is the common resource block where the carrier bandwidth part starts relative to common resource block 0.

A bandwidth part is a subset of contiguous common resource blocks defined for a given numerology $\mu_i$ in the bandwidth part i on a given carrier. The starting position $N_{BWP,i}^{start,\mu}$ and the number of resource blocks $N_{BWP,i}^{size,\mu}$ in a bandwidth part shall fulfill $N_{grid,x}^{start,\mu} \leq N_{BWP,i}^{start,\mu} < N_{grid,x}^{start,\mu}+N_{grid,x}^{size,\mu}$ and $N_{grid,x}^{start,\mu} < N_{BWP,i}^{size,\mu}+N_{BWP,i}^{start,\mu} \leq N_{grid,x}^{start,\mu}+N_{grid,x}^{size,\mu}$. A UE can be configured with the certain number (e.g. up to four) of bandwidth parts in the downlink with a single downlink bandwidth part being active at a given time. A UE can be configured with the certain number (e.g. up to four) of bandwidth parts in the uplink with a single uplink bandwidth part being active at a given time.

In some wireless communication systems, the carrier frequency used by the transmitter and the receiver are known to each other, and the transmitter and the receiver set the same carrier frequency as the upconversion frequency and the downconversion frequency, respectively. However, due to inaccuracy of the analog oscillator or the phase-locked loop (PLL), an error, i.e., a frequency offset, occurs between the frequencies generated by the transmitter and the receiver. In this case, the signal phase varies depending on the symbols at the receiving end. However, generally, phase change due to inaccuracy of the analog module is not so serious as to make channel estimation with the reference signal (RS) useless and, generally, such phase change does not greatly affect the received signal recovery.

On the other hand, in a radio communication system such as an NR system supporting a wideband cell, the UE and the BS may have to operate without the information on a carrier frequency for upconversion known to the UE and the BS. Therefore, when the UE and the BS perform upconversion and downconversion using different carrier frequencies, the phase of the receiving device may change abruptly in each symbol as will be described later even if it is assumed that there is no frequency offset, i.e., frequency error, resulting from the inaccuracy of the analog oscillator or the PLL.

The time-continuous signal $s_l(p,\mu)(t)$ on antenna port p and subcarrier spacing configuration $\mu$ for OFDM symbol l in a subframe for any physical channel or signal except the physical random access channel (PRACH) is defined by the following equation.

$$s_l^{(p,\mu)}(t) = \sum_{k=0}^{N_{grid}^{size,\mu} N_{sc}^{RB} - 1} a_{k,l}^{(p,\mu)} \cdot e^{j2\pi(k + k_0^\mu - N_{grid}^{size,\mu} N_{sc}^{RB}/2)\Delta f(t - N_{CP,l}^\mu T_c)} \quad \text{Equation 5}$$

where $0 \leq t < N_u^\mu + N_{CP,l}^\mu)T_c$. Equation 5 may be expressed as:

$$s_l^{(p,\mu)}(t) = \sum_{k=0}^{N_{grid}^{size,\mu} N_{sc}^{RB} - 1} a_{k,l}^{(p,\mu)} \cdot e^{j2\pi(k + k_0^\mu - N_{grid}^{size,\mu} N_{sc}^{RB}/2)\Delta f(t - N_{CP,l}^\mu T_c - t_{start,l}^\mu)} \quad \text{Equation 6}$$

where $t_{start,l}^\mu \leq t < t_{start,l}^\mu + (N_u^\mu + N_{CP,l}^\mu)T_c$ is the time within the subframe.

In Equation 5 and Equation 6, the value of $k_0^\mu$ is obtained from the higher-layer parameter k0 provide by a BS, and is such that the lowest numbered subcarrier in a common resource block for subcarrier spacing configuration $\mu$ coincides with the lowest numbered subcarrier in a common resource block for any subcarrier spacing configuration less than $\mu$. The starting position $t_{start,l}^\mu$ of OFDM symbol l for subcarrier spacing configuration $\mu$ in a subframe is given as follows.

$$t_{start,l}^\mu = \begin{cases} 0 & l = 0 \\ t_{start,l-1}^\mu + (N_u^\mu + N_{CP,l-1}^\mu) \cdot T_c & \text{otherwise} \end{cases} \quad \text{Equation 7}$$

Here, the effective symbol length $N_u^\mu$ of OFDM symbol l and the cyclic prefix (CP) length $N_{CP,l}^\mu$ of OFDM symbol l are given as:

$$N_u^\mu = 2048\kappa \cdot 2^{-\mu} \quad \text{Equation 8}$$

$$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^\mu \\ 144\kappa \cdot 2^{-\mu} & \text{normal cyclic prefix, } l \neq 0 \text{ and } l \neq 7 \cdot 2^\mu \end{cases}$$

The time continuous signal $s_l^{(p,\mu)}(t)$ on antenna port p for PRACH is defined by the following equation.

$$s_l^{(p,\mu)}(t) = \sum_{k=0}^{L_{RA}-1} a_k^{(p,RA)} \cdot e^{j2\pi(k + Kk_0 + \bar{k})\Delta f_{RA}(t - N_{CP,l}^{RA} T_c)} \quad \text{Equation 9}$$

$$K = \Delta f / \Delta f_{RA}$$

where $0 \leq t < (N_u + N_{CP,l}^{RA})T_c$. A detailed description of each parameter in Equation 9 can be found in 3GPP TS 38.211.

The transmitting device up-converts the OFDM symbol baseband signal $s_l^{(p,\mu)}(t)$ for the antenna port p and the subcarrier spacing configuration $\mu$ to the uplink frequency $f_{Tx}$ using the free-running oscillator of the frequency $f_{Tx}$. The upconversion of the OFDM symbol baseband signal $s_l^{(p,\mu)}(t)$ for the antenna port p and the subcarrier spacing configuration $\mu$ to the upconversion frequency $f_{Tx}$ may be expressed as:

$$x^{(p,\mu)}(t) = s_l^{(p,\mu)}(t) \cdot e^{j2\pi f_{Tx} t} = \sum_{k=0}^{N_{RB}^\mu N_{sc}^{RB} - 1} a_{k,l}^{(p,\mu)} \cdot e^{j2\pi(k + k_0 - N_{RB}^\mu N_{sc}^{RB}/2)\Delta f(t - t_{start,l} - N_{CP,l}^\mu T_c)} \cdot e^{j2\pi f_{Tx} t} \quad \text{Equation 10}$$

In Equation 10, $N_{RB}^\mu$ may be the number of RBs for the subcarrier spacing configuration $\mu$. $N_{RB}^\mu$ may be $N_{grid,x}^{size,\mu}$, $N_{grid,x}^{size,\mu}$ is a value configured by the BS, and the UE may know $N_{grid,x}^{size,\mu}$ through the system information. Since a signal that is actually transmitted in a final signal that the transmitting device obtains by multiplying a transmitted signal by $e^{j2\pi f_{Tx} t}$ for the frequency upconversion (modulation) is a real signal rather than a complex signal, the real value of the final signal of Equation 10 is transmitted. That is, modulation and upconversion of the complex-valued OFDM symbol baseband signal for the antenna port p and the subcarrier spacing configuration $\mu$ to the upconversion frequency $f_{Tx}$ may be expressed as follows.

$$x^{(p,\mu)}(t) = \text{Re}\{s_l^{(p,\mu)}(t) \cdot e^{j2\pi f_{Tx} t}\} \quad \text{Equation 11}$$

Even if the transmitting device transmits only the real value of the complex signal, the receiving device applies FFT after converting the received signal back into the complex signal. Therefore, in the description of the present disclosure, the transmitted signal is expressed as a complex signal for convenience, and is equivalent to the real signal in modeling. The same applies to the reception operation.

When a radio signal $x^{(p,\mu)}(t)$ is received by the receiving device, the receiving device performs frequency downconversion on $x^{(p,\mu)}(t)$ to obtain the baseband signal $\hat{x}^{(p,\mu)}(t)$. When it is assumed that the receiving device uses an arbitrary frequency $f_{Rx}$ in frequency downconversion, the frequency downconversion of the radio signal $x^{(p,\mu)}(t)$ for the antenna port p and the subcarrier spacing configuration $\mu$ may be expressed as:

$$\hat{x}^{(p,\mu)}(t) = x^{(p,\mu)}(t) \cdot e^{-j2\pi f_{Rx} t} = \sum_{k=0}^{N_{RB}^\mu N_{sc}^{RB} - 1} a_{k,l}^{(p,\mu)} \cdot e^{j2\pi(k + k_0 - N_{RB}^\mu N_{sc}^{RB}/2)\Delta f(t - t_{start,l} - N_{CP,l}^\mu T_c)} \cdot e^{j2\pi(f_{Tx} - f_{Rx})t} \quad \text{Equation 12}$$

To show the phase change of the received signal $\hat{x}^{(p,\mu)}(t)$, the frequencies $f_{Tx}$ and $f_{Rx}$ may be expressed as $f_{Tx} = N_{Tx} * \Delta f + \Delta_{offset}$ and $f_{Rx} = N_{Rx} * \Delta f + \Delta_{offset}$ where the term $\Delta f$ is the subcarrier spacing, the term $N_{Tx}$ is a positive integer closest to $f_{Tx}/\Delta f$ (e.g., floor$\{f_{Tx}/\Delta f\}$ or ceil$\{f_{Tx}/\Delta f\}$), the term $N_{Rx}$ is a positive integer closest to $f_{Rx}/\Delta f$ (e.g., floor$\{f_{Rx}/\Delta f\}$ or ceil$\{f_{Rx}/\Delta f\}$), and the term $\Delta_{offset}$ is a real number whose magnitude is smaller than $\Delta f$. In the description of the present disclosure, $f_{Tx}$ and $f_{Rx}$ are expressed using the same $\Delta_{offset}$ for simplicity, but $\Delta_{offset}$ may differ between $f_{Tx}$ and $f_{Rx}$.

Using these expressions, Equation 12 may be rearranged as given below.

Equation 13

$$\hat{x}^{(p,\mu)}(t) = x^{(p,\mu)}(t) \cdot e^{-j2\pi f_{Rx}t} = s_l^{(p,\mu)}(t) \cdot e^{j2\pi f_{Tx}t} \cdot e^{-j2\pi f_{Rx}t} =$$

$$s_l^{(p,\mu)}(t) \cdot e^{j2\pi(f_{Tx}-f_{Rx})t} = \sum_{k=0}^{N_{grid}^{size,\mu} N_{sc}^{RB}-1} a_{k,l}^{(p,\mu)} \cdot$$

$$e^{j2\pi\left(k+k_0-\frac{N_{grid}^{size,\mu} N_{sc}^{RB}}{2}\right)\Delta f\left(t-t_{start,l}-N_{CP,l}^{\mu}T_c\right)} \cdot e^{j2\pi(f_{Tx}-f_{Rx})t} =$$

$$\sum_{\square=0}^{\square_{grid}^{size,\square} \square_{sc}^{RB}-} \square_{\square,\square}^{(\square,\square)} \cdot \left\{ e^{j2\pi\left(k+k_0-\frac{N_{grid}^{size,\mu} N_{sc}^{RB}}{2}\right)\Delta f\left(t-t_{start,l}-N_{CP,l}^{\mu}T_c\right)} \cdot \right.$$

$$\left. e^{j2\pi\Delta f(N_{Tx}-N_{Rx})\left(t-t_{start,l}-N_{CP,l}^{\mu}T_c\right)} \right\}.$$

$$e^{j2\pi\Delta f(N_{Tx}-N_{Rx})\left(t_{start,l}+N_{CP,l}^{\mu}T_c\right)} =$$

$$\sum_{\square=0}^{\square_{grid}^{size,\square} \square_{sc}^{RB}-} \square_{\square,\square}^{(\square,\square)} \cdot \left\{ e^{j2\pi\left(k+k_0-\frac{N_{grid}^{siz,\mu} N_{sc}^{RB}}{2}\right)\Delta f\left(t-t_{start,l}-N_{CP,l}^{\mu}T_c\right)} \cdot \right.$$

$$\left. e^{j2\pi\Delta f(N_{Tx}-N_{Rx})\left(t-t_{start,l}-N_{CP,l}^{\mu}T_c\right)} \right\} \cdot e^{j\Psi_l}$$

Even in an environment in which there is no frequency offset, which is a frequency error unintentionally produced by the characteristics of the transmitter/receiver components, the received signal $\hat{x}^{(p,\mu)}(t)$ may suffer phase change by $\Psi_l = 2\pi\Delta f(N_{Tx} - N_{Rx})(t_{start,l} + N_{CP,l}^{\mu}T_c)$ in frequency upconversion or frequency downconversion if $f_{Tx}$ is not equal to $f_{Rx}$ for the following reason. In Equation 5, if expressing $t-N_{CP,l}^{\mu}T_c$ as $t'$, $t-N_{CP,l}^{\mu}T_c$ in $s_l^{(p,\mu)}(t)$, i.e., time $t'$ at which inverse fast Fourier transform (IFFT) is applied is defined only for $T_{CP} \leq t' < T_{OFDM}$ (i.e., $-N_{CP,l}^{\mu}T_c \leq t' < N_u^{\mu}T_c$), but t in $e^{j2\pi f_{Tx}t}$, which is a frequency upconversion component, namely, the upconversion time t for which the free-running oscillator operates is defined as $-\infty < t < \infty$.

Figure 2A:
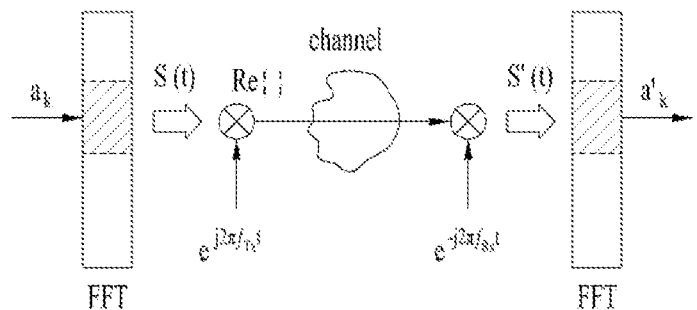
FIGS. 2A and 2B are diagrams illustrating examples of phase change according to a difference between an upconversion frequency and a downconversion frequency.
Figure 2B:
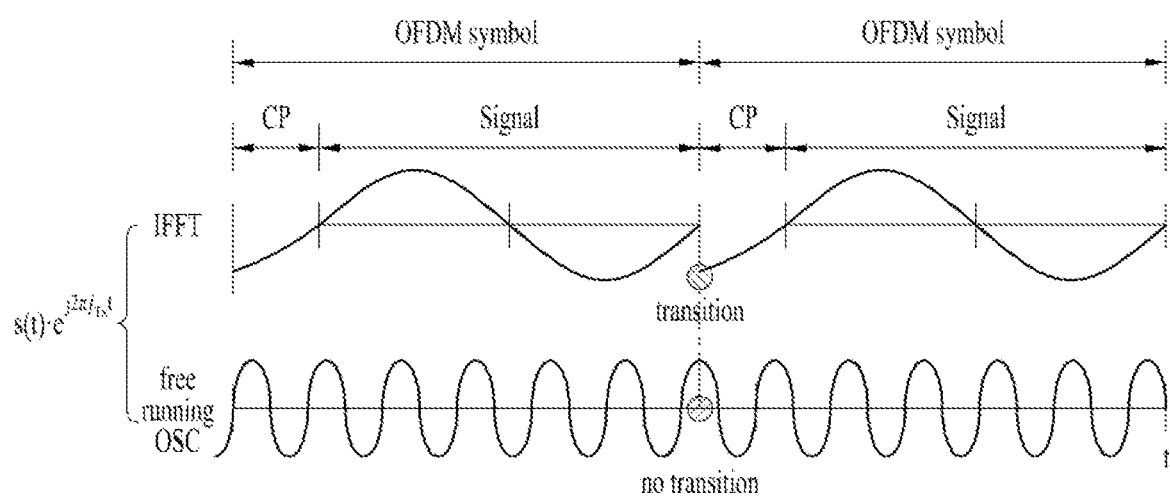

FIGS. 2A and 2B are diagrams illustrating examples of phase change according to a difference between an upconversion frequency and a downconversion frequency in terms of a device and a signal waveform.

Referring to FIG. 2A, an information symbol $\alpha_k$ that transmitting device intends to transmit is converted to an OFDM baseband signal s(t) through IFFT. The transmitting device up-converts s(t) to $s(t) \cdot e^{j2\pi f_{Tx}t}$ using a free-running oscillator of frequency $f_{Tx}$. When $s(t) \cdot e^{j2\pi f_{Tx}t}$ arrives at the receiving device over a radio channel, if signal distortion in the radio channel is not taken into consideration, the receiving device down-converts $s(t) \cdot e^{j2\pi f_{Tx}t}$ to s'(t) by multiplying $s(t) \cdot e^{j2\pi f_{Tx}t}$ by $e^{j2\pi f_{Rx}t}$ using the free-running oscillator (OSC) with the frequency $f_{Rx}$, and performs FFT on s'(t), thereby obtaining an information symbol $a'_k$.

Referring to FIG. 2B, an OFDM symbol signal is obtained when a cyclic prefix (CP) is added to the IFFT signal obtained by performing IFFT on the information symbol. The CP added to the IFFT signal causes a transition with respect to the waveform of the IFFT signal in the time domain. As a result, when the OFDM symbol signal is loaded on the signal of the free-running OSC, the phase of the transmitted signal may not be zero at the beginning of the OFDM symbol. In addition, the phase of the transmit/receive signal may be different among the beginnings of the OFDM symbols.

Therefore, if $f_{Tx}$ is not equal to $f_{Rx}$, performance is significantly degraded in the signal recovery process through channel estimation at the receiving end due to the abrupt phase change between the symbols caused by the difference between $f_{Tx}$ and $f_{Rx}$. If the phase is abruptly changed between the OFDM symbols, the receiver cannot apply a channel estimation value obtained using the reference signal (RS) of a specific OFDM symbol to other OFDM symbols, or the received signal may not be restored properly when the channel estimation value is used. It is not appropriate for the transmitter to insert an RS in every OFDM symbol to allow the receiver to correctly estimate the channel state of each symbol because the RS overhead becomes excessively large.

Several types of techniques may be utilized for an NR system to mitigate such issues of phase discontinuity/mismatch between symbols. Some examples of such techniques are described below, along with potential disadvantages of each.

Technique A: The gNB Informs the UE of the Carrier Frequency that the gNB Uses, and the UE Compensates for the Corresponding Phase Discontinuity.

According to this scheme, if the BS transmits a transmitted signal without separately performing pre-compensation thereon, the UE performs compensation for phase discontinuity for each symbol using the carrier frequency information of the BS. For example, the UE, which is the receiver, performs phase compensation so as to cancel the phase discontinuity occurring due to $e^{j2\pi(f_{Tx}-f_{Rx})t}$ in Equation 12 on a symbol-by-symbol basis. In addition, when the UE transmits a signal, the UE serving as a transmitting side performs pre-compensation for the phase discontinuity term, and the BS performs reception on the assumption that the carrier frequencies of the BS and the UE are equal to each other. However, this technique may be disadvantageous in that both the BS and the UE must implement two modes since operations of the BS and the UE before the information about the carrier frequency used by the BS is transmitted have to be additionally defined as well as operations of the BS and the UE after the information about the carrier frequency used by the BS is transmitted.

Technique B: The BS, which is a Transmitter, Performs Phase Pre-Compensation Using the DL Carrier Frequency Information of the UE.

This technique may be implemented, for example, in the NB-IOT system as an operation before the receiver receives the information about the carrier frequency in Implementation A. For example, the transmitter performs phase pre-compensation to cancel the phase discontinuity occurring due to $e^{j2\pi(f_{Tx}-f_{Rx})t}$ in Equation 12 on a symbol-by-symbol basis. In this case, the receiver only needs to operate assuming that the carrier frequencies of the transmitter and the receiver coincide with each other. However, in this technique, when the bandwidth part having different frequency positions for UEs is configured as in the NR system, the BS must perform phase pre-compensation using different values for each UE. Accordingly, with this technique, the receiver operation of the UE becomes very simple, but the transmitter operation of the BS becomes very complicated.

Technique C: The Transmitter and the Receiver Perform Phase Pre-Compensation Assuming a Common Reference Point.

In this technique, the transmitter does not use the information about the carrier frequency of the receiver (and the receiver does not use the information about the carrier frequency of the transmitter). Instead, a common reference point is predefined between the transmitter and the receiver and phase pre-compensation for the reference point is performed on a symbol-by-symbol basis. For example, the transmitter performs phase (pre-)compensation on the phase discontinuity occurring due to $e^{j2\pi(f_{Tx}-f_{common})t}$ and the receiver performs phase (pre-)compensation on the phase discontinuity occurring due to $e^{j2\pi(f_{common}-f_{Rx})t}$. As a particular example, in some scenarios Equation 5, above, may be modified for phase pre-compensation as follows.

Equation 14

$$s_l^{(p,\mu)}(t) = \lambda_l^\mu \sum_{k=0}^{N_{grid}^{size,\mu} N_{sc}^{RB}-1} a_{k,l}^{(p,\mu)} \cdot e^{j2\pi(k+k_0^\mu - N_{grid}^{size,\mu} N_{sc}^{RB}/2)\Delta f(t-N_{CP,l}^\mu T_c)}$$

Here, $\Delta f_{ref}=15$ kHz, and $\lambda_l^\mu = e^{-j2\pi \cdot (p_\mu \Delta f_{ref}+\Delta)(N_{CP,l}^\mu T_c + t_{start,l}^\mu)}$, where $$p_\mu = \min\left(\underset{k \in Z^+}{\mathrm{argmin}} |f_0 - M \times 5 \text{ kHz} - k\Delta f_{ref}|\right).$$

Here M={−1, 0, 1} for bands between 0 to 2.65 GHz and M=0 for the other bands. Δ, the phase compensation value, is determined between the quantized carrier frequency and the non-quantized carrier frequency, where Δ=0 for the quantized carrier frequency, $\Delta=f_0-p_\mu\Delta f_{ref}$ for the non-quantized carrier frequency. Here $f_0$ is the carrier frequency of the receiver and k is a variable. Therefore, k that minimizes the absolute value of '$f_0-M*5$ kHz$-k\Delta f_{ref}$' may be $p_\mu$. This technique, however, is disadvantageous in that phase compensation is always performed by both the transmitter and the receiver. In addition, according to this technique, the transmitter and the receiver calculate the phase for each symbol based on the carrier frequency thereof and apply the compensation term to the signal. Therefore, assuming that all available frequencies, that is, all frequencies to which subcarriers can be mapped, can become carrier frequencies, the phase compensation term becomes a function of a very high resolution and a very long periodicity, requiring a very complex implementation.

For reference, the NR standard does not explicitly specify a particular technique for implementation. In the NR standard, a modulation and upconversion technique is defined as shown in the following table below such that the transmitting side and the receiving side respectively reset the carrier frequency to zero phase on the symbol-by-symbol basis to maintain a certain value of the phase of the carrier frequency at the starting point of each symbol (see 3GPP TS 38.211 section 5.4). This is specified in the standard document 3GPP TS 38.211 V15.1.0 as follows.

TABLE 6

5.4 Modulation and upconversion

Modulation and upconversion to the carrier frequency $f_0$ of the complex-valued OFDM baseband signal for antenna port p, subcarrier spacing configuration μ, and OFDM symbol l in a subframe assumed to start at t = 0 is given by $$\mathrm{Re}\left\{s_l^{(p,\mu)}(t) \cdot e^{j2\pi f_0(t-t_{start,l}^\mu - N_{CP,l}^\mu T_c)}\right\}$$

for all channels and signals except PRACH and by
$\mathrm{Re}\{s_l^{(p,\mu)}(t) \cdot e^{j2\pi f_0 t}\}$
for PRACH.

Figure 3:
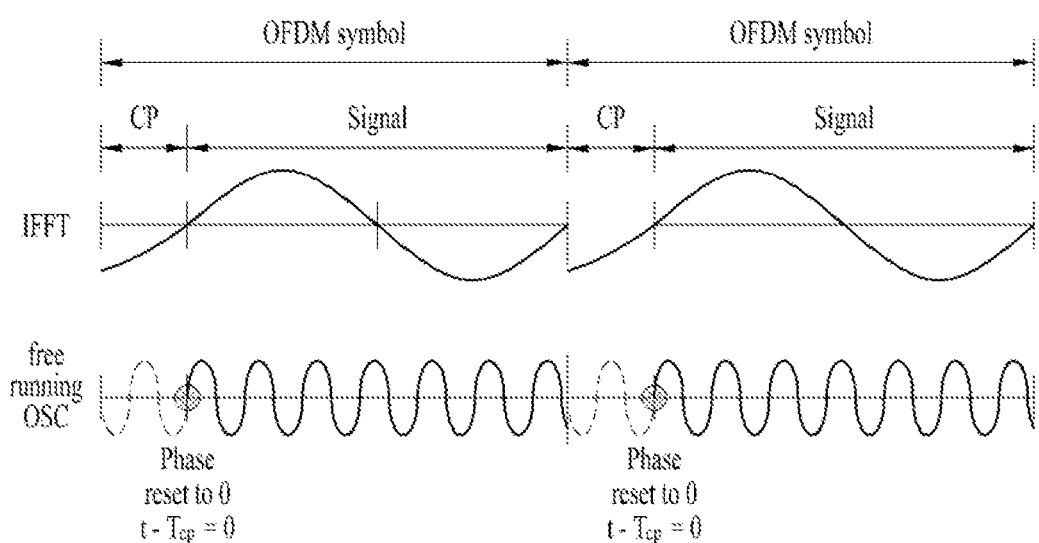
FIG. 3 illustrates an example of resetting the phase at a symbol boundary.

FIG. 3 illustrates an example of resetting the phase at a symbol boundary. That is, FIG. 3 is a diagram illustrating an example of phase compensation defined in the NR standard. In FIG. 3, $T_{CP}$ corresponds to $t_{start,l}^\mu + N_{CP,l}^\mu T_c$ of Table 6. If the carrier frequency used by the transmitting side to transmit a signal does not match the carrier frequency used by the receiving side to receive the signal, the signals downconverted at the receiving side will have different phases according to symbols. Referring to Table 6 and FIG. 3, in the frequency upconversion process, a time shift is performed for the transmitted signal by $t_{start,l}^\mu + N_{CP,l}^\mu T_c$ to reset the phase. Therefore, the phase discontinuity occurring in each symbol due to the carrier frequency is eliminated at the transmitting side and the receiving side, and consequently, phase discontinuity/mismatch between symbols is eliminated from the signal received by the receiving side. This may be expressed as the following equation.

Equation 15

$$\hat{x}^{(p,\mu)}(t) = \sum_{k=0}^{N_{grid}^{size,\mu} N_{sc}^{RB}-1} a_{k,l}^{(p,\mu)} \cdot e^{j2\pi(k+k_0-N_{grid}^{size,\mu} N_{sc}^{RB}/2)\Delta f(t-t_{start,l}-N_{CP,l}^\mu T_c)} \cdot$$

$$e^{j2\pi(f_{Tx}-f_{Rx})(t-t_{start,l}-N_{CP,l}^\mu T_c)}$$

When Equation 15 is rearranged to explain how Equation 15 appears in an actual implementation, the follow equation is obtained.

Equation 16

$$\hat{x}^{(p,\mu)}(t) = \sum_{k=0}^{N_{grid}^{size,\mu} N_{sc}^{RB}-1} a_{k,l}^{(p,\mu)} \cdot \left\{ e^{j2\pi\left(k+k_0-\frac{N_{grid}^{siz,\mu} N_{sc}^{RB}}{2}\right)\Delta f(t-t_{start,l}-N_{CP,l}^\mu T_c)} \right.$$

$$\left. e^{j2\pi(f_{Tx}-f_{Rx})(-t_{start,l}-N_{CP,l}^\mu T_c)} \right\} \cdot e^{j2\pi(f_{Tx}-f_{Rx})t} =$$

$$\sum_{k=0}^{N_{grid}^{size,\mu} N_{sc}^{RB}-1} a_{k,l}^{(p,\mu)} \cdot \left\{ e^{j2\pi\left(k+k_0-\frac{N_{grid}^{siz,\mu} N_{sc}^{RB}}{2}\right)\Delta f(t-t_{start,l}-N_{CP,l}^\mu T_c)} \right.$$

-continued $$e^{-j2\pi f_{Tx}\cdot(t_{start,l}+N_{CP,l}^{\mu}T_c)}\cdot e^{j2\pi f_{Tx}t}\Bigg\}\cdot$$

$$e^{j2\pi f_{Rx}\cdot(t_{start,l}+N_{CP,l}^{\mu}T_c)}\cdot e^{-j2\pi f_{Rx}t}\sum_{k=0}^{N_{grid}^{size,\mu}N_{sc}^{RB}-1}a_{k,l}^{(p,\mu)}\cdot$$

$$\left\{e^{j2\pi\left(k+k_0-\frac{N_{grid}^{size,\mu}N_{sc}^{RB}}{2}\right)\Delta f\left(t-t_{start,l}-N_{CP,l}^{\mu}T_c\right)}\cdot e^{j\psi_{Tx,l}}\cdot e^{j2\pi f_{Tx}t}\right\}\cdot$$

$$e^{j\psi_{Rx,l}}\cdot e^{j2\pi f_{Rx}t}$$

Techniques for adding phase discontinuity/mismatch described thus far define a phase reset at the carrier frequency level. For actual upconversion (or downconversion) of the carrier frequency level, components such as a phase-locked loop (PLL) and a mixer are used.

Figure 4A:
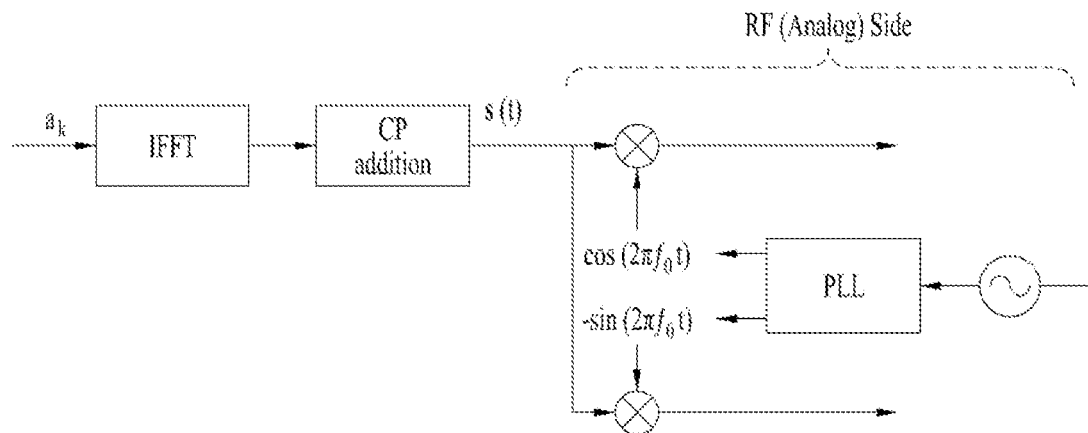
FIGS. 4A and 4B illustrate examples of generation of a baseband signal and modulation and upconversion to a carrier frequency thereof according to some implementations of the present disclosure.
Figure 4B:
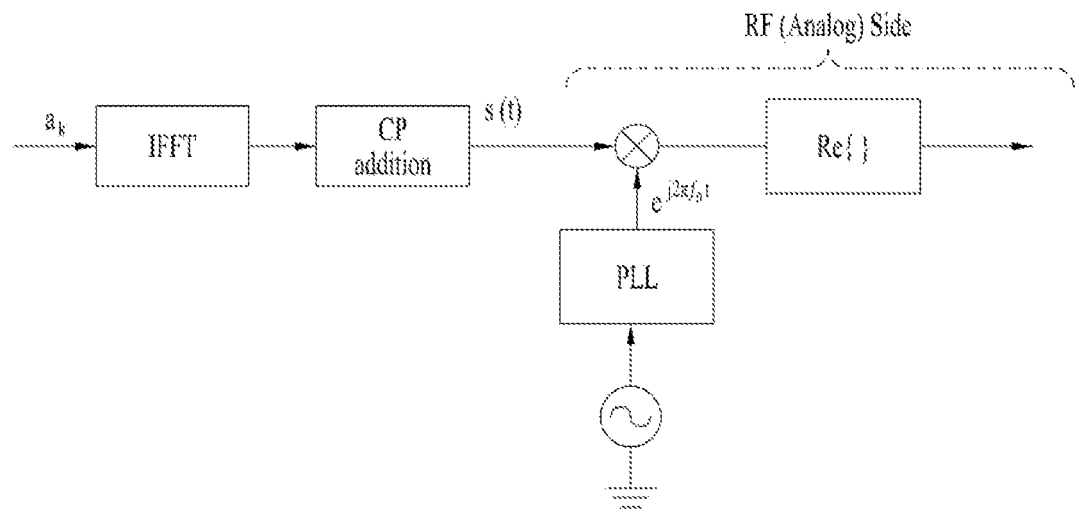

FIGS. 4A and 4B are examples of generation of a baseband signal and modulation and upconversion to a carrier frequency thereof, according to some implementations of the present disclosure.

Referring to FIGS. 4A and 4B, for example, a carrier frequency for actual upconversion (or downconversion) is generated using the PLL, and the mixer or the like is used for upconversion to the carrier frequency. Components such as the PLL and the mixer are implemented as analog devices or operate at very high speeds, and therefore in some scenarios it may be difficult to implement a phase reset at the carrier frequency level at the transmitting and receiving sides.

In other words, referring to Table 6, the NR standard specifies that a phase reset should be implemented by directly controlling the phase of the carrier frequency. However, in some scenarios, it may be difficult in reality to directly control the phase of the carrier frequency. Therefore, due to this practical difficulty of directly controlling the phase at the carrier frequency, some systems perform upconversion and downconversion using a carrier frequency having a continuous phase at the carrier frequency level, and further implement, at the baseband level, a phase reset function for eliminating the resulting phase discontinuity/mismatch between the symbols caused by upconversion/downcoversion at the analog level.

In such systems, referring to Equation 16, upconversion and downconversion at the carrier frequency level using a carrier frequency having a continuous phase corresponds to $e^{j2\pi f_{Tx}t}$ and $e^{j2\pi f_{Rx}t}$, respectively. The frequencies $f_{Tx}$ and $f_{Rx}$ may be arbitrary frequencies to which subcarriers are mapped, and may be expressed as $f_{Tx}=N_{Tx}*\Delta f+\Delta_{offset}$ and $f_{Rx}=N_{Rx}*\Delta f+\Delta_{offset}$, respectively, using the subcarrier spacing $\Delta f$. Herein, the subscripts Tx and Rx denote the transmitting side and the receiving side, respectively. As described in regards to Equation 12, above, the term $N_{Tx}$ is a positive integer closest to $f_{Tx}/\Delta f$ (e.g., floor$\{f_{Tx}/\Delta f\}$ or ceil$\{f_{Tx}/\Delta f\}$), the term $N_{Rx}$ is a positive integer closest to $f_{Rx}/\Delta f$ (e.g., floor$\{f_{Rx}/\Delta f\}$ or ceil$\{f_{Rx}/\Delta f\}$), and the term $\Delta_{offset}$ is a real number whose magnitude is smaller than $\Delta f$. In the description of the present disclosure, $f_{Tx}$ and $f_{Rx}$ are expressed using the same $\Delta_{offset}$ for simplicity, but $\Delta_{offset}$ may differ between $f_{Tx}$ and $f_{Rx}$. Referring to Equation 16, the phase reset function at the baseband level corresponds to $e^{j\psi_{Tx,l}}$ and $e^{j\psi_{Rx,l}}$.

Therefore, in such systems, the transmitting side and the receiving side compensate the phase using only their respective carrier frequencies, which correspond to $\psi_{Tx,l}=-2\pi f_{Tx}(t_{start,l}+N_{CP,l}^{\mu}T_c)$ and $\psi_{Rx,l}=2\pi f_{Rx}(t_{start,l}+N_{CP,l}^{\mu}T_c)$ in Equation 16, respectively. This corresponds to the transmitting side performing phase compensation assuming that the receiver uses the direct current (DC) tone, i.e., 0, as the carrier frequency for downconversion, and the receiving side performing phase compensation assuming that the transmitter uses the DC tone as the carrier frequency for upconversion. In such scenarios, if the transmitting side and the receiving side operate without information about the carrier frequency, then the term $e^{j2\pi(f_{Tx}-f_{Rx})t}$ in Equation 13 is equal to $e^{j2\pi(f_{Tx}-0)t}\cdot e^{j2\pi(0-f_{Rx})t}$.

Therefore, the current NR standard (3GPP TS 38.211 V15.1.0) may be understood as specifying that the transmitting side utilizes $e^{j2\pi f_{Tx}(t-T_{CP})}$ for upconversion on the assumption that the carrier frequency used for downconversion is 0 and, analogously, that the receiving side utilizes $e^{-j2\pi f_{Rx}(t-T_{CP})}$ for downconversion on the assumption that the carrier frequency used by the transmitting side for upconversion is 0.

As discussed above (regarding Techniques A to C), some wireless communication systems that are based on the NR standard may apply a phase compensation term by calculating the phase in every symbol based on the carrier frequency. However, considering the myriad applicable or available frequencies as $f_{XX}$ (where XX is $T_X$ or $R_X$), this phase compensation term may become a function of a very high resolution and a very long periodicity, potentially imposing a very complex implementation.

To address such challenges, the present disclosure describes implementations for addressing scenarios where the transmitter and the receiver operate without knowing the carrier frequency used for transmission or without knowledge of the upconversion/downconversion frequency.

Techniques for Lowering Complexity

The current NR standard defines the following numerologies (see, e.g., section 5.4 of 3GPP TS 38.101-1 and section 5.4 of 3GPP TS 38.101-2).

TABLE 7

| Frequency range | Range covered | $\Delta F_{Global}$ | $F_{REF-Offs}$ | $N_{REF-Offs}$ | Range of $N_{REF}$ |
| --- | --- | --- | --- | --- | --- |
| FR1 | 0~3000 MHz | 5 kHz | 0 MHz | 0 | 0~599999 |
| FR1 | 3000~24250 MHz | 15 kHz | 30000 MHz | 600000 | 600000~2016666 |
| FR2 | 24250~100000 MHz | 60 kHz | 24250.8 MHz | 2016667 | 2016667~3279165 |

TABLE 8

| Frequency range | Range covered | SS Block frequency position $SS_{REF}$ | GSCN | Range of GSCN |
|---|---|---|---|---|
| FR1 | 0~2700 MHz | N * 900 kHz + M*[TBD 70~100 kHz] N = 1:3000, M = −1:1 | 3N + M − 1 | 1~[8999] |
| FR1 | 2700~24250 MHz | 2400 MHz + N * 1.44 MHz N = 0:15173 | [9000 + N] | [9000~24173] |
| FR2 | 24250~100000 MHz | 24250.08 MHz + N * 17.28 MHz, N = 0:4383 | [24174 + N] | [24174~28557] |

The NR standard has two major frequency ranges (FR) specified in 3GPP. One is commonly referred to as sub-6 GHz and corresponds to frequency range FR1 in Tables 7 and 8 and the other is referred to as millimeter wave and corresponds to frequency range FR2 in Tables 7 and 8. Depending on the frequency range, the maximum bandwidth and the available subcarrier spacing(s) differ.

Table 7 shows the channel raster, i.e., the NR-ARFCH definition, and Table 8 shows the synchronization raster.

The channel raster defines a set of RF reference frequencies that are used to identify radio frequency (RF) channel positions. The RF reference frequencies for RF channels are mapped to resource elements on the carrier. A global frequency raster is defined for all frequencies from 0 to 100 GHz and is used to define a set of allowed RF reference frequencies. The granularity of the global frequency raster is $\Delta F_{Global}$. For each operating band, a subset of frequencies from the global frequency raster is applicable to that band and forms a channel raster for that band with the granularity $\Delta F_{Global}$.

The synchronization raster represents the frequency position of a synchronization (SS) block that can be used by the UE for system acquisition when there is no explicit signaling about the SS block position. A global synchronization raster is defined for all frequencies and the frequency position of the SS block is defined as $SS_{REF}$ with the corresponding global synchronization channel number (GSCN).

Mapping between the synchronization raster and the corresponding resource elements of the SS block is given in Table 8. The mapping depends on the total number of RBs allocated in the channel and is applied to both UL and DL. Table 8 shows the position of resource element (RE) #0 (i.e., subcarrier #0) of RB #10 of the SS block. The SS block is composed of twenty RBs. When twenty RBs constituting the SS block are indexed from 0 to 19, the frequency indicated by the synchronization raster corresponds to the first RE, i.e., the position of the first subcarrier of RB #10 among RB #0 to RB #19.

The channel raster and the SS raster are fixed to certain values as shown in Tables 7 and 8. Therefore, if the carrier frequency is expressed as $f_{Tx}=N_{Tx}*\Delta f+\Delta_{offset}$, then the offset term $\Delta_{offset}$ may be limited to some specific values (e.g., −5 kHz, 0 or 5 kHz) for frequency range FR1 (<3 GHz) and be 0 for the remaining frequency bands. In the above expression, as discussed in regards to Equation 12, the term $\Delta f$ is the subcarrier spacing, the term $N_{Tx}$ is a positive integer closest to $f_{Tx}/\Delta f$ (e.g., floor$\{f_{Tx}/\Delta f\}$ or ceil$\{f_{Tx}/\Delta f\}$), and the term $\Delta_{offset}$ is a real number whose magnitude is smaller than $\Delta f$ (hereinafter, descriptions that are applied to $f_{Tx}$ are also applicable to $f_{Rx}$).

In addition, the numbers of samples, including the number of samples for a cyclic prefix (CP), which are used for each symbol in the current LTE/NR communication system are integer multiples of 16 for every subcarrier spacing with respect to a sample time determined based on $\Delta_f$. That is, the CP length is 144=16*9 or 160=16*10, and the length of the signal part of the OFDM symbol other than the CP part is 2048=16*128. For example, for a bandwidth of 20 MHz, which is the $\Delta f$=15 kHz subcarrier spacing in the LTE or NR standard, the sampling frequency is 30.72 MHz, one subframe (or one slot) is composed of 30720 samples, and each OFDM symbol is composed of 2048+144 sample times or 2048+160 sample times. For reference, in the description of the present disclosure, each sample time $T_s$ is 1/(30.72 MHz), i.e., $T_s=1/(2048*15*10^3$ kHz).

In some scenarios, NR and LTE systems may use values that are proportional to the numerology corresponding to the bandwidth of 20 MHz, which is a $\Delta f$=15 kHz subcarrier spacing, as numerologies, and therefore it should be noted that all frequencies described in the present disclosure are based on the numerology corresponding to the bandwidth of 20 MHz, which is a 15 kHz subcarrier spacing. Here, 2048 is the signal length (i.e., the effective symbol length of the OFDM symbol) defined by the FFT size when the numerology above (e.g., the 15 kHz subcarrier spacing and the 20 MHz bandwidth) is used, 144 and 160 correspond to cyclic prefix (CP) lengths when the numerology above (e.g., the $\Delta f$=15 kHz subcarrier spacing and the 20 MHz bandwidth) is used.

The phase reset for the transmitted signal and the received signal may be implemented, for example, to address scenarios where the signal periodicity according to the upconversion frequency is not an integer multiple of the OFDM symbol length, where the OFDM symbol length is equal to the length of the cyclic prefix (CP) part plus the length of the signal part. Therefore, in some scenarios, if a carrier frequency according to which an integer multiple of the signal periodicity has a periodicity corresponding to the OFDM symbol length is used, then phase reset may not be implemented.

For example, consider a communication system in which the cyclic prefix (CP) part of an OFDM symbol consists of 144=16*9 samples or 160=16*10 samples, and the signal part of the OFDM symbol consists of 2048=16*128 samples, and the IFFT/FFT size is 2048. In such a system, no phase reset would be required if the upconversion frequency is set to a frequency with a periodicity of 16 samples, or frequency $1/(16*T_s)$, where 16 is the greatest common divisor of {144, 160, 2048}. Substituting for the sampling time $T_s$, then this corresponds to an upconversion frequency equal to $1/(16*T_s)=1/\{16*1/(FFT\ size*\Delta f)\}=1/\{16*1/(2048*\Delta f)\}=128\Delta f$. As such, if the upconversion frequency is set to the value $1/(16*T_s)=128\Delta f$, then no phase reset would be required.

The reason for this is that a frequency having a periodicity of 16 samples (16 being the greatest common divisor of 144, 160, and 2048) has the same phase at the beginning of each signal part of the OFDM symbols. In particular, this is because for a sine wave having a period of 16*$T_s$, nine such sine waves are included in a CP part having a length of 144 $T_s$, 10 such sine waves are included in a CP part having a length of 160 $T_s$, and 128 such sine waves are included in a CP part having a length of 2048 $T_s$. For example, considering the minimum subcarrier spacing $\Delta f=15$ kHz supported by the NR system, if a carrier frequency corresponding to an integer multiple of 15 kHz*2048/16=15 kHz*128=1.92 MHz is used, then the phase naturally becomes 0 at the beginning of the signal part of each OFDM symbol, and therefore problems of phase offset do not occur.

Further, according to a numerology having a subcarrier spacing of $\Delta f=15$ kHz, cyclic prefix (CP) lengths of 144 $T_s$ and 160 $T_s$, and a signal part (i.e., effective symbol) length 2048 $T_s$ of an OFDM symbol, the phase would be 0 even at the CP start point in the case of a frequency corresponding to an integer multiple of 1.92 MHz. In more general terms, when a plurality of CP lengths (e.g., $N_{CP,1}$, $N_{CP,2}$, ...) are defined for OFDM symbol signal generation and the number of effective samples per OFDM symbol, i.e., the number of samples (i.e., IFFT/FFT size) in the signal part except the CP in an OFDM symbol, is $N_{sample}$, then a frequency that does not cause phase discontinuity per symbol would be a frequency of which one period corresponds to samples the number of which corresponds to the greatest common divisor of $\{N_{CP,1}, N_{CP,2}, \ldots, N_{sample}\}$.

Such a frequency that does not cause phase discontinuity per symbol may be expressed using a subcarrier spacing as follows:

$$N_{base}\Delta f = \frac{N_{sample}}{gcd\{N_{CP,1}, N_{CP,2}, \ldots, N_{sample}\}} \Delta f.$$

Here, $gcd\{N_{CP,1}, N_{CP,2}, \ldots, N_{sample}\}$ is the greatest common divisor of $N_{CP,1}, N_{CP,2}, \ldots,$ and $N_{sample}$.

Applying this to the aforementioned numerology of 2048, 160 and 144 yields $N_{base}\Delta f=128\Delta f$ the FFT size=4096 is used, then the cyclic prefix (CP) lengths are changed to 144*2 and 160*2 in the NR standard. Thus, applying the changed CP lengths to $$N_{base}\Delta f = \frac{N_{sample}}{gcd\{N_{CP,1}, N_{CP,2}, \ldots, N_{sample}\}} \Delta f$$

yields the same result of $N_{base}=128$.

As another example, even when the FFT size is reduced from 2048 to, for example, FFT size=1024, the CP lengths are changed to 144/2=72 and 160/2=80. Therefore, applying the changed CP lengths to $$N_{base}\Delta f = \frac{N_{sample}}{gcd\{N_{CP,1}, N_{CP,2}, \ldots, N_{sample}\}} \Delta f$$

yields the same result of $N_{base}=128$.

Hereinafter, the present disclosure describes implementations of communication systems (e.g., LTE system, or an NR system) in which the length of the cyclic prefix (CP) part and the length of the signal part are 144*2μ or 160*$2^\mu$ and the length of the signal part of the OFDM symbol is 2048*$2^\mu$ (where μ is an integer), as an example.

In such scenarios, a frequency that does not cause phase discontinuity may be represented using 128$\Delta f$. However, implementations are not limited thereto, and the present disclosure is applicable even in scenarios where a CP length and a signal part length different from the illustrated CP length and signal part length are used.

For example, implementations of the present disclosure may be applied in scenarios where a frequency having one period corresponding to samples whose number corresponds to the greatest common divisor of $\{N_{CP,1}, N_{CP,2}, \ldots N_{sample}\}$ is used as a base carrier frequency $f_{base}$, that is, where an integer multiple of $$\frac{N_{sample}}{gcd\{N_{CP,1}, N_{CP,2}, \ldots, N_{sample}\}} \Delta f$$

is used as $f_{base}$.

As such, in the following description, the base carrier frequency $f_{base}$, which was described above as an integer multiple of 128$\Delta f$, may be generalized to an integer multiple of a frequency having one period corresponding to a number of samples which corresponds to the greatest common divisor of $\{N_{CP,1}, N_{CP,2}, \ldots, N_{sample}\}$, or an integer multiple of $$\frac{N_{sample}}{gcd\{N_{CP,1}, N_{CP,2}, \ldots, N_{sample}\}} \Delta f.$$

For the scenario of using a base carrier frequency of 128$\Delta f$, the $f_{Tx}$ can be expressed as follows:

$$f_{Tx} = N_{Tx} \cdot \Delta f + \Delta_{offset} = Nfrac_{offset_{base}} frac_{offset_{int}} \quad \text{Equation 17}$$

Here, the term $\lfloor N_{Tx}/128 \rfloor_{int}$, the term $N_{frac}=\text{modulo}(N_{Tx}, 128)$, the term $f_{base}$ is the quantized (down-quantized, e.g., with a floor function) version obtained with a resolution of 128$\Delta f$ (e.g., 1.92 MHz resolution when $\Delta f$ 15 kHz) among the carrier frequencies, and the term $f_{frac}$ is a version quantized with $\Delta f$ for differences between $f_{base}$ and $f_{Tx}$.

The term $\Delta_{offset}$ represents the offset from the frequency in units of $\Delta f=15$ kHz. In the NR system, $\Delta_{offset}$ may be set to be +/−5, 0 kHz, for example. In particular, $\Delta_{offset}$ may be defined to be one of −5 kHz, 5 kHz, and 0 kHz based on the $\Delta f=15$ kHz subcarrier spacing. In some implementations, $N_{int}$ may be replaced by the round function instead of the floor function. In this case, $N_{frac}$ may be defined as $N_{frac}=N_{Tx}-128*\text{round}(N_{Tx}/128)$. When Nit is replaced by the round function instead of the floor function, other operations except $N_{frac}=N_{Tx}-128*\text{round}(N_{Tx}/128)$ are the same as when $N_{int}$ is defined as the floor function.

In Equation 17, the base carrier frequency $f_{base}$ frequency for always resetting the phase to a certain value in an OFDM symbol unit. Therefore, the expression $\psi_{Tx,l}=-2\pi f_{Tx}(t_{start,l}+N_{CP,l}^\mu T_c)$ corresponding to phase compensation has the same value as $\psi_{Tx,l}=-2\pi(N_{frac}\Delta f+\Delta_{offset})\cdot(t_{start,l}+N_{CP,l}^\mu T_c)$.

Considering only the normal cyclic prefix (CP), the value of the phase compensation term $\psi_{Tx,l}=2\pi(N_{frac}\Delta f+\Delta_{offset})\cdot(t_{start,l}+N_{CP,l}^\mu T_c)$ to be applied to one symbol for the carrier frequency difference between the transmitter and the receiver is one of 128*3 complex values according to combinations of $N_{frac}=0, \ldots, 127$ and $\Delta_{offset}=-5$ kHz, 0 kHz, 5 kHz, and is one of 128 complex values (e.g., $N_{frac}= 0, \ldots, 127$) for frequency range FR1 (>3 GHz) with $\Delta_{offset}=0$ or frequency range FR2. The phase compensation values to be applied to a plurality of symbols constituting a predetermined time unit (e.g., slot, subframe, 1 ms, etc.) with respect to a carrier frequency difference between the transmitter and the receiver differ among the symbols.

Therefore, if a set of phase compensation values for the plurality of symbols is expressed as a sequence, considering only the normal cyclic prefix (CP), the phase compensation term $\psi_{Tx,l} = -2\pi(N_{frac}\Delta f + \gamma_{offset}) \cdot (t_{start,l}^{\mu} + N_{CP,l}^{\mu}T_c)$ needs 128*3 sequences according to the combinations of $N_{frac} = 0, \ldots, 127$ and $\Delta_{offset} = -5$ kHz, 0 kHz, 5 kHz. If the number of possible values of $\Delta_{offset}$ is changed to b other than 3, then 128*b sequences may be needed for phase compensation. For the frequency range FR1 (>3 GHz) with $\Delta_{offset} = 0$ or FR2, only 128 sequences (e.g., $N_{frac} = 0, \ldots, 127$) may be needed. Here, the phase compensation term has a period of up to 1 ms. That is, assuming that one period of the signal part of each OFDM symbol is 2048 sample times, if the phase value for a specific carrier frequency at an arbitrary OFDM symbol boundary is $a_{k,l}$, the same phase value a appears after 2048 sample times, i.e., 1 ms, since the sample time $T_s = 1/15000 * 2048$ seconds. $f_{Tx} = N_{int} * 128 \Delta f + N_{frac} * \Delta f + \Delta_{offset}$, and phase compensation is not needed for $N_{ini} * 128 \Delta f$. Therefore, in the NR system, the phase compensation term $\psi_{Tx,l} = -2\pi f_{Tx}(t_{start,l} + N_{CP,l}^{\mu}T_c)$ can be calculated as follows.

$$\psi_{Tx,l} = -2\pi(N_{frac}\Delta f + \Delta_{offset}) \cdot (t_{start,l} + N_{CP,l}^{\mu}T_c) \quad \text{Equation 18}$$

Using the original definition of carrier frequency $f_{Tx} = N'_{Tx} * \Delta f + \Delta_{offset}$, the final signal at the transmitting side can be given as follows.

$$x^{(p,\mu)}(t) = \sum_{k=0}^{N_{grid}^{size,\mu} N_{sc}^{RB} - 1} a_{k,l}^{(p,\mu)} \cdot \left\{ e^{j2\pi\left(k+k_0 - \frac{N_{grid}^{size,\mu} N_{sc}^{RB}}{2}\right)\Delta f\left(t - t_{start,l} - N_{CP,l}^{\mu}T_c\right)} \cdot e^{j\psi_{Tx,l}} \right\} \cdot e^{j2\pi f_{Tx} t} \quad \text{Equation 19}$$

Implementation 1

In Implementation 1, the carrier frequency $f_{Tx}$ is used for frequency upconversion using a free-running OSC and the carrier frequency $f_{Rx}$ is used for frequency downconversion using the free-running OSC.

Figure 5A:
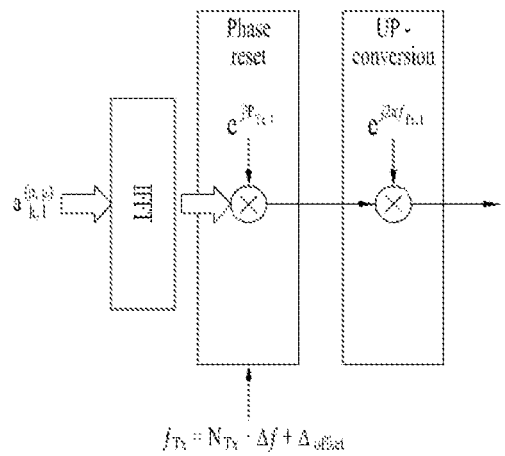
FIGS. 5A to 5C are diagrams illustrating examples of Implementation 1 of the present disclosure.
Figure 5B:
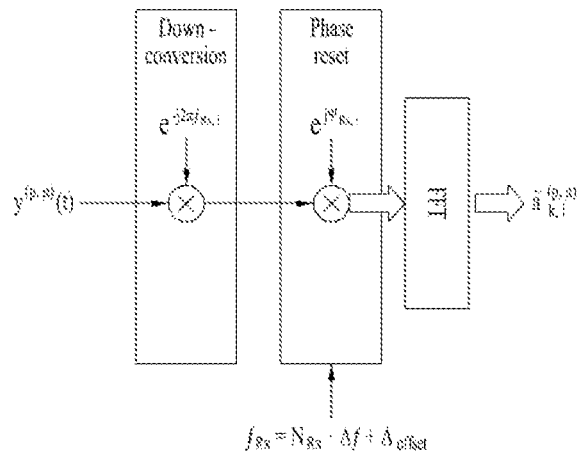
Figure 5C:
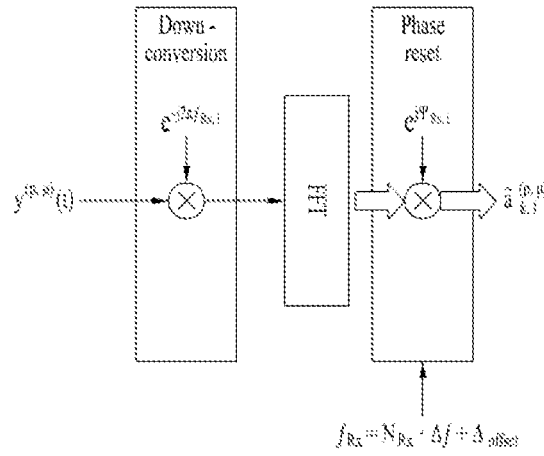

FIGS. 5A to 5C are diagrams illustrating examples of Implementation 1 of the present disclosure. Particularly, FIG. 5A shows an example of a part of the transmitting side structure according to Implementation 1, and FIGS. 5B and 5C show examples of a part of the receiving side structure according to Implementation 1.

Referring to FIG. 5A, before up-converting the OFDM baseband signal to the carrier frequency, the transmitting side performs multiplication on the signal at each symbol by using one complex-valued sequence (i.e., performing phase reset) calculated with respect to the carrier frequency $f_{Tx}$, among the 128 complex-valued sequences or among the 128*3 complex-valued sequences. Then, the transmitting side performs upconversion using $f_{Tx}$. One of the 128 complex-valued sequences (or one of 128*3 complex-valued sequences) for the carrier frequency $f_{Tx}$, is used for phase compensation, and a plurality of elements constituting the corresponding complex-valued sequence is applied to a plurality of OFDM symbols in one-to-one correspondence.

Implementation 1 is performed in an analogous way at the receiving side. An example of an operation of Implementation 1 at the receiving side is described in detail below.

In scenarios where the carrier frequency is expressed as $f_{Rx} = N_{Rx} * \Delta f + \Delta_{offset}$, then the $\Delta_{offset}$ may be −5 kHz, 0 kHz or 5 kHz in frequency range FR1 (<3 GHz) at the receiver and is 0 kHz in the other frequency bands, as described above for the transmitter structure. In addition, the numbers of samples, including the number of samples for a cyclic prefix (CP), which are used for each symbol in the current LTE/NR communication system are integer multiples of 16 for every subcarrier spacing with respect to a sample time determined based on $\Delta f$. Therefore, in this case, when $\Delta f = 15$ kHz, if a carrier frequency corresponding to an integer multiple of 15 kHz*2048/16 = 15 kHz*128 = 1.92 MHz is used for downconversion, then the phase of the signal part (i.e., valid symbol) will naturally start with 0 at every OFDM symbol, and therefore the aforementioned issue may not be raised. In addition, given a subcarrier spacing of $\Delta f = 15$ kHz, CP lengths of 160 $T_s$ and 144 $T_s$, and an effective symbol length of 2048 $T_s$, which correspond to the numerology currently available in the LTE and NR systems, the phase is 0 even at the CP start point in the case of a frequency corresponding to an integer multiple of 1.92 MHz.

More generally, when a plurality of cyclic prefix (CP) lengths (e.g., $N_{CP,1}$, $N_{CP,2}$, . . . ) is defined for OFDM symbol signal generation and the number of effective samples per OFDM, i.e., the number of samples (i.e., IFFT/FFT size) in the signal part except the CP in an OFDM symbol, is $N_{sample}$, then a frequency of which one period corresponds to samples the number of which corresponds to the greatest common divisor of $\{N_{CP,1}, N_{CP,2}, \ldots, N_{sample}\}$ is a frequency that does not cause phase discontinuity per symbol. Such a frequency that does not cause phase discontinuity per symbol may be expressed using a subcarrier spacing, as follows:

$$N_{base}\Delta f = \frac{N_{sample}}{gcd\{N_{CP,1}, N_{CP,2}, \ldots, N_{sample}\}}\Delta f.$$

Here, $gcd\{N_{CP,1}, N_{CP,2}, \ldots, N_{sample}\}$ is the greatest common divisor of $N_{CP,1}, N_{CP,2}, \ldots$, and $N_{sample}$.

Applying this to the aforementioned numerology (i.e., 2048, 160, 144) yields $N_{base}\Delta f = 128\Delta f$. If the FFT size=4096 is used in the example of the bandwidth of 20 MHz, which is the $\Delta f = 15$ kHz subcarrier spacing, the cyclic prefix (CP) lengths are changed to 144*2 and 160*2 in the NR standard. Thus, applying the changed CP lengths to $$N_{base}\Delta f = \frac{N_{sample}}{gcd\{N_{CP,1}, N_{CP,2}, \ldots, N_{sample}\}}\Delta f$$

yields the same result of $N_{base} = 128$. As another example, even when the FFT size is reduced from 2048 to, for example, FFT size=1024, the CP lengths are changed to 144/2=72 and 160/2=80. Therefore, applying the changed CP lengths to $$N_{base}\Delta f = \frac{N_{sample}}{gcd\{N_{CP,1}, N_{CP,2}, \ldots, N_{sample}\}}\Delta f$$

yields the same result of $N_{base}$=128. As mentioned above, the frequency not causing phase discontinuity will be represented using 128Δf below.

Using 128Δf, the $f_{Rx}$ can be expressed as:

$$f_{Rx} = N_{Rx} \cdot \Delta f + \Delta_{offset} = N_{frac_{offset_{base}} frac_{offset_{int}}} \quad \text{Equation 20}$$

Here, $N\lfloor N_{Rx}/128 \rfloor_{int}$, $N_{frac}$=modulo($N_{Rx}$,128), $f_{base}$ is the quantized (down-quantized, i.e., with a floor function applied) version obtained with a resolution of 128Δf (e.g., 1.92 MHz resolution when Δf=15 kHz) among the carrier frequencies, and $f_{rac}$ is a version quantized with Δf for differences between $f_{base}$ and $f_{Rx}$. The $\Delta_{offset}$ represents the amount off the frequency in units of Δf=15 kHz. In the NR system, $\Delta_{offset}$ may be set to be +/−5, 0 kHz, for example. In particular, $\Delta_{offset}$ may be defined to be one of −5 kHz, 5 kHz, and 0 kHz based on the Δf=15 kHz subcarrier spacing. In some implementations, the $N_{int}$ may be replaced by the round function instead of the floor function. In this case, $N_{frac}$ can be defined as $N_{frac}=N_{Tx}-128*\text{round}(N_{Tx}/128)$. When $N_{int}$ is implemented by the round function instead of the floor function, then other operations except $N_{frac}=N_{Tx}-128*\text{round}(N_{Tx}/128)$ are the same as when $N_{int}$ is defined as the floor function.

In Equation 20, $f_{base}$ is a frequency for always resetting the phase to a certain value in an OFDM symbol unit, and therefore $\psi_{Rx,l}=2\pi f_{Rx}(t_{start,l}+N_{CP,l}^{\mu}T_c)$ corresponding to phase compensation has the same value as $\psi_{Rx,l}=2\pi(N_{frac}\Delta f+\Delta_{offset})\cdot(t_{start,l}+N_{CP,l}^{\mu}T_c)$. Therefore, considering only the normal cyclic prefix (CP), the phase compensation term $\psi_{Rx,l}=2\pi(N_{frac}\Delta f+\Delta_{offset})\cdot(t_{start,l}+N_{CP,l}^{\mu}T_c)$ needs only 128*3 sequences according to combinations of $N_{frac}=0,\ldots,127$ and $\Delta_{offset}=-5$ kHz, 0, 5 kHz. If the number of possible values of $\Delta_{offset}$ is changed to a value b other than 3, then 128*b sequences may be implemented for phase compensation. For frequency range FR1 (>3 GHz) with $\Delta_{offset}=0$ or frequency range FR2, only 128 sequences (e.g., $N_{frac}=0,\ldots,127$) may be implemented. Here, the phase compensation term has a period of up to 1 ms. $f_{Tx}=N_{int}*128\Delta f+N_{frac}*\Delta f+\Delta_{offset}$, and phase compensation is not implemented for $N_{int}*128\Delta f$. Therefore, in the NR system, the phase compensation term $\psi_{Rx,l}=2\pi f_{Rx}(t_{start,l}+N_{CP,l}^{\mu}T_c)$ may be calculated as follows.

$$\psi_{Rx,l}=2\pi(N_{frac}\Delta f+\Delta_{offset})\cdot(t_{start,l}+N_{CP,l}^{\mu}T_c) \quad \text{Equation 21}$$

When the receiving side operation is defined using the original definition of carrier frequency $f_{Rx}=N_{Rx}*\Delta f+\Delta_{offset}$, then the receiving side operation according to Implementation 1 may be expressed as Equation 22 below.

$$\tilde{a}_{k,l}^{(p,\mu)} = e^{j\psi_{Rx,l}} \cdot \int \left( y^{(p,\mu)}(t) \cdot e^{-j2\pi f_{Rx}t} \right) \cdot$$

$$e^{-j2\pi\left(k+k_{0,Rx}-\frac{N_{grid}^{size,\mu}N_{sc}^{RB}}{2}\right)\Delta f\left(t-t_{start,l}-N_{CP,l}^{\mu}T_c\right)} dt \quad \text{Equation 22}$$

In Equation 22, the integral represents a function corresponding to the FFT, and the operation of Equation 22 may be expressed as shown in FIG. 5B. When analog-to-digital conversion is performed after the received signal is actually down-converted, the FFT expressed by the integral equation is implemented in the form of a discrete equation like Equation 23. The operation of Equation 23 may be expressed as shown in FIG. 5C.

$$\tilde{a}_{k,l}^{(p,\mu)} = e^{j\psi_{Rx,l}} \cdot \sum_i \left\{ \left( y^{(p,\mu)}(t) \cdot e^{-j2\pi f_{Rx}t} \cdot \delta(t-i\cdot T_c) \right) \cdot \right.$$

$$\left. e^{-j2\pi\left(k+k_{0,Rx}-\frac{N_{grid}^{size,\mu}N_{sc}^{RB}}{2}\right)\Delta f\left(i\cdot T_c-\left(t_{start,l}+N_{CP,l}^{\mu}T_c\right)\right)} \right\} \quad \text{Equation 23}$$

The difference between the examples of FIG. 5B and FIG. 5C is the position of the phase reset function, with other functions being equivalent.

After performing downconversion on the received signal using $f_{Rx}$ or performing downconversion and FFT on the received signal using $f_{Rx}$, the receiving side performs phase reset of performing multiplication on the signal at every symbol by using one complex-valued sequence calculated by the carrier frequency $f_{Rx}$, among the 128 complex-valued sequences or among the 128*3 complex-valued sequences.

The transmitting device and the receiving device according to Implementation 1 may store $$\frac{N_{sample}}{\gcd\{N_{CP,1}, N_{CP,2}, \ldots, N_{sample}\}} \text{ or }$$

$$\frac{N_{sample}}{\gcd\{N_{CP,1}, N_{CP,2}, \ldots, N_{sample}\}} * (\text{number of } \Delta_{offset})$$

sequences, or $$\frac{N_{sample}}{\gcd\{N_{CP,1}, N_{CP,2}, \ldots, N_{sample}\}} \text{ or }$$

$$\frac{N_{sample}}{\gcd\{N_{CP,1}, N_{CP,2}, \ldots, N_{sample}\}} * (\text{number of } \Delta_{offset})$$

sequences (corresponding to the value of $2\pi(N_{frac}\Delta f+\Delta_{offset})$ from $\psi_{Rx,l}=2\pi(N_{frac}\Delta f+\Delta_{offset})\cdot(t_{start,l}+N_{CP,l}^{\mu}T_c)$ excluding $(t_{start,l}+N_{CP,l}^{\mu}T_c)$), and use the same upon performing phase reset for each symbol. $(t_{start,l}+N_{CP,l}^{\mu}T_c)$ has certain values for a subcarrier spacing. Therefore, if the values of $2\pi(N_{frac}\Delta f+\Delta_{offset})$ are fixed to the $$\frac{N_{sample}}{\gcd\{N_{CP,1}, N_{CP,2}, \ldots, N_{sample}\}} \text{ or }$$

$$\frac{N_{sample}}{\gcd\{N_{CP,1}, N_{CP,2}, \ldots, N_{sample}\}} * (\text{number of } \Delta_{offset})$$

sequences according to Implementation 1 of the present disclosure, the phase compensation for the corresponding symbol on a symbol-by-symbol basis may be performed by simply selecting one of the sequences, and therefore phase reset may be easily implemented in the transmitting device and the receiving device.

As such, according to some implementations of the present disclosure, when the carrier frequency is changed, the sequence for phase compensation may also be changed, but the changed sequence is one of only 128 or 128*3 possible sequences. Therefore, in some implementations of the present disclosure, each of the transmitting side and the receiving side may store a sequence composed of phase compensation values to be applied to OFDM symbols corresponding to a positive integer multiple of a period in which phase changes, for each available carrier frequency, and perform phase compensation by applying a sequence corresponding to a specific carrier frequency in every period during processing of OFDM symbol signals using the specific carrier frequency.

For example, if the phase of the OFDM symbols changes with a periodicity of 1 ms and 14 OFDM symbols are included in the 1 ms period, then the phase compensation value sequence for a specific carrier frequency is composed of 14 phase compensation values for each of the 14 OFDM symbols. The transmitting side and the receiving side may store a phase compensation value sequence to be applied at intervals of 1 ms for each carrier frequency, and may use a stored phase compensation value sequence to perform phase compensation on the corresponding carrier frequency.

Implementation 2.

Similar to Implementation 1, Implementation 2 also uses a base carrier frequency of $f_{base}$ $N_{int}*128\Delta f$ to facilitate performing phase reset or to facilitate addressing phase mismatch between OFDM symbols. Here, the term $f_{base}$ is a frequency that is closest to $f_{XX}$ (where the subscript XX is $T_X$ for the transmitting side and Rx for the receiving side) among the frequencies which are integer multiples of $128\Delta f$ (e.g., among frequencies less than or equal to $f_{XX}$ or among frequencies greater than or equal to $f_{XX}$ or among frequencies on both sides of $f_{TX}$). Hereinafter, $f_{base}$ is represented by $N_{int}*128\Delta f$ (where $N_{int}$ is an integer).

By way of comparison, in Implementation 1 described above, the carrier frequency $f_{Tx}$ was used for frequency upconversion using a free-running OSC (i.e., an analog OSC) and the carrier frequency fib, is used for frequency downconversion using the free-running OSC.

By contrast, in Implementation 2, the base carrier frequency $f_{base}=N_{int}*128\Delta f$ of $f_{XX}$ is used to perform frequency shift (e.g., frequency shift with a free-running OSC) at the analog stage, and the frequency difference '$f_{XX}-N_{int}*128\Delta f$' of $f_{XX}$ is used to perform frequency shift at the digital stage. When $N_{int}*128\Delta f$ is used as the upconversion/downconversion frequency in the free-running OSC, the same phase shift value is given for the OFDM symbols (i.e., the phases at the beginning of the signal parts of the OFDM symbols are the same). Therefore, when $N_{int}*128\Delta f$ is used as the upconversion/downconversion frequency in the free-running OSC, it may not be necessary to calculate and apply a phase shift value per OFDM symbol for phase compensation.

Hereinafter, two examples of Implementation 2 will be described as Implementation 2-1 and Implementation 2-2 according to a module to be used to frequency-shift '$f_{XX}-N_{int}*128\Delta f$' in the digital stage.

Implementation 2-1

Figure 6A:
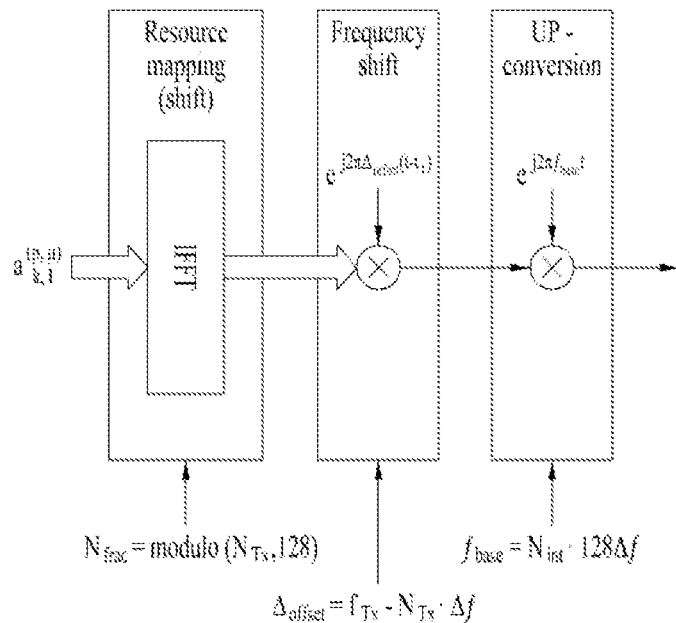
FIGS. 6A and 6B are diagrams illustrating examples of Implementation 2-1 of the present disclosure.
Figure 6B:
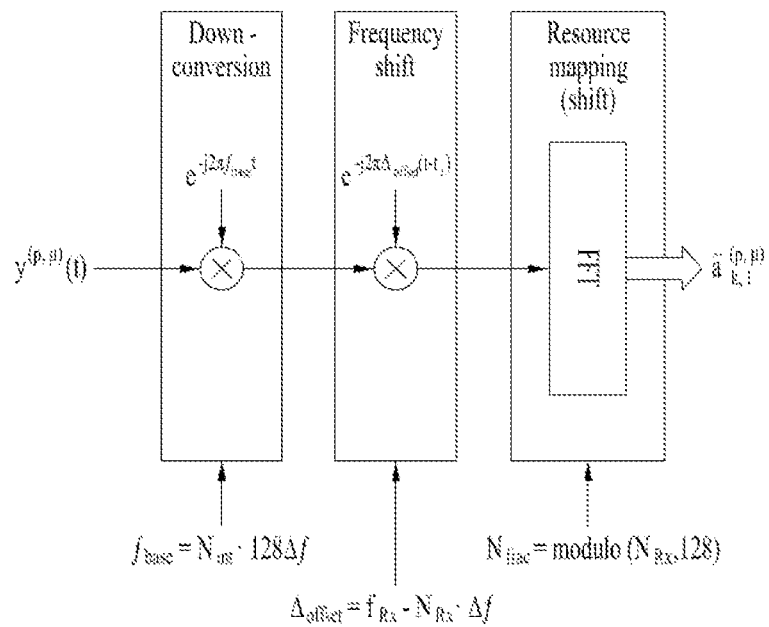

FIGS. 6A and 6B are diagrams illustrating examples of Implementation 2-1 of the present disclosure. Particularly, FIG. 6A shows an example of a part of the transmitting side structure according to Implementation 2-1, and FIG. 6B shows an example of a part of the receiving side structure according to Implementation 2-1. In FIGS. 6A and 6B, the ti denotes the start position of the signal part of an OFDM symbol tin the time domain, and may be expressed as $t_i=t_{start,i}+N_{CP,i}^\mu T_c$.

When the final transmitter signal is summarized using Equation 17, the transmitted signal of the transmitter can be expressed by the following equation.

Equation 24

$$x^{(p,\mu)}(t) = $$

$$\sum_{k=0}^{N_{grid}^{size,\mu}N_{sc}^{RB}-1} a_{k,l}^{(p,\mu)} \cdot \left\{ e^{j2\pi\left(k+k_0-\frac{N_{grid}^{size,\mu}N_{sc}^{RB}}{2}\right)\Delta f\left(t-t_{start,l}-N_{CP,l}^\mu T_c\right)} \right\}.$$

$$e^{j2\pi f_{Tx}\left(t-t_{start,l}-N_{CP,l}^\mu T_c\right)} = $$

$$\sum_{k=0}^{N_{grid}^{size,\mu}N_{sc}^{RB}-1} a_{k,l}^{(p,\mu)} \cdot \left\{ e^{j2\pi\left(k+k_0-\frac{N_{grid}^{size,\mu}N_{sc}^{RB}}{2}\right)\Delta f\left(t-t_{start,l}-N_{CP,l}^\mu T_c\right)} \right.$$

$$\left. e^{j2\pi N_{frac}\Delta f\left(t-t_{start,l}-N_{CP,l}^\mu T_c\right)} \cdot e^{j2\pi\Delta_{offset}\left(t-t_{start,l}-N_{CP,l}^\mu T_c\right)} \right\}.$$

$$e^{j2\pi f_{base}\left(t-t_{start,l}-N_{CP,l}^\mu T_c\right)} = \sum_{k=0}^{N_{grid}^{size,\mu}N_{sc}^{RB}-1} a_{k,l}^{(p,\mu)} \cdot $$

$$\left\{ e^{j2\pi\left(k+k_0+N_{frac}-\frac{N_{grid}^{size,\mu}N_{sc}^{RB}}{2}\right)\Delta f\left(t-t_{start,l}-N_{CP,l}^\mu T_c\right)} \right.$$

$$\left. e^{j2\pi\Delta_{offset}\left(t-t_{start,l}-N_{CP,l}^\mu T_c\right)} \right\} \cdot e^{j2\pi f_{base}t}$$

Referring to the last line of Equation 24, $N_{frac}$=modulo $(N_{Tx},128)$ is a term for changing a mapping position of a resource (i.e., a mapping position of a subcarrier) in an IFFT term. That is, in the term $$e^{j2\pi\left(k+k_0+N_{frac}-\frac{N_{grid}^{size,\mu}N_{sc}^{RB}}{2}\right)\Delta f\left(t-t_{start,l}-N_{CP,l}^\mu T_c\right)}$$

corresponding to the IFFT term, the term $k+k_0+N_{frac}-N_{grid}^{size,\mu}N_{sc}^{RB}/2$ denotes the mapping position of a resource for IFFT. Thus, the frequency to which the signal symbol $a_k$ of each susbcarrier is to be modulated is determined depending on the value of $k+k_0+N_{frac}-N_{grid}^{size,\mu}N_{sc}^{RB}/2$.

As such, in Implementation 2-1, the baseband signal is frequency-shifted by '$f_{Tx}-N_{int}*128\Delta f$' (or a part of '$f_{Tx}-N_{int}*128\Delta f$' if $\Delta_{offset}$ is not 0) of $f_{Tx}$ by changing the mapping position of the resource with respect to the IFFT by $N_{frac}$. Since the IFFT itself has a function to reset the phase, the frequency shift performed by changing the resource mapping position with respect to the IFFT does not cause phase mismatch between the OFDM symbols. The term $e^{j2\pi\Delta_{offset}(t-t_{start,l}-N_{CP,l}^\mu T_c)}$ in the last line of Equation 24 resets the phase of the signal to a certain value (e.g., 0) at the start or end of the cyclic prefix (CP) on a symbol-by-symbol basis and frequency-shifts the signal by $\Delta_{offset}$, which is similar to 7.5 kHz frequency shift (see $1/2*\Delta f$ in Equation 1) performed in LTE uplink SC-FDMA.

In some scenarios, it is generally difficult to digitally implement a very large frequency shift. By contrast, frequency shift by $\Delta$offset may be easily implemented by a digital OSC since the value of $\Delta_{offset}$ is small. The frequency shift by $\Delta_{offset}$ is performed after IFFT. In the last line of Equation 24, the frequency $f_{base}$ in the expression $e^{j2\pi f_{base}t}$ is a frequency that is closest to $f_{Tx}$ among the frequencies corresponding to integer multiples of 128Δf (e.g., among frequencies less than or equal to $f_{Tx}$ or among frequencies greater than or equal to $f_{Tx}$ or among frequencies on both sides of $f_{Tx}$). As examples, the frequency $f_{base}$ may be integer multiples of 1.92 MHz when Δf=15 kHz and may be integer multiples of 3.84 MHz when Δf=30 kHz. The expression $e^{j2\pi f_{base}t}$ represents the operation of upconversion to $f_{base}$. In Implementation 2-1, the frequency shift by $f_{base}$ may be performed using an analog OSC.

Implementation 1, described above, configured the phase compensation function to perform phase compensation using one of a specific number of complex-valued sequences (e.g., 128 or 128*3 complex-valued sequences). In particular, in Implementation 1, described above, frequency upconversion to the carrier frequency $f_{Tx}$ was performed by an analog OSC. By contrast, in Implementation 2-1, frequency up-shift to the carrier frequency $f_{Tx}$ is actually performed through frequency shift of $(f_{Tx}-N_{int}*128\Delta f)$ using IFFT, which is a digital module, and frequency shift of $N_{int}*128\Delta f$ using an analog OSC.

Referring to FIG. 6A, considering $\Delta_{offset}$, a frequency shift operation corresponding to $\Delta_{offset}$ may be performed in addition to the IFFT and upconversion functions. In some implementations, $\Delta_{offset}$ may have a variance of +/−5 kHz, although implementations are not limited thereto. In addition, in the case of frequency ranges FR2 and FR1 (>3 GHz) or in the case of Δoffset=0 in frequency range FR1 (<3 GHz), $\Delta_{offset}=0$, the frequency shift operation may be performed without any additional operation (e.g., frequency shift by $\Delta_{offset}$). In this case, the frequency shift module denoted by $e^{j2\pi\Delta_{offset}(t-t_l)}$ in FIG. 6A may be omitted.

Corresponding operations may be configured at the receiving side. The receiving side operation according to Implementation 2 will be described in detail below.

The final receiver signal summarized using Equation 20 may be given as follows.

$$\hat{a}_{k,l}^{(p,\mu)} = \sum_i \left\{ \left( y^{(p,\mu)}(t) \cdot e^{-j2\pi f_{Rx}(t-t_{start,l}-N_{CP,l}^\mu T_c)} \cdot \delta(t-i\cdot T_c) \right) \right. $$

$$\left. e^{-j2\pi\left(k+k_{0,Rx}-\frac{N_{grid}^{size,\mu}N_{sc}^{RB}}{2}\right)\Delta f(i\cdot T_c-(t_{start,l}-N_{CP,l}^\mu T_c))} \right\} = $$

$$\sum_i \left\{ \left( y^{(p,\mu)}(t) \cdot e^{-j2\pi f_{base}(t-t_{start,l}-N_{CP,l}^\mu T_c)} \cdot \delta(t-i\cdot T_c) \right) \right.$$

$$\left. e^{-j2\pi\left(k+k_{0,Rx}-\frac{N_{grid}^{size,\mu}N_{sc}^{RB}}{2}\right)\Delta f(i\cdot T_c-(t_{start,l}-N_{CP,l}^\mu T_c))} \right.$$

$$\left. e^{-j2\pi N_{frac}\Delta f(i\cdot T_c-t_{start,l}-N_{CP,l}^\mu T_c)} \right\} \cdot e^{-j2\pi\Delta_{offset}(i\cdot T_c-t_{start,l}-N_{CP,l}^\mu T_c)} = $$

$$\sum_i \left\{ \left( y^{(p,\mu)}(t) \cdot e^{-j2\pi f_{base}t} \cdot \delta(t-i\cdot T_c) \right) \right.$$

Equation 25

-continued $$\left. e^{-j2\pi\left(k+k_{0,Rx}+N_{frac}-\frac{N_{grid}^{size,\mu}N_{sc}^{RB}}{2}\right)\Delta f(i\cdot T_c-(t_{start,l}-N_{CP,l}^\mu T_c))} \right\}.$$

$$e^{-j2\pi\Delta_{offset}(i\cdot T_c-t_{start,l}-N_{CP,l}^\mu T_c)}$$

Referring to the last line of Equation 25, $N_{frac}$=modulo $(N_{Rx}, 128)$ is a term for changing the de-mapping position of a resource in the FFT term. That is, in the FFT expression $$e^{-j2\pi\left(k+k_{0,Rx}+N_{frac}-\frac{N_{grid}^{size,\mu}N_{sc}^{RB}}{2}\right)\Delta f(t-t_{start,l}-N_{CP,l}^\mu T_c)},$$

the term $k+k_{0,Rx}+N_{frac}-N_{grid}^{size,\mu}N_{sc}^{RB}/2$ is a term relating to the de-mapping position of a resource, i.e., the de-mapping position of a subcarrier to an OFDM baseband signal. In other words, $k+k_{0,Rx}+N_{frac}-N_{grid}^{size,\mu}N_{sc}^{RB}/2$ is a term relating to the output positions of the subcarriers from the FFT. In Implementation 2-1, frequency shift is performed by '$f_{Rx}-N_{int}*128\Delta f$' (or '$f_{Tx}-N_{int}*128\Delta f$' if Δoffset is not 0) of $f_{Rx}$ by changing the de-mapping position of the resource with respect to the FFT through $N_{frac}$. Since the FFT itself has a function to reset the phase, the frequency shift performed by changing the resource de-mapping position with respect to the FFT does not cause phase mismatch between the OFDM symbols. The expression $e^{-j2\pi\Delta_{offset}(i\cdot t-t_{start,l}-N_{CP,l}^\mu T_c)}$ in the last line of Equation 25 resets the phase of the signal to a certain value (e.g., 0) at the start or end of the cyclic prefix (CP) on a symbol-by-symbol basis and frequency-shifts the signal by $\Delta_{offset}$, which is similar to 7.5 kHz frequency shift (see 1/2*Δf in Equation 1) performed in LTE uplink SC-FDMA.

In some scenarios, it may be difficult to digitally implement a very large frequency shift. By contrast, frequency shift by $\Delta_{offset}$ may be easily implemented by a digital OSC since the value of $\Delta_{offset}$ is small. The frequency shift by $\Delta_{offset}$ performed before FFT. In the last line of offset is Equation 25, the frequency $f_{base}$ in the expression $e^{-j2\pi f_{base}t}$ is a frequency that is closest to fix among the frequencies corresponding to integer multiples of 128Δf (e.g., among frequencies less than or equal to $f_{Tx}$ or among frequencies greater than or equal to $f_{Rx}$ or among frequencies on both sides of $f_{Rx}$). As examples, the frequency $f_{base}$ may be integer multiples of 1.92 MHz when Δf=15 kHz and may be integer multiples of 3.84 MHz when Δf=30 kHz. The expression $e^{-2\pi f_{base}t}$ represents the operation of downconversion from $f_{base}$. In Implementation 2-1, the frequency shift by $f_{base}$ may be performed using an analog OSC.

Implementation 1, described above, configured the phase compensation function to perform phase compensation using one of a specific number of complex-valued sequences (e.g., 128 or 128*3 complex-valued sequences). In particular, in Implementation 1, described above, frequency downconversion from the carrier frequency $f_{Rx}$ was performed by an analog OSC.

By contrast, in Implementation 2-1 described herein, frequency down-shift from the carrier frequency $f_{Rx}$ is actually performed by a frequency shift of '$f_{Rx}-N_{int}*128\Delta f$' using FFT, which is a digital module, and frequency shift of $f_{base}-N_{int}*128\Delta f$ using an analog OSC.

Referring to FIG. 6B, a frequency shift operation corresponding to $\Delta_{offset}$ may be performed in addition to the FFT and downconversion functions. In addition, in the case of frequency ranges FR2 and FR1 (>3 GHz) or in the case of $\Delta_{offset}=0$ in frequency range FR1 (<3 GHz), if $\Delta_{offset}=0$, then the frequency shift operation may be performed without any additional operation (e.g., frequency shift by $\Delta_{offset}$). In this case, the frequency shift module denoted by $e^{-2\pi\Delta_{offset}(t-t_i)}$ in FIG. 6B may be omitted.

Implementation 2-2

In Implementation 2-2, as in Implementation 2-1 described above, frequency shift of $f_{base}$ of the carrier frequency $f_{XX}$ is performed using an analog OSC. However, in Implementation 2-2, frequency shifting of '$f_{XX}-f_{base}$' of $f_{XX}$ (which was performed using IFFT/FFT in Implementation 2-1) is performed by the digital OSC.

For example, frequency shift by the digital OSC may be performed by the digital OSC multiplying a signal by a cosine value or a sine value. In this case, the digital oscillator may obtain the cosine/sine value by any appropriate technique, for example by reading the cosine/sine value from a computer memory, or by calculating the cosine/sine value. In order to make the phase of the signal have a certain value at a specific point in time, a digital OSC only needs to be configured such that an address of a memory read by the digital OSC for a specific sample is the address of the memory that stores a cosine/sine value that makes the phase be the certain value. Alternatively, if the digital OSC is implemented to calculate a cosine/sine value rather than reading it from the memory, then the digital oscillator only needs to adjust the phase to a desired value at a specific point in time. That is, the digital OSC may be implemented to read a memory address storing a frequency shift value having the certain phase value for a specific point in time/sample or to adjust the phase to the certain phase value for the specific point in time/sample. Therefore, for the frequency shift by the digital OSC, such implementations may simplify the phase reset function based on the OFDM symbol boundary. In such scenarios, some implementations may not need to perform phase pre-compensation at the transmitting end.

For reference, phase mismatch between OFDM symbols may result from the difference between the time interval during which IFFT/FFT is applied and the time interval during which the free-running OSC is running. Implementing the upconversion/downconversion frequency with a digital OSC instead of a free-running OSC, which is an analog OSC, may enable easier and simpler resetting of the phase at the boundary of OFDM symbols. However, upconversion/downconversion to the extent of the carrier frequency by the digital OSC may cause a very high complexity because the transmitter and the receiver may need to perform multiplication in units of several GHz. For example, to perform upconversion/downconversion to/from 2 GHz using a digital OSC, sampling should be performed in units of at least 4 GHz according to the Nyquist sampling theorem. Accordingly, the digital OSC must be implemented to multiply the input signal by the cosine/sine value of upconversion/downconversion on the basis of the sampling unit of 4 GHz. Implementing such a large number of multiplication operations with a digital module may be very complex in some scenarios, and may lead to an increase in the manufacturing cost of the transmitter and the receiver. Thus, in some scenarios, the overall magnitude of the carrier frequency is not up-converted/down-converted by the digital OSC.

By way of comparison, in Implementation 2-1, described above, the transmitting side is configured to perform a process of upconversion to a frequency corresponding to $f_{base}$ by the OSC of the RF stage (i.e., the free-running OSC) and a process of determining the position of resource mapping in the IFFT using $f_{frac}$ (or '$f_{Tx}-f_{base}$'). In scenarios where $\Delta_{offset}$ is not 0, the is transmitting side according to Implementation 2-1, described above, may further perform the step of resetting the phase on the OFDM symbol-by-symbol basis (e.g. to have the zero phase at the end time of the cyclic prefix CP) using a digital OSC for $\Delta_{offset}$. In some scenarios of Implementation 2-1, described above, the signal output in the baseband may become asymmetric with respect to DC depending on the value of $f_{frac}$ (or '$f_{Tx}-f_{base}$'). This may limit the efficiency of the spectrum by filtering after the IFFT output in the transmitter (or before the input of the FFT in the receiver). For example, a portion of the output of the IFFT (or an input of FFT) may be outside of the filtering region of the transmitter (or receiver), resulting in signal distortion at the band edges due to filtering.

Thus, to address such problems, in some scenarios it may be desirable to modify the transmitting side operations of Implementation 2-1 for implementing the function of frequency upconversion (i.e., frequency up-shift) and phase reset corresponding to $f_{frac}$ (or '$f_{Tx}-f_{base}$') through the position of resource mapping of the IFFT.

Accordingly, to this end, in Implementation 2-2 described herein, at the transmitting side, the function of frequency shift and phase reset for a frequency corresponding to $f_{frac}$ (or '$f_{Tx}-f_{base}$') are configured with a digital OSC as in the case of frequency shift in FIG. 6A, i.e., frequency shift by $\Delta_{offset}$ using a digital OSC.

Further examples of the above-described scenarios are provided with reference to FIGS. 7A and 7B, below.

Figure 7A:
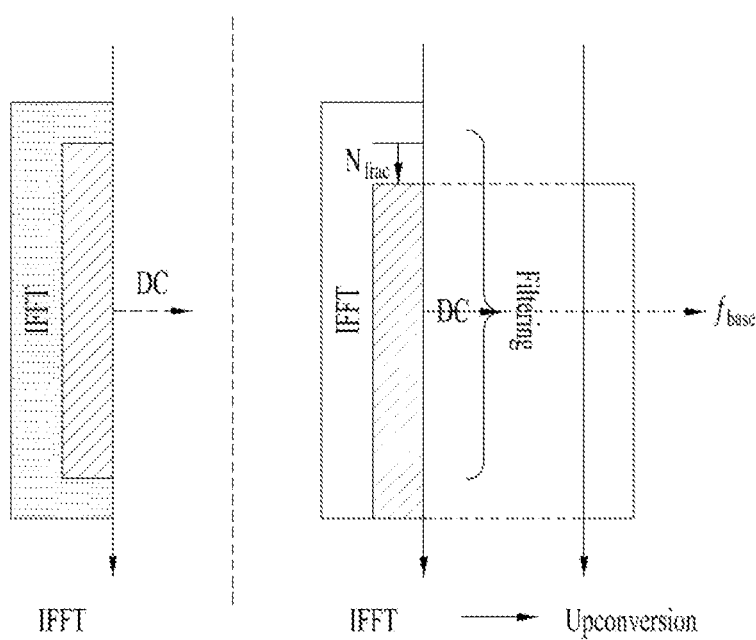
FIGS. 7A and 7B are diagrams illustrating examples of resource mapping according to Implementation 2-1 of the present disclosure and resource mapping according to Implementation 2-2 of the present disclosure.
Figure 7B:
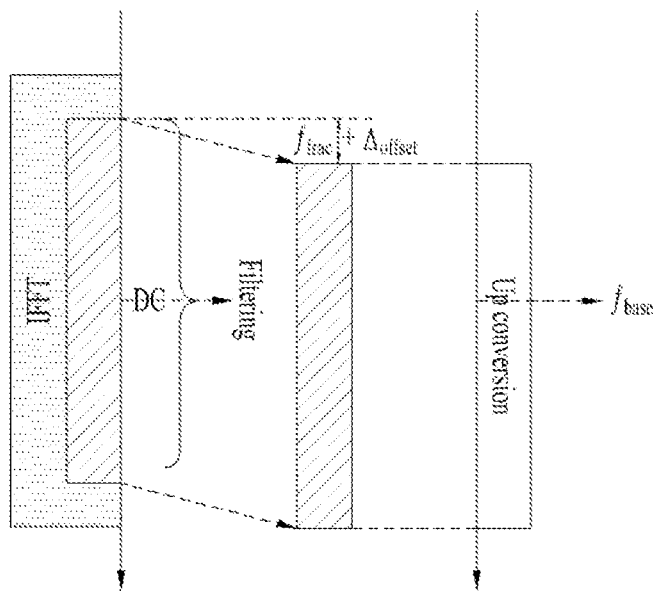

FIGS. 7A and 7B are diagrams illustrating examples of resource mapping according to Implementation 2-1 and Implementation 2-2 of the present disclosure, respectively. Specifically, FIG. 7A illustrates an example of resource mapping and upconversion according to Implementation 2-1, and FIG. 7B illustrates an example of resource mapping and upconversion according to Implementation 2-2.

Referring to the left part of FIG. 7A, in some wireless communication systems, information symbols $\alpha_k$ of subcarriers in an OFDM symbol (where k is a subcarrier index) are mapped to an IFFT module, and the information symbols mapped to the IFFT module are (approximately) symmetrically distributed with respect to the center of the IFFT module or the DC.

By contrast, referring to the right part of FIG. 7A, in Implementation 2-1 of the present disclosure, the mapping position to the IFFT of $\alpha_k$ is shifted, for example, by an amount $N_{frac}$. In such scenarios where the resource mapping position of the IFFT is changed as shown in the right part of FIG. 7A, then a portion of the output of the IFFT may be outside of the filtering region of the transmitter. Since the portion of the output of the IFFT that is outside the filtering region would not be subjected to filtering, the signal may be distorted at the band edge.

In order to address this issue, as shown in FIG. 7B, Implementation 2-2 shifts the frequency position of the output of the IFFT by $f_{frac}+\Delta_{offset}$ (i.e., '$f_{Tx}-f_{base}$') via a digital oscillation to a desired position (after performing suitable filtering if any) with the IFFT resource mapping position unchanged.

Figure 8A:
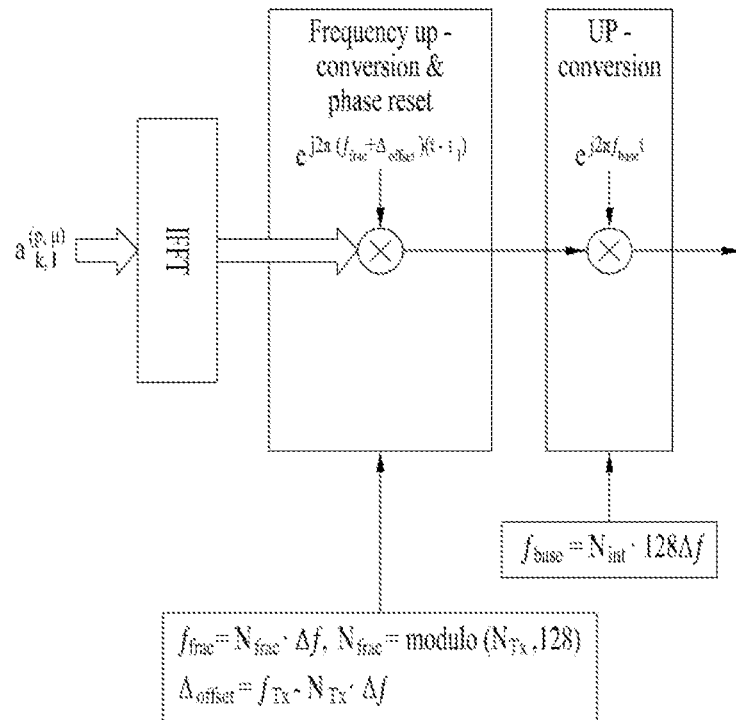
FIGS. 8A and 8B are diagrams illustrating examples of Implementation 2-2 of the present disclosure.
Figure 8B:
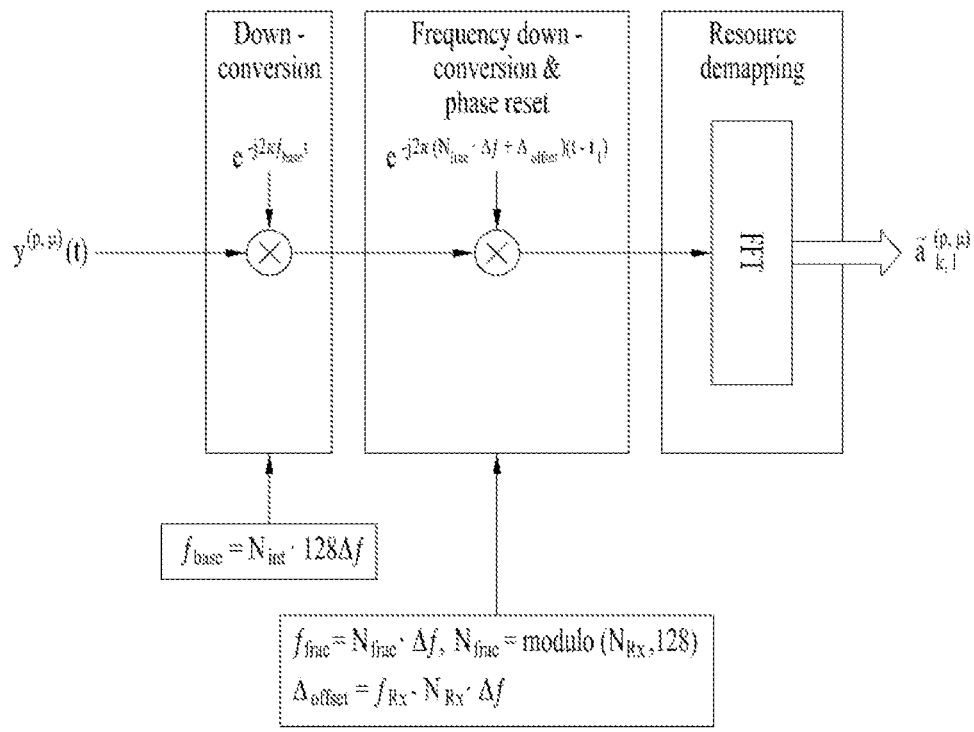

FIGS. 8A and 8B are diagrams illustrating examples of Implementation 2-2 of the present disclosure. Specifically, FIG. 8A shows an example of a part of the transmitting side structure according to Implementation 2-2, and FIG. 8B shows an example of a part of the receiving side structure according to Implementation 2-2. In FIGS. 8A and 8B, the term ti denotes the start position of the signal part of an OFDM symbol tin the time domain, and may be expressed as $t_l = t_{start,l} + N_{CP,l}^\mu T_c$.

Referring first to FIG. 8A, in order to perform frequency upconversion by $f_{Tx}$, the transmitter according to Implementation 2-2 performs upconversion for a frequency corresponding to $f_{base}$ of $f_{Tx}$ by an oscillator (i.e., an analog OSC) in the RF stage, and performs frequency upconversion and phase reset for a frequency corresponding to $f_{frac} + \Delta_{offset}$ (i.e., '$f_{Tx} - f_{base}$') (e.g. so as to have the zero phase at the end time of the cyclic prefix CP) by a digital OSC on an OFDM symbol-by-symbol basis. The receiving side operations according to Implementation 2-2 may be performed in an analogous manner as the transmitting side, described next.

Referring to FIG. 8B, in order to perform frequency downconversion by $f_{Rx}$, the receiver according to Implementation 2-2 performs downconversion for a frequency corresponding to $f_{base}$ of $f_{Rx}$ by an oscillator (i.e., an analog OSC) in the RF stage, and performs frequency downconversion and phase reset for a frequency corresponding to $f_{frac} + \Delta_{offset}$ (i.e. '$f_{Rx} - f_{base}$') (e.g. so as to have the zero phase at the end time of the cyclic prefix CP) by a digital OSC on the OFDM symbol-by-symbol basis.

By comparison, in Implementation 2-1 described above, the receiving side is configured to perform a process of downconversion with a frequency corresponding to $f_{base}$ by the OSC of the RF stage (i.e., the free-running OSC) and a process of determining the position of resource de-mapping in the FFT using $f_{frac}$ (or '$f_{Rx} - f_{base}$'). If the value of A not 0, then the offset is receiving side according to Implementation 2-1, described above, may perform the process of resetting phase on the OFDM symbol-by-symbol basis (e.g. to have the zero phase at the end time of the cyclic prefix CP) using a digital OSC for $\Delta_{offset}$. In some scenarios of Implementation 2-1 described above, the degree of asymmetry of the signal output in the RF downconversion step may be large with respect to DC depending on the value of $f_{frac}$ (or '$f_{Rx} - f_{base}$'). This may limit the efficiency of the spectrum by filtering at the downconversion output stage of the receiver.

Thus, to address such problems, in some scenarios it may be desirable to modify the receiving side operations of Implementation 2-1 for implementing frequency downconversion (i.e., frequency down-shift) and phase reset corresponding to $f_{frac}$ (or '$f_{Rx} - f_{base}$') through the position of the resource mapping of the FFT.

Accordingly, to this end, in Implementation 2-2, at the receiving side, the function of frequency shift and phase reset for a frequency corresponding to $f_{frac}$ (or '$f_{Rx} - f_{base}$') are configured with a digital OSC as in the case of frequency shift in FIG. 6B, i.e., frequency shift by $\Delta_{offset}$ using a digital OSC. Here, the number of frequencies $f_{frac}$ (or '$f_{Rx} - f_{base}$') used for the frequency downconversion and the phase reset may be 128 (or 128*3 if $\Delta_{offset}$ is not 0 according to the frequency band).

Implementation 3

Figure 9A:
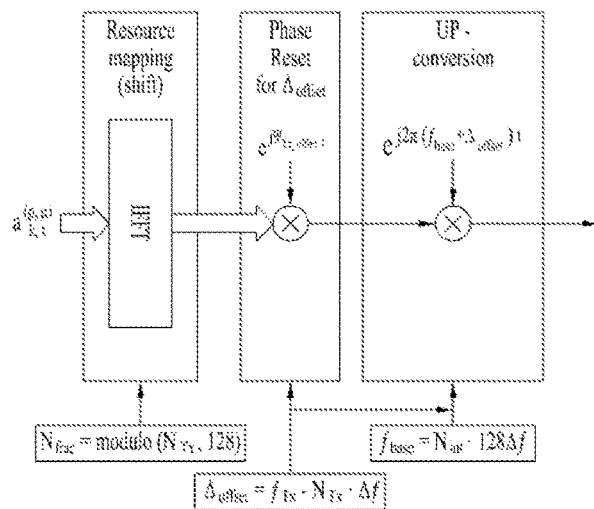
FIGS. 9A to 9C are diagrams illustrating examples of Implementation 3 of the present disclosure.
Figure 9B:
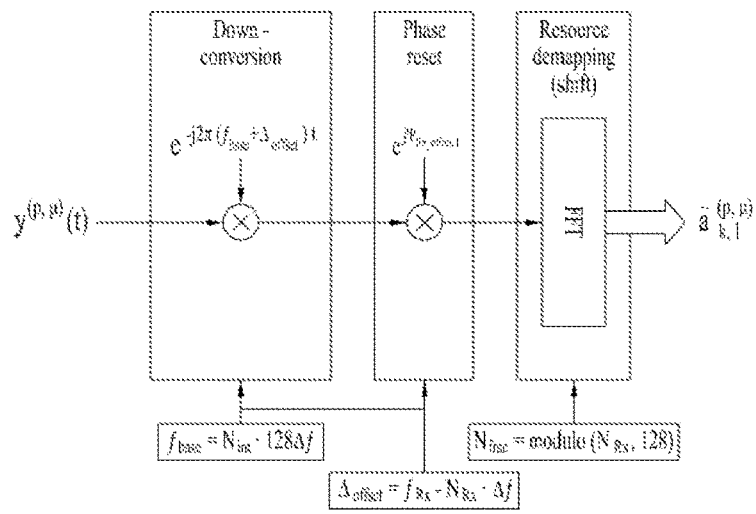
Figure 9C:
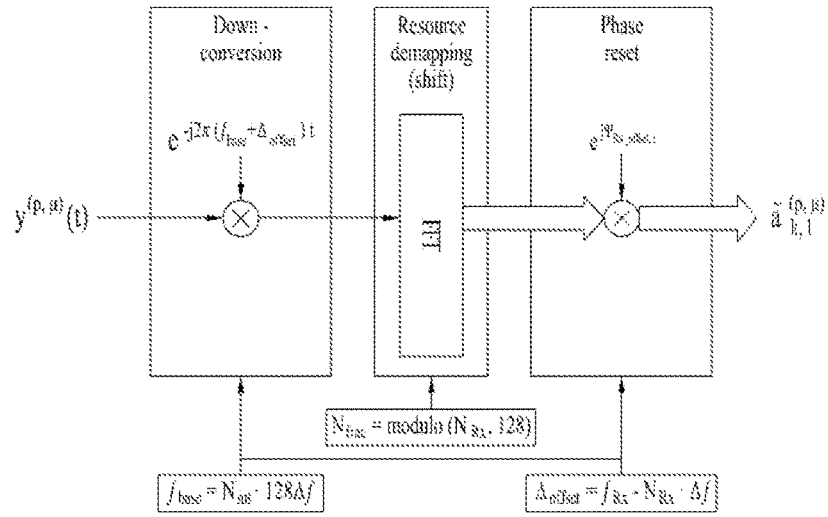

FIGS. 9A to 9C are diagrams illustrating examples of Implementation 3 of the present disclosure. Specifically, FIG. 9A shows an example of a part of the transmitting side structure according to Implementation 3, and FIGS. 9B and 9C show examples of a part of the receiving side structure according to Implementation 3.

Equation 24, above, may be modified as follows.

Equation 26

$$x^{(p,\mu)}(t) = \\ \sum_{k=0}^{N_{grid}^{size,\mu} N_{sc}^{RB}-1} a_{k,l}^{(p,\mu)} \cdot \left\{ e^{j2\pi\left(k+k_0 - \frac{N_{grid}^{size,\mu} N_{sc}^{RB}}{2}\right)\Delta f\left(t - t_{start,l} - N_{CP,l}^\mu T_c\right)} \right\}.$$

$$e^{j2\pi f_{Tx}\left(t - t_{start,l} - N_{CP,l}^\mu T_c\right)} = \sum_{k=0}^{N_{grid}^{size,\mu} N_{sc}^{RB}-1} a_{k,l}^{(p,\mu)} \cdot$$

$$\left\{ e^{j2\pi\left(k+k_0 + N_{frac} - \frac{N_{grid}^{size,\mu} N_{sc}^{RB}}{2}\right)\Delta f\left(t - t_{start,l} - N_{CP,l}^\mu T_c\right)} \right\}.$$

$$e^{j2\pi\Delta_{offset}\left(t - t_{start,l} - N_{CP,l}^\mu T_c\right)} \cdot e^{j2\pi f_{base} t} = \sum_{k=0}^{N_{grid}^{size,\mu} N_{sc}^{RB}-1} a_{k,l}^{(p,\mu)} \cdot$$

$$\left\{ e^{-j2\pi\left(k+k_0 + N_{frac} - \frac{N_{grid}^{size,\mu} N_{sc}^{RB}}{2}\right)\Delta f\left(t - t_{start,l} - N_{CP,l}^\mu T_c\right)} \right\}.$$

$$e^{j2\pi\Delta_{offset}\left(t_{start,l} - N_{CP,l}^\mu T_c\right)} \cdot e^{j2\pi(f_{base} + \Delta_{offset})t} = \sum_{k=0}^{N_{grid}^{size,\mu} N_{sc}^{RB}-1} a_{k,l}^{(p,\mu)} \cdot$$

$$\left\{ e^{j2\pi\left(k+k_0 + N_{frac} - \frac{N_{grid}^{size,\mu} N_{sc}^{RB}}{2}\right)\Delta f\left(t - t_{start,l} - N_{CP,l}^\mu T_c\right)} \cdot e^{j\Psi_{Tx\_offset,l}} \right\}.$$

$$e^{j2\pi(f_{base} + \Delta_{offset})t}$$

Based on the last line of Equation 26, Implementation 3 of the present disclosure will be described. Implementation 3 and Implementation 2-1 have similarities in that, for example, $N_{frac} = \text{modulo}(N_{Tx}, 128)$ plays the same role in Implementation 3 as in Implementation 2-1. Referring to FIG. 9A, the term $N_{frac} = \text{modulo}(N_{Tx}, 128)$ is a term for changing the mapping position of a resource (i.e., the mapping position of a subcarrier) in the IFFT term. As described in Implementation 2-1, above, $$e^{j2\pi\left(k+k_0 + N_{frac} - \frac{N_{grid}^{size,\mu} N_{sc}^{RB}}{2}\right)\Delta f\left(t - t_{start,l} - N_{CP,l}^\mu T_c\right)}$$

corresponds to the IFFT term. In the IFFT term, $k + k_0 + N_{frac} - N_{grid}^{size,\mu} N_{sc}^{RB}/2$ denotes the mapping position of a resource for IFFT.

Referring to $e^{j2\pi(f_{base} + \Delta_{offset})t}$ in the last line of Equation 26, Implementation 3 differs from Implementation 2-1 as follows. In the expression $e^{j2\pi(f_{base} + \Delta_{offset})t}$ the frequency $f_{base}$ is a frequency that is closest to $f_{Tx}$ among the frequencies corresponding to integer multiples of $128\Delta f$ (e.g., among frequencies less than or equal to $f_{Tx}$ or among frequencies greater than or equal to $f_{Tx}$, or among frequencies on both sides of $f_{Tx}$). As examples, the frequency $f_{base}$ may be equal to an integer multiple of 1.92 MHz when $\Delta f = 15$ kHz, and may be equal to an integer multiple of 3.84 MHz when $\Delta f = 30$ kHz, and may be equal to an integer multiple of 7.68

MHz when Δf=60 kHz, and may be equal to an integer multiple of 15.36 MHz when Δf=120 kHz. The frequency $f_{base}$ may be expressed as $N_{int}*128\Delta f$ (where $N_{int}$ is an integer).

The expression $e^{j2\pi(f_{base}+\Delta_{offset})t}$ represents an operation of upconversion to a frequency obtained by adding $\Delta_{offset}$ to $f_{base}$ (i.e., $f_{base}+\Delta_{offset}$), and is processed by an analog OSC. Since the $\Delta_{offset}$ processed by the analog OSC may cause phase discontinuity per symbol, in some implementations, the transmitting side of Implementation 3 performs phase compensation for $\Delta_{offset}$ using $\psi_{Tx\_offset,l}=-2\pi\Delta_{offset}\cdot(t_{start,l}+N_{CP,l}^{\mu}T_c)$.

By way of comparison, Implementation 2, described above, shifted the frequency on a sample-by-sample basis by rotating the phase (i.e., shifting the phase) on a sample-by-sample basis for frequency shift by $\Delta_{offset}$. That is, Implementation 2, described above, utilized a complex value derived on a sample-by-sample basis to rotate the phase on a sample-by-sample basis. By contrast, Implementation 3 only multiplies the output of the IFFT by a fixed complex value on an OFDM symbol-by-symbol basis, as shown in FIG. 9A.

Furthermore, by way of comparison, Implementation 1, described above, utilized 128 or 128*3 complex-valued sequences for phase compensation for all available carrier frequency candidates. That is, since Implementation 1 utilizes one of 128 or 128*3 complex values per symbol for each carrier frequency, Implementation 1 utilizes 128 or 128*3 complex-valued sequences for phase compensation according to carrier frequencies. By contrast, Implementation 3 does not utilize 128 or 128*3 complex-valued sequences for $f_{frac}$ because Implementation 3 performs frequency shift by $f_{frac}$ by changing the resource mapping position to IFFT, and only performs phase compensation for $\Delta_{offset}$ that is implemented through analog frequency upconversion. Therefore, since Implementation 3 only performs phase compensation for $\Delta_{offset}=-5$ kHz or $\Delta_{offset}=5$ kHz, it utilizes only two complex-valued sequences for phase compensation for Δoffset=+/−5 kHz. Since the negative frequency corresponds to the opposite phase of a positive frequency, Implementation 3 actually utilizes only one complex-valued sequence for phase compensation. In some implementations, in the case of frequency ranges FR2 and FR1 (>3 GHz) or in the case of Δoffset=0 in frequency range FR1 (<3 GHz), the function of upconversion to the carrier frequency may be configured without any additional operation (e.g., frequency shift by $\Delta_{offset}$) other than IFFT and upconversion, as in the case of Implementation 2.

Implementation 3 is applicable to the receiving side as well as the transmitting side. Equation 25 may be modified into the following equation.

$$\hat{a}_{k,l}^{(p,\mu)} = \sum_i \left\{ \left( y^{(p,\mu)}(t) \cdot e^{-j2\pi f_{Rx}(t-t_{start,l}-N_{CP,l}^{\mu}T_c)} \cdot \delta(t-i\cdot T_c) \right) \right. \qquad \text{Equation 27}$$

$$\left. e^{-j2\pi\left(k+k_{0,Rx}-\frac{N_{grid}^{size,\mu}N_{sc}^{RB}}{2}\right)\Delta f\left(i\cdot T_c-(t_{start,l}+N_{CP,l}^{\mu}T_c)\right)} \right\} =$$

$$\sum_i \left\{ \left( y^{(p,\mu)}(t) \cdot e^{-j2\pi f_{base}t} \cdot \delta(t-i\cdot T_c) \right) \cdot \right.$$

$$\left. e^{-j2\pi\left(k+k_{0,Rx}+N_{frac}-\frac{N_{grid}^{size,\mu}N_{sc}^{RB}}{2}\right)\Delta f\left(i\cdot T_c-(t_{start,l}+N_{CP,l}^{\mu}T_c)\right)} \right\}.$$

$$e^{-j2\pi\Delta_{offset}\left(i\cdot T_c-t_{start,l}-N_{CP,l}^{\mu}T_c\right)} =$$

$$\sum_i \left\{ \left( y^{(p,\mu)}(t) \cdot e^{-j2\pi(f_{base}+\Delta_{offset})t} \cdot \delta(t-i\cdot T_c) \right) \cdot \right.$$

$$\left. e^{-j2\pi\left(k+k_{0,Rx}+N_{frac}-\frac{N_{grid}^{size,\mu}N_{sc}^{RB}}{2}\right)\Delta f\left(i\cdot T_c-(t_{start,l}+N_{CP,l}^{\mu}T_c)\right)} \right\}.$$

$$e^{j2\pi\Delta_{offset}\left(t_{start,l}+N_{CP,l}^{\mu}T_c\right)} =$$

$$\sum_i \left\{ \left( y^{(p,\mu)}(t) \cdot e^{-j2\pi(f_{base}+\Delta_{offset})t} \cdot \delta(t-i\cdot T_c) \right) \cdot \right.$$

$$\left. e^{-j2\pi\left(k+k_{0,Rx}+N_{frac}-\frac{N_{grid}^{size,\mu}N_{sc}^{RB}}{2}\right)\Delta f\left(i\cdot T_c-(t_{start,l}+N_{CP,l}^{\mu}T_c)\right)} \right\}.$$

$$e^{j\psi_{Rx\_offset,l}}$$

Based on the last line of Equation 27, Implementation 3 of the present disclosure will be described. Implementation 3 and Implementation 2-1 have some similarities in that, for example, $N_{frac}$=modulo($N_{Rx}$,128) plays the same role in both Implementation 3 and Implementation 2-1. Referring to FIGS. 9B and 9C, the term $N_{frac}$=modulo($N_{Rx}$,128) is a term for changing the de-mapping position of a resource (i.e., the de-mapping position to a subcarrier) in the FFT term. As previously described in regards to Implementation 2-1, above, $$e^{-j2\pi\left(k+k_{0,Rx}+N_{frac}-\frac{N_{grid}^{size,\mu}N_{sc}^{RB}}{2}\right)\Delta f\left(t-t_{start,l}-N_{CP,l}^{\mu}T_c\right)}$$

corresponds to the FFT term. In the FFT term, $k+k_{0,Rx}+N_{frac}-N_{grid}^{size,\mu}N_{sc}^{RB}/2$ denotes the de-mapping position of a resource (e.g., a subcarrier) by FFT. As such, $k+k_{0,Rx}+N_{frac}-N_{grid}^{size,\mu}N_{sc}^{RB}/2$ is a term relating to the output positions of subcarriers from the FFT.

Referring to $e^{-j2\pi(f_{base}+\Delta_{offset})t}$ in the last line of Equation 27, Implementation 3 differs from Implementation 2-1 as follows. In the expression $e^{-j2\pi(f_{base}+\Delta_{offset})t}$, the frequency $f_{base}$ is a frequency that is closest $f_{Rx}$ among the frequencies corresponding to integer multiples of 128Δf (e.g., among frequencies less than or equal to $f_{Rx}$ or among frequencies greater than or equal to $f_{Rx}$ or among frequencies on both sides of $f_{Rx}$). The frequency $f_{base}$ may be expressed as $N_{int}*128\Delta f$ (where $N_{int}$ is an integer).

The expression $e^{-j2\pi(f_{base}+\Delta_{offset})t}$ represents an operation of downconversion by the frequency obtained by adding $\Delta_{offset}$ to $f_{base}$, and is processed by an analog OSC. Since $\Delta_{offset}$ processed by the analog OSC causes phase discontinuity per symbol, the receiving side of Implementation 3 performs phase compensation using $\psi_{Rx\_offset,l}=2\pi\Delta_{offset}\cdot(t_{start,l}+N_{CP,l}^{\mu}T_c)$. Similar to the description regarding FIGS. 5B and 5C, above, phase compensation using $\psi_{Rx\_offset,l}=2\pi\Delta_{offset}\cdot(t_{start,l}+N_{CP,l}^{\mu}T_c)$ may be performed before FFT as shown in FIG. 9B or may be performed after FFT as shown in FIG. 9C. In these examples, FIG. 9B and FIG. 9C differ only in the position at which phase compensation for $\Delta_{offset}$ performed, and other receiver operations/functions are the same.

By way of comparison, Implementation 2 shifts the frequency on a sample-by-sample basis by rotating the phase on a sample-by-sample basis for frequency shift by $\Delta_{offset}$. That is, Implementation 2 implements a complex value derived on a sample-by-sample basis to rotate the phase on a sample-by-sample basis. By contrast, Implementation 3 only multiplies the input to the FFT by a fixed complex value on an OFDM symbol-by-symbol basis.

In addition, by way of comparison, Implementation 1 utilizes 128 or 128*3 complex-valued sequences for phase compensation for all available carrier frequency candidates. That is, since Implementation 1 utilizes one of 128 or 128*3 complex values per symbol for each carrier frequency, Implementation 1 utilizes 128 or 128*3 complex-valued sequences for phase compensation according to carrier frequencies. By contrast, Implementation 3 does not utilize 128 or 128*3 complex-valued sequences for $f_{frac}$ because Implementation 3 performs frequency shift by $f_{frac}$ by changing the resource de-mapping position from the FFT, and only performs phase compensation for $\Delta_{offset}$ that is implemented through analog frequency downconversion. Therefore, Implementation 3 utilizes only two complex-valued sequences corresponding to +/−5 kHz for phase compensation for $\Delta_{offset}$=+/−5 kHz. In addition, since the negative frequency corresponds to the opposite phase of a positive frequency, Implementation 3 actually utilizes only one complex-valued sequence for phase compensation. In some implementations, in the case of frequency ranges FR2 and FR1 (>3 GHz) or in the case of $\Delta_{offset}$=0 in frequency range FR1 (<3 GHz), the function of downconversion from the carrier frequency may be configured without any additional operation (e.g., frequency shift by $\Delta_{offset}$) other than FFT and downconversion, as in the case of Implementation 2.

The implementations described above (Implementation 1, Implementation 2 and Implementation 3) have been discussed for scenarios where phase compensation for phase discontinuity is performed on the carrier frequency $f_{Tx}$ of the transmitting side and the carrier frequency $f_{Rx}$ of the receiving side. However, referring to Equation 16, above, the phase compensation ultimately corresponds to correcting the phase discontinuity (i.e., phase mismatch) corresponding to $f_{Tx}-f_{Rx}$. Since $f_{Tx}$ and $f_{Rx}$ correspond to positions of subcarriers (e.g., integer multiples of the subcarrier spacing), phase compensation may also be performed in scenarios where $\Delta_{offset}$ is considered to be zero. For example, even if $\Delta_{offset}$ is not actually equal to 0, an assumption of $\Delta_{offset}$ being equal to 0 may be correspond to the scenario of phase correction/compensation for $\Delta_{offset}$ not being performed. As such, implementations of the present disclosure may also be applied to a case where $\Delta_{offset}$ is considered to be 0. If $\Delta_{offset}$ is considered to be equal to 0, then phase compensation may be performed only for the frequency magnitudes except $\Delta_{offset}$ at the carrier frequency at the transmitting side and the receiving side. In scenarios where $\Delta_{offset}$ is considered to be 0 in the phase compensation term, the equality $f_{Tx}=N_{Tx}*\Delta f$ holds, and therefore the terms $\psi_{Tx,l}=-2\pi f_{Tx}(t_{start,l}+N_{CP,l}{}^{\mu}T_c)$ and $\psi_{Rx,l}=2\pi f_{Rx}(t_{start,l}+N_{CP,l}{}^{\mu}T_c)$ corresponding to phase compensation in the last line of Equation 16 may be expressed as follows.

$$\psi_{Tx,l}=-2\pi(N_{Tx}\Delta f)\cdot(t_{start,l}+N_{CP,l}{}^{\mu}T_c) \quad \text{Equation 28}$$

$$\psi_{Rx,l}=2\pi(N_{Tx}\Delta f)\cdot(t_{start,l}+N_{CP,l}{}^{\mu}T_c) \quad \text{Equation 29}$$

In Equation 28, the following equalities hold: $f_{Tx}=N_{Tx}*\Delta f+\Delta_{offset}=N_{int}*128\Delta f+N_{frac}*\Delta f+\Delta_{offset}=f_{base}+N_{frac}*\Delta f+\Delta_{offset}=f_{base}+f_{frac}+\Delta_{offset}$. Furthermore, in Equation 29, the following equalities hold: $f_{Rx}=N_{Rx}*\Delta f+\Delta_{offset}=N_{int}*128\Delta f+N_{frac}*\Delta f+\Delta_{offset}=f_{base}+N_{frac}*\Delta f+\Delta_{offset}=f_{base}+f_{frac}+\Delta_{offset}$. The OFDM symbol signal generation/recovery according to the present disclosure, which is performed assuming $\Delta_{offset}$ to be 0, may be applied similarly to Implementation 1, Implementation 2-1, and Implementation 2-2 described above, except that phase compensation for $\Delta_{offset}$ is not performed assuming that $\Delta_{offset}$ is 0.

In such scenarios, Implementation 1, Implementation 2-1, Implementation 2-2, and Implementation 3 may be implemented as follows, corresponding to Implementation a1, Implementation a2-1, Implementation a2-2, and Implementation a3, respectively.

Implementation a1

Equation 19 relating to the transmitting side of Implementation 1 is given below again.

$$x^{(p,\mu)}(t) = \sum_{k=0}^{N_{grid}^{size,\mu}N_{sc}^{RB}-1} a_{k,l}^{(p,\mu)} \cdot \left\{ e^{j2\pi\left(k+k_0-\frac{N_{grid}^{size,\mu}N_{sc}^{RB}}{2}\right)\Delta f\left(t-t_{start,l}-N_{CP,l}^{\mu}T_c\right)} \cdot e^{j\psi_{Tx,l}} \right\} \cdot e^{j2\pi f_{Tx}t} \quad \text{Equation 30}$$

The phase compensation term of Implementation 1 is given by $\psi_{Tx,l}=-2\pi(N_{frac}\Delta f+\Delta_{offset})\cdot(t_{start,l}+N_{CP,l}{}^{\mu}T_c)$, but the phase compensation term of Implementation a1, which does not consider $\Delta_{offset}$, is given by $\psi_{Tx,l}=-2\pi(N_{frac}\Delta f)\cdot(t_{start,l}+N_{CP,l}{}^{\mu}T_c)$.

Among Equations 22 and 23 relating to the receiving side of Implementation 1, Equation 23 is given below again.

$$\tilde{a}_{k,l}^{(p,\mu)} = e^{j\psi_{Rx,l}} \cdot \sum_{i}\left\{ (y^{(p,\mu)}(t) \cdot e^{-j2\pi f_{Rx}t} \cdot \delta(t-i\cdot T_c)) \cdot e^{-j2\pi\left(k+k_{0,Rx}-\frac{N_{grid}^{size,\mu}N_{sc}^{RB}}{2}\right)\Delta f\left(i\cdot T_c-\left(t_{start,l}-N_{CP,l}^{\mu}T_c\right)\right)} \right\} \quad \text{Equation 31}$$

The phase compensation term of Implementation 1 is given by $\psi_{Rx,l}=2\pi(N_{frac}\Delta f+\Delta_{offset})\cdot(t_{start,l}+N_{CP,l}{}^{\mu}T_c)$, but the phase compensation term of Implementation a1 is given by $\psi_{Rx,l}=2\pi(N_{Rx}\Delta f)\cdot(t_{start,l}+N_{CP,l}{}^{\mu}T_c)$ in scenarios where $\Delta_{offset}$ is not considered.

Phase compensation of Implementation 1 is performed using one of 128*3 complex-valued sequences for a frequency band where $\Delta_{offset}$ may be −5 kHz, 0 or +5 kHz, for example. By contrast, phase compensation of Implementation a1 is performed using one of 128 complex valued sequences, regardless of $\Delta_{offset}$. In Implementation a1, even if the frequency shift for $\Delta_{offset}$ is performed by an analog free-running OSC, phase compensation is not performed to correct phase mismatch that may occur due to $\Delta_{offset}$.

Implementation a2-1.

Figure 10A:
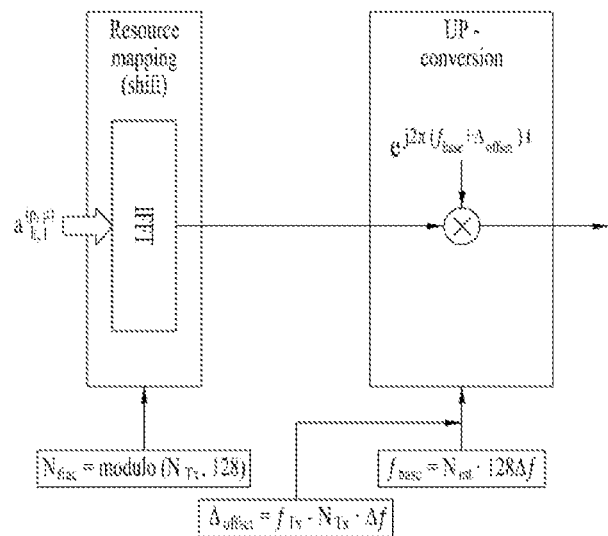
FIGS. 10A and 10B are diagrams illustrating examples of Implementation a2-1 of the present disclosure.
Figure 10B:
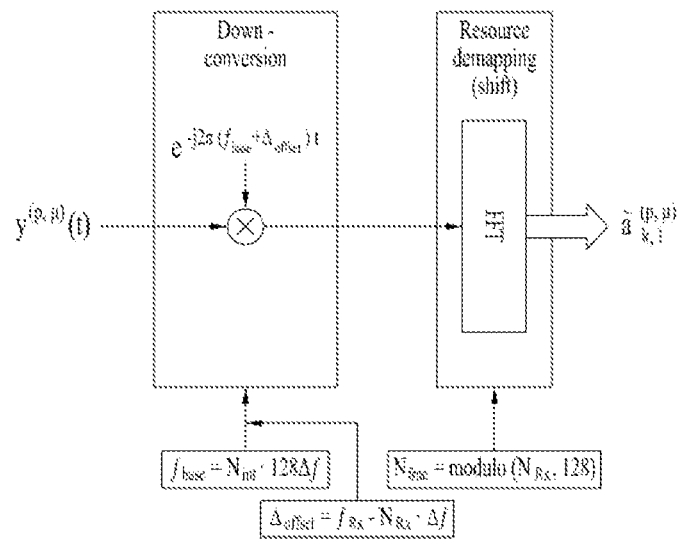

FIGS. 10A and 10B are diagrams illustrating examples of Implementation a2-1 of the present disclosure. Specifically, FIG. 10A shows a part of the transmitting side structure according to Implementation a2-1, and FIG. 10B shows a part of the receiving side structure according to Implementation a2-1.

Considering that phase compensation is performed only for components other than $\Delta_{offset}$, Equation 24 relating to the transmitting side of Implementation 2-1 may be changed to the following equation.

Equation 32

$$x^{(p,\mu)}(t) =$$

$$\sum_{k=0}^{N_{grid}^{size,\mu} N_{sc}^{RB}-1} a_{k,l}^{(p,\mu)} \cdot \left\{ e^{j2\pi\left(k+k_0-\frac{N_{grid}^{size,\mu} N_{sc}^{RB}}{2}\right)\Delta f\left(t-t_{start,l}-N_{CP,l}^{\mu}T_c\right)} \right\}.$$

$$e^{j2\pi(f_{base}+f_{frac})\left(t-t_{start,l}-N_{CP,l}^{\mu}T_c\right)} \cdot e^{j2\pi\Delta_{offset}t} =$$

$$\sum_{k=0}^{N_{grid}^{size,\mu} N_{sc}^{RB}-1} a_{k,l}^{(p,\mu)} \cdot \left\{ e^{j2\pi\left(k+k_0-\frac{N_{grid}^{size,\mu} N_{sc}^{RB}}{2}\right)\Delta f\left(t-t_{start,l}-N_{CP,l}^{\mu}T_c\right)} \right.$$

$$\left. e^{j2\pi N_{frac}\Delta f\left(t-t_{start,l}-N_{CP,l}^{\mu}T_c\right)} \right\}.$$

$$e^{j2\pi f_{base}\left(t-t_{start,l}-N_{CP,l}^{\mu}T_c\right)} \cdot e^{j2\pi\Delta_{offset}t} = \sum_{k=0}^{N_{grid}^{size,\mu} N_{sc}^{RB}-1} a_{k,l}^{(p,\mu)} \cdot$$

$$\left\{ e^{j2\pi\left(k+k_0+N_{frac}-\frac{N_{grid}^{size,\mu} N_{sc}^{RB}}{2}\right)\Delta f\left(t-t_{start,l}-N_{CP,l}^{\mu}T_c\right)} \right\}.$$

$$e^{j2\pi(f_{base}+\Delta_{offset})t}$$

The first line of Equation 32 may be obtained by substituting $f_{base}+f_{frac}+\Delta_{offset}$ for $F_{Tx}$ in the first line of Equation 24. As seen from Equation 32, the phase compensation of Implementation a2-1 may be performed by changing the mapping position of a resource (corresponding to the term $k+k_0+N_{frac}-N_{grid}^{size,\mu}N_{sc}^{RB}/2$) in the IFFT term $$e^{j2\pi\left(k+k_0+N_{frac}-\frac{N_{grid}^{size,\mu} N_{sc}^{RB}}{2}\right)\Delta f\left(t-t_{start,l}-N_{CP,l}^{\mu}T_c\right)}$$

and performing upconversion (corresponding to the term $e^{j2\pi(f_{base}+\Delta_{offset})t}$) to a frequency (i.e., $f_{base}+\Delta_{offset}$) obtained by adding $\Delta_{offset}$ to $f_{base}$, which is a frequency closest to $f_{Tx}$ among the frequencies corresponding to integer multiples of 128Δf (e.g., among frequencies less than or equal to $f_{Tx}$ or among frequencies greater than or equal to $f_{Tx}$ or among frequencies on both sides of $f_{Tx}$). Consequently, if phase compensation for $\Delta_{offset}$ is not performed, then upconversion to the carrier frequency may be performed through the resource mapping shift for the IFFT and upconversion (using an analog OSC) as illustrated in FIG. 10A. In Implementation a2-2, even if the frequency shift for $\Delta_{offset}$ performed by the offset is analog free-running OSC, the $\Delta_{offset}$ is considered to be 0, namely, phase correction/compensation for $\Delta_{offset}$ is not performed.

Analogously, considering that phase compensation is performed only for components other than $\Delta_{offset}$, Equation 25 relating to the receiving side in Implementation 2-1 may be modified to the following equation.

Equation 33

$$\tilde{a}_{k,l}^{(p,\mu)} =$$

$$\sum_i \left\{ \left( y^{(p,\mu)}(t) \cdot e^{-j2\pi(f_{base}+f_{frac})\left(t-t_{start,l}-N_{CP,l}^{\mu}T_c\right)} \cdot e^{-j2\pi\Delta_{offset}t} \right. \right.$$

$$\left. \delta(t-i \cdot T_c) \right) \cdot e^{-j2\pi\left(k+k_{0,Rx}-\frac{N_{grid}^{size,\mu} N_{sc}^{RB}}{2}\right)\Delta f\left(i \cdot T_c-\left(t_{start,l}+N_{CP,l}^{\mu}T_c\right)\right)} \right\} =$$

$$\sum_i \left\{ \left( y^{(p,u)}(t) \cdot e^{-j2\pi f_{base}\left(t-t_{start,l}-N_{CP,l}^{\mu}T_c\right)} \cdot e^{-j2\pi\Delta_{offset}t} \right. \right.$$

$$\delta(t-i \cdot T_c) \right) \cdot e^{-j2\pi\left(k+k_{0,Rx}-\frac{N_{grid}^{size,\mu} N_{sc}^{RB}}{2}\right)\Delta f\left(i \cdot T_c-\left(t_{start,l}+N_{CP,l}^{\mu}T_c\right)\right)}$$

$$\left. e^{-j2\pi N_{frac}\Delta f\left(i \cdot T_c-t_{start,l}-N_{CP,l}^{\mu}T_c\right)} \right\} =$$

$$\sum_i \left\{ \left( y^{(p,\mu)}(t) \cdot e^{-j2\pi(f_{base}+f_{frac})t} \cdot \delta(t-i \cdot T_c) \right) \cdot \right.$$

$$\left. e^{-j2\pi\left(k+k_{0,Rx}+N_{frac}-\frac{N_{grid}^{size,\mu} N_{sc}^{RB}}{2}\right)\Delta f\left(i \cdot T_c-\left(t_{start,l}+N_{CP,l}^{\mu}T_c\right)\right)} \right\}$$

The first line of Equation 33 may be obtained by substituting $f_{base}+f_{frac}+\Delta_{offset}$ for $f_{Rx}$ in the first line of Equation 25. As can be seen from Equation 33, the phase compensation of Implementation 2-1a includes changing the de-mapping position of a resource (corresponding to the term $k+k_{0,Rx}+N_{frac}-N_{grid}^{size,\mu}N_{sc}^{RB}/2$) in the FFT term $$e^{-j2\pi\left(k+k_{0,Rx}+N_{frac}-\frac{N_{grid}^{size,\mu} N_{sc}^{RB}}{2}\right)\Delta f\left(t-t_{start,l}-N_{CP,l}^{\mu}T_c\right)}$$

and downconversion (corresponding to the term $e^{j2\pi(f_{base}+\Delta_{offset})t}$) by a frequency (i.e., $f_{base}+\Delta_{offset}$) obtained by adding $\Delta_{offset}$ to $f_{base}$, which is a frequency closest to $f_{Rx}$ among the frequencies corresponding to integer multiples of 128Δf (among frequencies less than or equal to or among frequencies greater than or equal to $f_{Rx}$ or among frequencies on both sides of $f_{Rx}$). Consequently, if phase compensation for $\Delta_{offset}$ is not performed, then the phase compensation function may be performed through the resource de-mapping shift for the FFT and downconversion (using an analog OSC) as illustrated in FIG. 10B.

Implementation a2-2

Figure 11A:
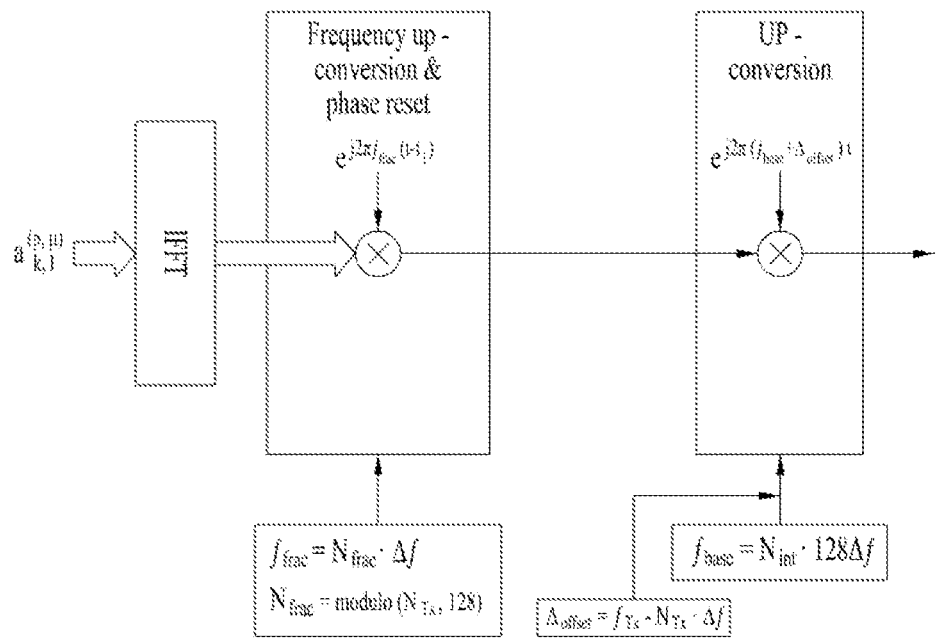
FIGS. 11A and 11B are diagrams illustrating examples of Implementation a2-2 of the present disclosure.
Figure 11B:
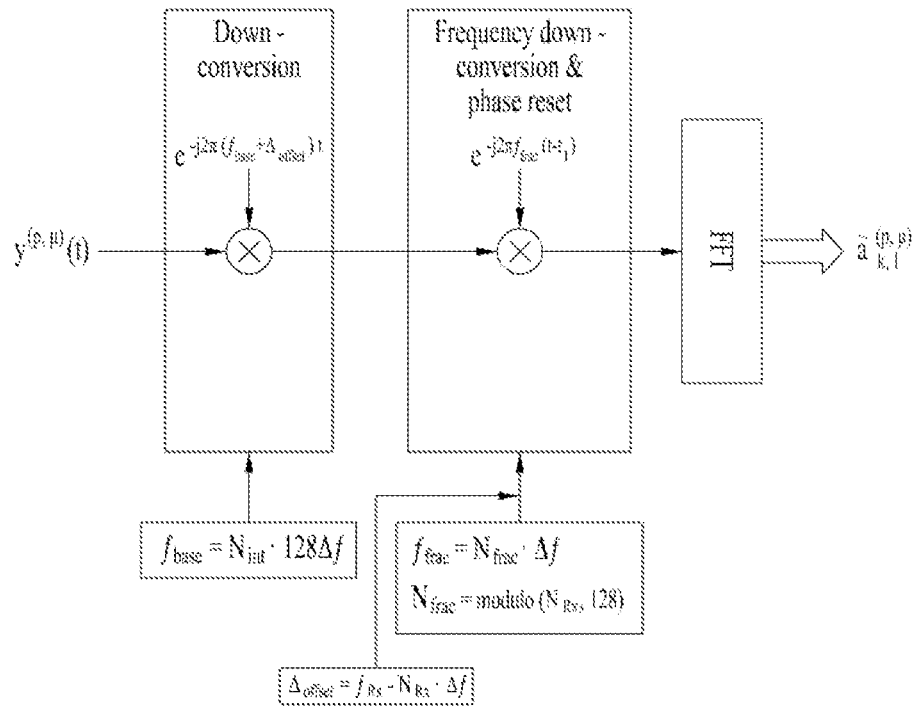

FIGS. 11A and 11B are diagrams illustrating examples of Implementation a2-2 of the present disclosure. Specifically, FIG. 11A shows a part of the transmitting side structure according to Implementation a2-2, and FIG. 11B shows a part of the receiving side structure according to Implementation a2-2. In FIGS. 11A and 11B, the term $t_l$ denotes the start position of the signal part of an OFDM symbol l in the time domain, and may be expressed as $t_l=t_{start,l}+N_{CP,l}^{\mu}T_c$.

Referring first to FIG. 11A, showing a part of the transmitting in Implementation a2-2, the offset $\Delta_{offset}$ is considered to be 0, i.e., phase correction/compensation for $\Delta_{offset}$ is not performed. That is, even if frequency shift is performed by $f_{base}+\Delta_{offset}$ using an analog free-running OSC, phase correction/compensation for $\Delta_{offset}$ is not performed.

By way of comparison, in Implementation a2-1 described above, at the transmitter side, the frequency corresponding to $f_{base}$ and $\Delta_{offset}$ is used for the upconversion process by the OSC of the RF stage (the free-running OSC) at the transmitting side, and the portion corresponding to $f_{frac}$ is used in the process of determining the resource mapping position with respect to the IFFT. However, in some scenarios of Implementation a2-1, described above, the degree of asymmetry of a signal output in the baseband may be increased with respect to DC depending on the value of $f_{frac}$. This may limit the efficiency of the spectrum by filtering after the IFFT output in the transmitter (or before the input of the FFT in the receiver).

Therefore, to address such problems, in some scenarios it may be desirable to modify the transmitting side operations of Implementation a2-1, described above, for implementing the function of frequency upconversion to $f_{frac}$ (i.e., frequency up-shift by $f_{frac}$) and phase reset by adjusting the position of the resource mapping of IFFT.

Accordingly, to this end, in Implementation a2-2, at the transmitter side, the function of frequency shift by $f_{frac}$ and phase reset may be realized by a digital OSC. As such, as illustrated in FIG. 11A, in order to perform frequency upconversion by Implementation a2-2 uses a frequency corresponding to $f_{base}$ and $\Delta_{offset}$ in $f_{Tx}$ for upconversion by the free-running OSC at the RF stage, and uses $f_{frac}$ in performing frequency upconversion on an OFDM symbol-by-symbol basis and resetting the phase (e.g. to have the zero phase at the end time of the cyclic prefix CP) through the digital OSC.

Referring next to FIG. 11B, showing a part of the receiving side in Implementation a2-2, the offset $\Delta_{offset}$ is considered to be 0, namely, phase correction/compensation for $\Delta_{offset}$ is not performed. As such, even if frequency shift by $f_{base}+\Delta_{offset}$ is performed by the analog free-running OSC, phase correction/compensation for $\Delta_{offset}$ is not performed.

By way of comparison, in Implementation a2-1 described above, at the receiving side, the frequency corresponding to $f_{base}$ and $\Delta_{offset}$ is used for the downconversion process by the OSC of the RF stage (the free-running OSC) at the receiving side, and the portion corresponding to $f_{frac}$ is used in the process of determining the resource de-mapping position with respect to the FFT. However, in some scenarios of Implementation a2-1, described above, the degree of asymmetry of a signal (i.e., the RF output) output in downconversion may be increased with respect to DC depending on the value of $f_{frac}$. This may limit the efficiency of the spectrum by filtering after downconversion output in the receiver (or before the input of the FFT in the receiver).

Therefore, to address such problems, in some scenarios it may be desirable to modify the receiving side operations of Implementation a2-1, described above, for implementing the function of frequency downconversion (i.e., frequency down-shift) and phase reset corresponding to $f_{frac}$ by adjusting the position of the resource de-mapping of the FFT.

Accordingly, to this end, in Implementation a2-2, at the receiving side, the function of frequency shift by $f_{frac}$ and phase reset may be realized by a digital OSC. As such, as illustrated in FIG. 11B, in order to perform frequency downconversion by $f_{Rx}$, Implementation a2-2 uses a frequency corresponding to $f_{base}$ and $\Delta_{offset}$ in $f_{Tx}$ for downconversion by the free-running OSC (the analog OSC) at the RF stage, and uses $f_{frac}$ in performing frequency downconversion on an OFDM symbol-by-symbol basis and resetting the phase (e.g. to have the zero phase at the end time of the cyclic prefix CP) through the digital OSC.

To recap, Implementation 1, Implementation 2, and Implementation 3 are briefly summarized below.

Implementation 1 predetermines 128 compensation-valued sequences (or **128\*3** compensation-valued sequences if there are three values of $\Delta_{offset}$) for phase compensation, and performs phase compensation on the corresponding OFDM symbol using one compensation-valued sequence for the corresponding carrier frequency among 128 or 128*3 predetermined compensation-valued sequences.

In Implementation 2, an integer multiple of $128\Delta f$ is used as the base carrier frequency $f_{base}$ in both Implementation 2-1 and Implementation 2-2, and frequency up/down-shift is performed by $f_{base}$ by the free-running OSC at the RF stage. In Implementation 2, the transmitting side compensates for the frequency difference between $f_{Tx}$ and $f_{base}$ by resource mapping for IFFT (Implementation 2-1), or compensates for the difference by frequency shift using the digital OSC after IFFT (Implementation 2-2). The receiving side of Implementation 2 compensates for the frequency difference between $f_{Tx}$ and $f_{base}$ by resource de-mapping for FFT (Implementation 2-1), or compensates for the difference by frequency shift using the digital OSC before FFT (Implementation 2-2).

Implementation 3 is similar to Implementation 2 except that Implementation 3 performs phase compensation for $\Delta_{offset}$ on an OFDM symbol-by-symbol basis, unlike Implementation 2, which resets the phase on a sample-by-sample basis for frequency shift by $\Delta_{offset}$.

Figure 12:
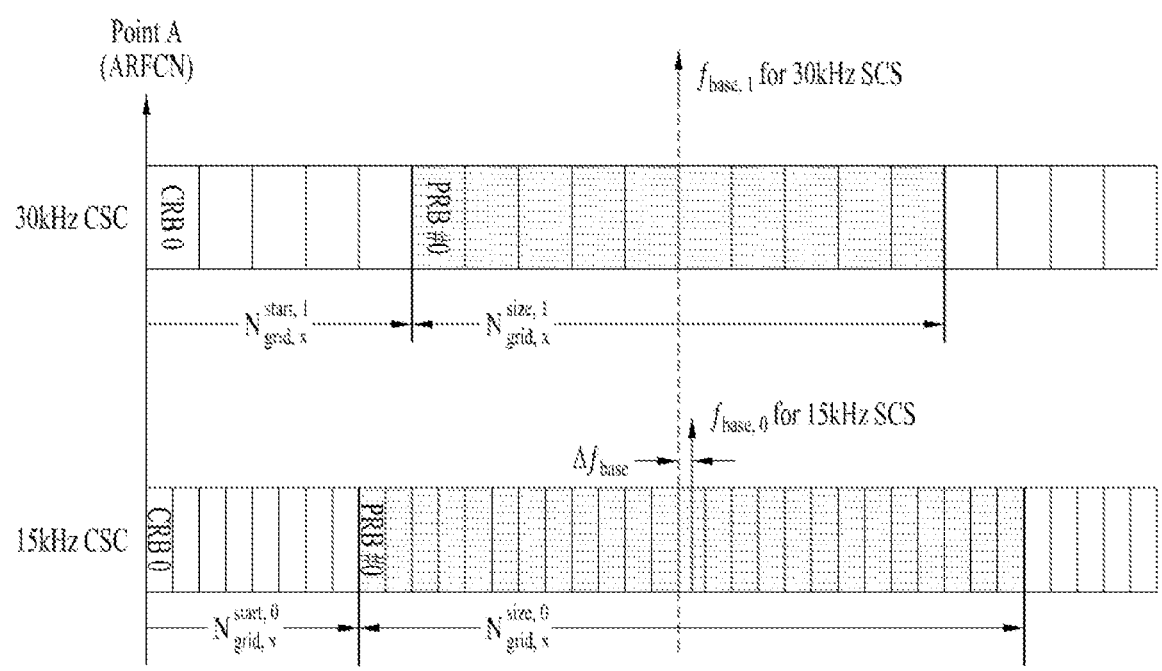
FIG. 12 is a diagram illustrating another use example of the present disclosure.

FIG. 12 is a diagram illustrating another use example of the present disclosure.

As described above, in order to prevent phase mismatch between OFDM symbols or to facilitate phase compensation, a frequency corresponding to an integer multiple of $128\Delta f$ is used by an analog OSC in the process of OFDM symbol signal generation or OFDM symbol signal recovery. For example, when a numerology of a frequency band supporting a plurality of numerologies is changed, for example, when the subcarrier spacing (SCS) of the frequency band is changed from 30 kHz to 15 kHz, or vice versa, frequencies which are integer multiples of $128\Delta f$ may be mismatched. For example, suppose that a frequency corresponding to an integer multiple of $128\Delta f$ closest to $f_{Tx}$ is $f_{base,1}$ when $\Delta f=30$ kHz (where $f_{base,1}=N_{int,1}*128\Delta f$ for $\Delta f=30$ kHz). If the SCS changes from $\Delta f=30$ kHz to $\Delta f=15$ kHz in the same frequency band as $f_{Tx}$, the frequency $f_{base,0}$ corresponding to an integer multiple of $128\Delta f$ closest to the upconversion frequency $f_{Tx}$ when $\Delta f=15$ kHz (where $f_{base,0}=N_{int,0}*128\Delta f$ for $\Delta f=15$ kHz) may differ from $f_{base,1}$ by $\Delta f_{base}$. Alternatively, the upconversion/downconversion frequency may be varied by $\Delta_{base}$ according to change in SCS. In this case, the transmitter and the receiver of the present disclosure may compensate for $\Delta_{base}$ using a digital OSC or IFFT/FFT resource mapping/de-mapping according to Implementation 2 of the present disclosure described above, rather than performing RF retuning.

Figure 13A:
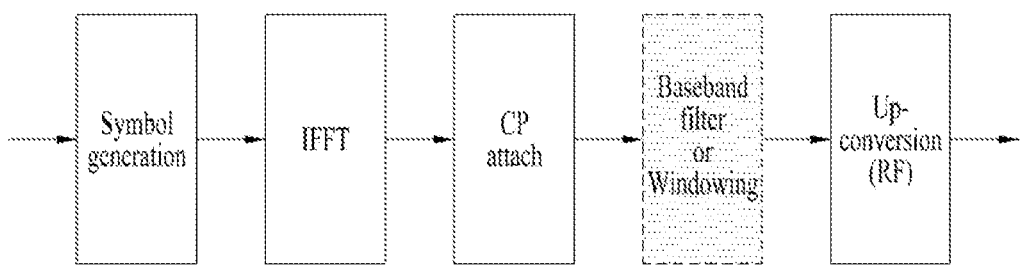
FIGS. 13A and 13B illustrate examples of a transmitter structure and a receiver structure according to some implementations the present disclosure.
Figure 13B:
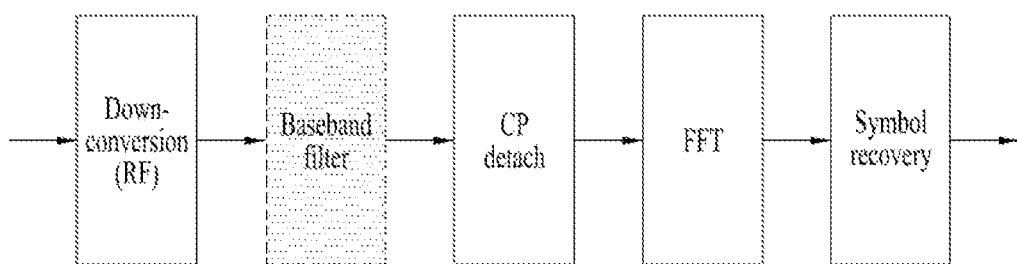

FIGS. 13A and 13B illustrate examples of a transmitter structure and a receiver structure according to the present disclosure. The transmitting side structure and the receiving side structure of the present disclosure described based on the basic structure of FIGS. 13A and 13B.

Referring to FIG. 13A, the transmitter generates symbols (hereinafter referred to as information symbols) for bit sequences input according to, for example, a signal generation technique defined in the standard. The transmitter performs, at the input side of the IFFT, appropriate resource mapping (i.e., subcarrier mapping) of the generated information symbols in accordance with the band in which transmission is to be performed, and performs IFFT, which converts a frequency-domain signal into a time-domain signal, on the resource-mapped information symbols. The transmitter inserts a cyclic prefix (CP), which is configured for mitigation/avoidance of interference between OFDM symbols, into the IFFT output. For reference, while FIGS. 5A to 11B illustrate that IFFT/FFT include the resource mapping/de-mapping function and the CP attach/detach function, the CP attach/detach function may be implemented separately from the FFT/IFFT as shown in FIG. 13. For a signal generated through IFFT and CP attachment, the transmitter may perform filtering or windowing to satisfy spectral characteristics before performing upconversion to a carrier frequency. However, filtering or windowing may not be a function that must be implemented depending on the characteristics of an RF device. In order to transmit a signal generated via IFFT and CP attachment or a signal generated via IFFT and CP attachment (and filtering/windowing) using a predefined carrier frequency, the transmitter performs unconversion of the signal to the predefined carrier frequency. In general, the upconversion is performed using a digital-to-analog converter (DAC) for converting a digital signal into an analog signal, an oscillator and a PLL (Phase-Locked Loop) for generating a carrier frequency, a mixer for shifting a baseband signal to a desired carrier frequency, and the like. Thereafter, the transmitter transmits the frequency up-converted signal to the outside through an analog filter, an amplifier, and an antenna.

Since the signals input to the digital-to-analog converter in the transmitter are digital signals and the signals output from the digital-to-analog converter are analog signals, the transmitter modules used for signal processing before the digital-to-analog converter may be digital modules, and the transmitter modules used for signal processing after the digital-to-analog converter may be analog modules.

The receiver performs an operation corresponding to the inverse process of the transmitter. In the receiver operations, a signal that the transmitter transmits is received by the receiver through the antenna, amplifier and analog filter of the receiver. Referring to FIG. 13B, the receiver performs downconversion on the received signal. In general, the downconversion is performed using an analog-to-digital converter (ADC) for converting an analog signal into a digital signal, an oscillator and PLL for generating a carrier frequency, a mixer for shifting a signal received through the carrier frequency to a band signal, and the like. The receiver may filter the signal transmitted through the baseband according to the spectral characteristics. Filtering may not be implemented depending on the characteristics of the RF devices. The receiver detaches the cyclic prefix (CP) from the (filtered or unfiltered) baseband signal according to the pre-measured timing information, and converts the CP-detached signal into a frequency-domain signal through FFT for converting a time-domain signal into a frequency-domain signal. The FFT function includes a resource de-mapping function for deriving only a signal transmitted to the receiver from among the entire frequency-domain signals. The receiver recovers the signal transmitted by the transmitter from a resource de-mapped signal through a symbol recovery process for compensating for a distorted part on the channel, performs a decoding process for a specific signal generation technique, for example, a signal generation technique defined by the communication standard, and then obtains the final signal (bit sequence). Both the process of compensating for the distorted part on the channel and the decoding process correspond to the symbol recovery process.

Since the signals input to the analog-to-digital converter in the receiver are analog signals and the signals output from the analog-to-digital converter are digital signals, the receiver modules used for signal processing before the analog-to-digital converter may be analog modules, and the receiver modules used for signal processing after the analog-to-digital converter may be digital modules.

Although not shown in FIGS. 13A and 13B, the transmitter and the receiver may include a digital oscillator configured to perform operations according to the present disclosure.

Figure 14:
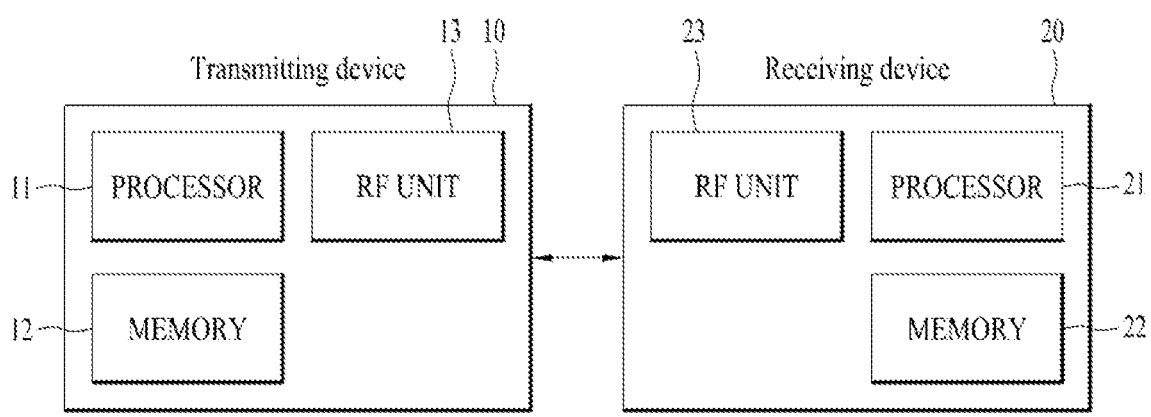
FIG. 14 is a block diagram illustrating examples of components of a transmitting device and a receiving device according to some implementations of the present disclosure.

FIG. 14 is a block diagram illustrating examples of elements of a transmitting device 10 and a receiving device 20 for implementing the present disclosure.

The transmitting device 10 and the receiving device 20 respectively include radio frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described implementations of the present disclosure.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present disclosure. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. In some implementations, if the present disclosure is implemented using firmware or software, the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

In some scenarios of the present disclosure, functions, procedures, and/or methods disclosed in the present disclosure may be implemented by a processing chip (also referred to as a processing device). The processing chip may be a system on chip (SoC). The processing chip may include the processor 11 and/or 21 and the memory 12 and/or 22, and may be mounted on, installed on, or connected to the transmitting device 10 or the receiving device 20. The processing chip may be configured to perform or control any one of the methods and/or processes described herein and/or to cause such methods and/or processes to be performed by a communication device which the processing chip is mounted on, installed on, or connected to. The memories 12 and 22 in the processing chip may be configured to store software codes including instructions that, when executed by the processor, causes the processors 11 and 21 to perform some or all of functions, methods or processes discussed in the present disclosure. The memories 12 and 22 in the processing chip may store or buffer information, data or signals generated by the processor of the processing chip or information, data or signals recovered or obtained by the processors 11 and 21 of the processing chip. One or more processes involving transmission or reception of the information, data or signals may be performed by the processors 11 and 21 of the processing chip or under control of the processors 11 and 21 of the processing chip. For example, the RF units 13 and 23 operably connected or coupled to the processing chip may transmit or receive signals containing the information or data under the control of the processor 11 and 21 of the processing chip.

The processor 11 mounted on, installed on, or connected to the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. The processor 11 may determine or generate symbols (hereinafter referred to as information symbols) for bit sequences input according to, for example, a signal generation technique defined in the standard. The processor 11 may determine a carrier frequency for transmission of radio signals. The processor 11 may determine the frequency $f_{base}$ used for frequency upconversion. The processor 11 may determine the frequency $f_{base}$ among frequencies which are integer multiples of $$\frac{N_{sample}}{gcd\{N_{CP,1}, N_{CP,2}, \ldots, N_{sample}\}} \Delta f,$$

based on the carrier frequency. For frequency up-conversion, the RF unit 13 may include an oscillator. The RF unit 13 may include $N_t$ (where $N_t$ is a positive integer) transmit antennas. The RF unit 13 may perform frequency upconversion by an oscillator according to the present disclosure under control of the processor 11 to generate an OFDM symbol signal. For example, in the case of Implementation 2, the processor 11 may control the oscillator (i.e., the analog oscillator) of the RF unit 13 so as to perform upconversion using a frequency that is an integer multiple of $$\frac{N_{sample}}{gcd\{N_{CP,1}, N_{CP,2}, \ldots, N_{sample}\}} \Delta f.$$

A signal processing process of the receiving device 20 is the reverse of the signal processing process at the transmitting device 10. Under control of the processor 21, the RF unit 23 of the receiving device 20 receives radio signals transmitted by the transmitting device 10. The RF unit 23 may include $N_r$ receive antennas, and the RF unit 23 may perform frequency downconversion of each signal received through the receive antennas by an oscillator according to the present disclosure under control of the processor 21 to recover the baseband signal. The processor 21 may determine a carrier frequency for reception of radio signals. The processor 21 may determine a frequency $f_{base}$ used for frequency downconversion. The processor 21 may determine the frequency $f_{base}$ among frequencies which are integer multiples of $$\frac{N_{sample}}{gcd\{N_{CP,1}, N_{CP,2}, \ldots, N_{sample}\}} \Delta f,$$

based on the carrier frequency. For example, in the case of Implementation 2, the processor 21 may control the oscillator (i.e., the analog oscillator) of the RF unit 23 so as to perform down conversion using a frequency that is an integer multiple of $$\frac{N_{sample}}{gcd\{N_{CP,1}, N_{CP,2}, \ldots, N_{sample}\}} \Delta f.$$

The RF unit 23 may include an oscillator for frequency downconversion. The processor 21 may perform decoding and demodulation of the radio signal received through the receive antenna to recover data that the transmitting device 10 originally intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the present disclosure, a user equipment (UE), that is, a terminal operates as the transmitting device 10 on the uplink and as the receiving device 20 on the downlink. In the present disclosure, the base station operates as the receiving device 20 on the uplink and as the transmitting device 10 on the downlink.

The processor 11 mounted on, installed on, or connected to the transmitting device 10 may be configured to perform processes according to the present disclosure on a signal to be transmitted, and may control the modules (see FIG. 13A) of the transmitter so as to perform operations according to the present disclosure on the signal to be transmitted or the signal processed. For example, for a frequency shift corresponding to the difference between $f_0$ and (base, the processor 11 may control the IFFT so as to up-shift the resource mapping position of the signal to be transmitted for the IFFT by $N_{frac}$. As another example, the processor 11 may control the digital oscillator to perform frequency up-shift by the difference between $f_0$ and $f_{base}$. As another example, the processor 11 may control the digital oscillator to reset the phase to a certain value at the end of the cyclic prefix (CP) part of the OFDM symbol, i.e., at the beginning of the signal part of the OFDM symbol. The processor 11 may be configured to use a frequency closest to $f_0$ among frequencies that are integer multiples of $$\frac{N_{sample}}{gcd\{N_{CP,1}, N_{CP,2}, \ldots, N_{sample}\}}\Delta f$$

as $f_{base}$.

The processor 21 at the receiving device 10 may control the modules (see FIG. 13B) of the receiver to perform the operations according to the present disclosure on the received signal, and be configured to perform processes according to the present disclosure on the signals from the RF unit 23. For example, for a frequency shift corresponding to the difference between $f_0$ and $f_{base}$, the processor 21 may control the FFT so as to down-shift the resource de-mapping position from the FFT for the received signal by $N_{frac}$. As another example, the processor 21 may control the digital oscillator so as to perform frequency down-shift by the difference between $f_0$ and $f_{base}$. As another example, the processor 21 may control the digital oscillator to reset the phase to a certain value at the end of the cyclic prefix (CP) part of the OFDM symbol, i.e., at the beginning of the signal part of the OFDM symbol. The processor 21 may be configured to use a frequency closest to $f_0$ among frequencies that are integer multiples of $$\frac{N_{sample}}{gcd\{N_{CP,1}, N_{CP,2}, \ldots, N_{sample}\}}\Delta f$$

as $f_{base}$.

The transmitting device 10 may be configured to include FIG. 13A. The receiving device 20 may be configured to include FIG. 13B. In the implementations of the present disclosure described above, upconversion and downconversion by the free-running oscillator may be provided in the RF units 13, 23, and the other operations of the present disclosure (e.g., baseband signal generation, IFFT/FFT, resource mapping/de-mapping, cyclic prefix (CP) attachment/detachment, filtering, symbol recovery) may be performed by the processors 11, 21 or under control of the processors 11, 21.

While the transmitting device 10 and the receiving device 20 are separately shown in FIG. 14, the processor 11, the memory 12 and the RF unit 13 in the transmitting device 10 may also be configured to perform the operations of the receiving device 20, and the processor 21, the memory 22 and the RF unit 23 in the receiving device 20 may also be configured to perform the operations of the transmitting device 10. A part of the transmitter illustrated in FIG. 13A and a part of the receiver illustrated in FIG. 13B may be implemented as a transceiver. Alternatively, the term "transceiver" may be used to refer to the RF unit 13 of the transmitting device 10 or the RF unit 23 of the receiving device 20. A part of the transmitter illustrated in FIG. 13A and a part of the receiver illustrated in FIG. 13B may be implemented with the processors 11, 21.

What is claimed is:

1. A method of transmitting, by a transmitting device, an orthogonal frequency division multiplexing (OFDM) signal in a wireless communication system, the method comprising:

generating, by a digital module of the transmitting device, a frequency-shifted OFDM baseband signal by performing frequency up-shift of a first signal by a difference between a carrier frequency $f_0$ and a first frequency wherein the first frequency $f_{base}$ is, among frequencies corresponding to integer multiples of $N_{base}*\Delta f$, closest to the carrier frequency $f_0$, and wherein $\Delta f$ is an OFDM subcarrier spacing;

up-converting, by an analog oscillator of the transmitting device, the frequency-shifted OFDM baseband signal by the first frequency $f_{base}$ to generate an OFDM symbol signal at the carrier frequency $f_0$; and, transmitting, by a transmitter of the transmitting device, the OFDM symbol signal at the carrier frequency $f_0$, wherein $N_{base}=N_{sample}/gcd\{N_{CP,1}, N_{CP,2}, \ldots, N_{CP,m}, N_{sample}\}$, where $N_{CP,1}, N_{CP,2}, \ldots, N_{CP,m}$ are cyclic prefix (CP) lengths supported in the wireless communication system, $N_{sample}$ is a length per OFDM symbol except CP, and $gcd\{N_{CP,1}, N_{CP,2}, \ldots, N_{CP,m}, N_{sample}\}$ is a greatest common divisor of the CP lengths supported in the wireless communication system and $N_{sample}$.

2. The method according to claim 1, wherein the digital module is configured to implement an inverse fast Fourier transform (IFFT) on the first signal.

3. The method according to claim 2, wherein performing the frequency up-shift of the first signal by the difference between $f_0$ and $f_{base}$ comprises:

up-shifting, by $N_{frac}$, a resource mapping for the first signal that is input to the IFFT, where $N_{frac}$ is an integer, among 0 to $N_{base}-1$, which satisfies $f_0-f_{base}=N_{frac}*\Delta f$.

4. The method according to claim 1, wherein the digital module comprises a digital oscillator, and wherein performing the frequency up-shift of the first signal by the difference between $f_0$ and $f_{base}$ is performed by the digital oscillator.

5. The method according to claim 4, further comprising:

resetting, by the digital oscillator and before transmitting the OFDM symbol signal, a phase of the OFDM symbol signal to a predetermined value at an end of a cyclic prefix of the OFDM symbol signal.

6. A method of receiving, by a receiving device, an orthogonal frequency division multiplexing (OFDM) signal in a wireless communication system, the method comprising:

receiving an OFDM symbol signal at a carrier frequency $f_0$;

down-converting, by an analog oscillator of the receiving device, the OFDM symbol signal by a first frequency $f_{base}$ to generate a down-converted OFDM symbol signal; and generating, by a digital module of the receiving device, an OFDM baseband signal by performing frequency down-shift of the down-converted OFDM symbol signal by a difference between the carrier frequency $f_0$ and $f_{base}$, wherein the first frequency $f_{base}$ is, among frequencies corresponding to integer multiples of $N_{base}*\Delta f$, closest to the carrier frequency $f_0$, and wherein $\Delta f$ is an OFDM subcarrier spacing, wherein $N_{base}=N_{sample}/\gcd\{N_{CP,1}, N_{CP,2}, \ldots, N_{CP,m}, N_{sample}\}$, where $N_{CP,1}, N_{CP,2}, \ldots, N_{CP,m}$ are cyclic prefix (CP) lengths supported in the wireless communication system, $N_{sample}$ is a length per OFDM symbol except CP, and $\gcd\{N_{CP,1}, N_{CP,2}, \ldots, N_{CP,m}, N_{sample}\}$ is a greatest common divisor of the CP lengths supported in the wireless communication system and $N_{sample}$.

7. The method according to claim 6, wherein the digital module is configured to implement a fast Fourier transformer (FFT) on the down-converted OFDM symbol signal.

8. The method according to claim 7, wherein performing the frequency down-shift of the down-converted OFDM symbol signal by the difference between $f_0$ and $f_{base}$ comprises:
   down-shifting, by $N_{frac}$, a resource de-mapping from the FFT for the down-converted OFDM symbol signal, where $N_{frac}$ is an integer, among 0 to $N_{base}-1$, which satisfies $f_0-f_{base}=N^{frac}*\Delta f$.

9. The method according to claim 6, wherein the digital module comprises a digital oscillator, and
   wherein performing the frequency down-shift of the down-converted OFDM symbol signal by the difference between $f_0$ and $f_{base}$ is performed by the digital oscillator.

10. The method according to claim 9, further comprising:
    resetting, by the digital oscillator, a phase of the down-converted OFDM symbol signal to a predetermined value at an end of a cyclic prefix of the down-converted OFDM symbol signal.

11. A transmitting device for transmitting an orthogonal frequency division multiplexing (OFDM) signal in a wireless communication system, the transmitting device comprising:
    a digital module;
    an analog oscillator;
    at least one antenna;
    at least one processor; and
    at least one computer memory that is operably connectable to the at least one processor and that has stored thereon instructions which, when executed, cause the at least one processor to perform operations comprising:
      generating, by the digital module, a frequency-shifted OFDM baseband signal by performing frequency up-shift of a first signal by a difference between a carrier frequency $f_0$ and a first frequency $f_{base}$, wherein the first frequency $f_{base}$ is, among frequencies corresponding to integer multiples of $N_{base}*\Delta f$, closest to the carrier frequency $f_0$, and wherein $\Delta f$ is an OFDM subcarrier spacing;
      up-converting, by the analog oscillator, the frequency-shifted OFDM baseband signal by the first frequency $f_{base}$ to generate an OFDM symbol signal at the carrier frequency $f_0$; and
      transmitting, using the at least one antenna, the OFDM symbol signal at the carrier frequency $f_0$,
    wherein $N_{base}=N_{sample}/\gcd\{N_{CP,1}, N_{CP,2}, \ldots, N_{CP,m}, N_{sample}\}$, where $N_{CP,1}, N_{CP,2}, \ldots, N_{CP,m}$ are cyclic prefix (CP) lengths supported in the wireless communication system, $N_{sample}$ is a length per OFDM symbol except CP, and $\gcd\{N_{CP,1}, N_{CP,2}, \ldots, N_{CP,m}, N_{sample}\}$ is a greatest common divisor of the CP lengths supported in the wireless communication system and $N_{sample}$.

12. The transmitting device according to claim 11, wherein the digital module is configured to implement an inverse fast Fourier transform (IFFT) on the first signal.

13. The transmitting device according to claim 12, wherein performing the frequency up-shift of the first signal by the difference between $f_0$ and $f_{base}$ comprises:
    up-shifting, by $N_{frac}$, a resource mapping for the first signal that is input to the IFFT, where $N_{frac}$ is an integer, among 0 to $N_{base}-1$, which satisfies $f_0-f_{base}=N_{frac}*\Delta f$.

14. The transmitting device according to claim 11, wherein the digital module comprises the digital oscillator, and
    wherein performing the frequency up-shift of the first signal by the difference between $f_0$ and $f_{base}$ is performed by the digital oscillator.

15. The transmitting device according to claim 14, wherein the operations further comprise:
    resetting, by the digital oscillator and before transmitting the OFDM symbol signal, a phase of the OFDM symbol signal to a predetermined value at an end of a cyclic prefix of the OFDM symbol signal.

16. A receiving device for receiving an orthogonal frequency division multiplexing (OFDM) signal in a wireless communication system, the receiving device comprising:
    at least one antenna;
    an analog oscillator;
    a digital module;
    at least one processor; and
    at least one computer memory that is operably connectable to the at least one processor and that has stored thereon instructions which, when executed, cause the at least one processor to perform operations comprising:
      receiving, using the at least one antenna, an OFDM symbol signal at a carrier frequency $f_0$;
      down-converting, by the analog oscillator, the OFDM symbol signal by a first frequency $f_{base}$ to generate a down-converted OFDM symbol signal; and
      generating, by the digital module, an OFDM baseband signal by performing frequency down-shift of the down-converted OFDM symbol signal by a difference between the carrier frequency $f_0$ and $f_{base}$,
    wherein the first frequency $f_{base}$ is, among frequencies corresponding to integer multiples of $N_{base}*\Delta f$, closest to the carrier frequency $f_0$, and wherein $\Delta f$ is an OFDM subcarrier spacing,
    wherein $N_{base}=N_{sample}/\gcd\{N_{CP,1}, N_{CP,2}, \ldots, N_{CP,m}, N_{sample}\}$, where $N_{CP,1}, N_{CP,2}, \ldots, N_{CP,m}$ are cyclic prefix (CP) lengths supported in the wireless communication system, $N_{sample}$ is a length per OFDM symbol except CP, and $\gcd\{N_{CP,1}, N_{CP,2}, \ldots, N_{CP,m}, N_{sample}\}$ is a greatest common divisor of the CP lengths supported in the wireless communication system and $N_{sample}$.

17. The receiving device according to claim 16, wherein the digital module is configured to implement a fast Fourier transformer (FFT) on the down-converted OFDM symbol signal.

18. The receiving device according to claim 17, wherein performing the frequency down-shift of the down-converted OFDM symbol signal by the difference between $f_0$ and $f_{base}$ comprises:
    down-shifting, by $N_{frac}$, a resource de-mapping from the FFT for the down-converted OFDM symbol signal, where $N_{frac}$ is an integer, among 0 to $N_{base}-1$, which satisfies $f_0-f_{base}=N_{frac}*\Delta f$.

19. The receiving device according to claim 16, wherein the digital module comprises the digital oscillator, and wherein performing the frequency down-shift of the down-converted OFDM symbol signal by the difference between $f_0$ and $f_{base}$ is performed by the digital oscillator.

20. The receiving device according to claim 19, wherein the operations further comprise:
   resetting, by the digital oscillator, a phase of the down-converted OFDM symbol signal to a predetermined value at an end of a cyclic prefix of the down-converted OFDM symbol signal.

* * * * *